US012478074B2

(12) United States Patent
Bellman

(10) Patent No.: US 12,478,074 B2
(45) Date of Patent: Nov. 25, 2025

(54) APPARATUS AND METHOD FOR INFUSING AND DISPENSING OILS, AND DRYING AND HEATING INFUSING MATERIALS

(71) Applicant: Levo Oil Infusion, Inc., Denver, CO (US)

(72) Inventor: Christina Spencer Bellman, Denver, CO (US)

(73) Assignee: Levo Oil Infusion, Inc., Denver, CO (US)

( * ) Notice: Subject to any disclaimer, the term of this patent is extended or adjusted under 35 U.S.C. 154(b) by 891 days.

(21) Appl. No.: 17/713,010

(22) Filed: Apr. 4, 2022

(65) Prior Publication Data

US 2022/0225817 A1    Jul. 21, 2022

Related U.S. Application Data

(63) Continuation-in-part of application No. 16/915,523, filed on Jun. 29, 2020, now Pat. No. 11,330,931, which is a continuation-in-part of application No. 16/188,702, filed on Nov. 13, 2018, now abandoned, and a continuation-in-part of application No. 16/013,891, filed on Jun. 20, 2018, now Pat. No. 10,758,078, which is a continuation of application No. 15/711,242, filed on Sep. 21, 2017, now Pat. No. 10,039,413, which is a continuation of application No. 15/428,765, filed on Feb. 9, 2017, now Pat. No. 9,795,246.

(Continued)

(51) Int. Cl.
A47J 31/20    (2006.01)
A23D 9/02    (2006.01)
A47J 31/10    (2006.01)

(52) U.S. Cl.
CPC ............. *A23D 9/02* (2013.01); *A47J 31/10* (2013.01); *A47J 31/20* (2013.01)

(58) Field of Classification Search
CPC .. A47J 31/41; A47J 31/20; A47J 31/10; A47J 37/0754
USPC ........................................................... 99/287
See application file for complete search history.

(56) References Cited

U.S. PATENT DOCUMENTS 1,003,317 A * 9/1911 Bargallo ................. A47J 31/46
99/290
1,242,493 A    10/1917 Stringham
(Continued)

FOREIGN PATENT DOCUMENTS

CA    2568231 A1    2/2001
CN    101233990 A    8/2008
(Continued)

OTHER PUBLICATIONS

"EtOH Pro User Manual," Version 1.0, Dated Dec. 1, 2018. 21 pages.
(Continued)

*Primary Examiner* — Reginald Alexander
(74) *Attorney, Agent, or Firm* — Kubota & Basol LLP

(57) ABSTRACT

The present invention pertains in general to an apparatus and method for the drying and activating of infusing material, and the infusing, agitation and dispensation of oils in a controlled manner to produce a desired potency of an infusion while remaining below an identified maximum temperature threshold.

13 Claims, 37 Drawing Sheets

Related U.S. Application Data

(60) Provisional application No. 62/587,011, filed on Nov. 16, 2017, provisional application No. 62/401,369, filed on Sep. 29, 2016.

(56) References Cited

U.S. PATENT DOCUMENTS

| | | | |
|---|---|---|---|
| 2,188,969 A | 2/1940 | Waldvogel | |
| 2,350,534 A | 6/1944 | Arthur | |
| 2,355,094 A * | 8/1944 | Moore | A47J 31/20 |
| | | | 99/302 R |
| 2,667,114 A | 1/1954 | Burgess | |
| 2,935,236 A | 5/1960 | Mueller | |
| 3,113,503 A | 12/1963 | Jacques | |
| 3,221,637 A | 12/1965 | Small et al. | |
| 3,413,908 A | 12/1968 | Philip | |
| 3,446,137 A | 5/1969 | Pryor et al. | |
| 3,878,360 A | 4/1975 | Augustine et al. | |
| 4,187,150 A * | 2/1980 | Rich | A47J 31/00 |
| | | | 203/DIG. 16 |
| 4,196,342 A | 4/1980 | Chailloux | |
| 4,516,484 A | 5/1985 | Ponti | |
| 4,565,121 A | 1/1986 | Ohya et al. | |
| 4,682,537 A | 7/1987 | Snowball et al. | |
| 4,828,850 A | 5/1989 | Davis | |
| 5,525,260 A | 6/1996 | Aeschbach et al. | |
| 5,649,476 A * | 7/1997 | Montagnino | F22B 1/284 |
| | | | 126/369 |
| 5,952,028 A | 9/1999 | Lesser | |
| 6,007,853 A | 12/1999 | Lesser | |
| 6,324,964 B1 * | 12/2001 | Niederberger | A47J 31/40 |
| | | | 99/302 R |
| 6,422,133 B1 | 7/2002 | Brady | |
| 6,658,989 B2 | 12/2003 | Sweeney et al. | |
| 6,684,756 B2 | 2/2004 | Kerr | |
| 6,726,946 B1 | 4/2004 | Smith | |
| 7,001,617 B2 | 2/2006 | Burrell et al. | |
| 7,047,870 B2 | 5/2006 | Gantt et al. | |
| 7,051,648 B2 | 5/2006 | Fenaroli | |
| 7,213,507 B2 | 5/2007 | Glucksman et al. | |
| 7,240,610 B2 | 7/2007 | Wimmer et al. | |
| 7,240,611 B2 * | 7/2007 | Burrows | A47J 31/057 |
| | | | 99/287 |
| 7,464,637 B1 | 12/2008 | Lin | |
| 7,469,268 B2 | 12/2008 | Balle et al. | |
| 7,591,218 B2 | 9/2009 | Bunn et al. | |
| 7,655,212 B2 | 2/2010 | Sandford et al. | |
| 7,685,932 B2 | 3/2010 | Rahn et al. | |
| 7,891,286 B2 | 2/2011 | Scarchilli et al. | |
| 7,931,880 B2 | 4/2011 | Sandford et al. | |
| D647,398 S | 10/2011 | Winkler | |
| D647,399 S | 10/2011 | Winkler | |
| 8,062,615 B2 | 11/2011 | Sandford et al. | |
| 8,250,970 B2 | 8/2012 | Thomas | |
| 8,361,527 B2 | 1/2013 | Winkler et al. | |
| 8,522,669 B1 | 9/2013 | Rolfes et al. | |
| 8,586,117 B2 | 11/2013 | Vastardis et al. | |
| 8,695,482 B2 | 4/2014 | Goeckner et al. | |
| 8,808,778 B2 | 8/2014 | Dakis | |
| 8,881,642 B2 | 11/2014 | Hart | |
| 8,960,075 B2 | 2/2015 | Traitler et al. | |
| 9,095,236 B2 | 8/2015 | Perentes et al. | |
| 9,271,598 B2 | 3/2016 | Yoakim et al. | |
| 9,480,647 B2 | 11/2016 | Benson et al. | |
| 9,592,952 B2 | 3/2017 | Fisk et al. | |
| 9,629,886 B2 | 4/2017 | Franklin et al. | |
| 9,763,461 B2 | 9/2017 | Vastardis et al. | |
| 9,795,246 B1 | 10/2017 | Bellman et al. | |
| 10,039,413 B1 | 8/2018 | Bellman et al. | |
| 10,758,078 B2 | 9/2020 | Bellman et al. | |
| 2002/0078831 A1 | 6/2002 | Cai | |
| 2003/0021854 A1 | 1/2003 | Burrell et al. | |
| 2004/0134357 A1 | 7/2004 | Cai | |
| 2005/0034605 A1 | 2/2005 | Webster et al. | |
| 2005/0166763 A1 | 8/2005 | Scarchilli et al. | |
| 2005/0193892 A1 | 9/2005 | Rahn et al. | |
| 2005/0199127 A1 | 9/2005 | Wimmer et al. | |
| 2005/0199129 A1 | 9/2005 | Glucksman et al. | |
| 2006/0011066 A1 | 1/2006 | Bunn et al. | |
| 2006/0021511 A1 | 2/2006 | Paasch et al. | |
| 2006/0035000 A1 | 2/2006 | Bunke et al. | |
| 2006/0065127 A1 | 3/2006 | Dalton et al. | |
| 2007/0157820 A1 | 7/2007 | Bunn | |
| 2008/0000357 A1 | 1/2008 | Yang et al. | |
| 2008/0092747 A1 | 4/2008 | Yoakim et al. | |
| 2008/0115674 A1 | 5/2008 | Huang et al. | |
| 2008/0168906 A1 | 7/2008 | Pan et al. | |
| 2008/0216667 A1 | 9/2008 | Garman et al. | |
| 2008/0282897 A1 | 11/2008 | Webster et al. | |
| 2008/0295697 A1 | 12/2008 | Kim | |
| 2009/0285953 A1 | 11/2009 | Renieris | |
| 2009/0291147 A1 | 11/2009 | Sandford et al. | |
| 2010/0047420 A1 | 2/2010 | Bersten | |
| 2010/0203209 A1 | 8/2010 | Fishbein et al. | |
| 2011/0086148 A1 | 4/2011 | Ford | |
| 2011/0117248 A1 | 5/2011 | Rivera | |
| 2011/0179952 A1 | 7/2011 | Radi | |
| 2012/0121779 A1 | 5/2012 | Lai et al. | |
| 2012/0125205 A1 | 5/2012 | Glucksman et al. | |
| 2012/0183659 A1 | 7/2012 | Hulett et al. | |
| 2013/0045308 A1 | 2/2013 | Gorbatenko | |
| 2013/0133522 A1 | 5/2013 | Denisart et al. | |
| 2013/0136833 A1 | 5/2013 | Vastardis et al. | |
| 2013/0305933 A1 | 11/2013 | Heidrich et al. | |
| 2015/0017297 A1 | 1/2015 | Vastardis et al. | |
| 2015/0327718 A1 | 11/2015 | Burrows | |
| 2015/0359378 A1 | 12/2015 | Anthony et al. | |
| 2015/0359380 A1 | 12/2015 | Oleksy | |
| 2016/0135635 A1 | 5/2016 | Boniello et al. | |
| 2016/0243177 A1 | 8/2016 | Franklin et al. | |
| 2017/0020814 A1 | 1/2017 | Benson et al. | |
| 2017/0156358 A1 | 6/2017 | Choudhary et al. | |
| 2017/0295989 A1 | 10/2017 | Burrows | |
| 2018/0220836 A1 | 8/2018 | Bellman et al. | |
| 2018/0303277 A1 | 10/2018 | Bellman et al. | |
| 2020/0375390 A1 | 12/2020 | Bellman et al. | |

FOREIGN PATENT DOCUMENTS

| | | |
|---|---|---|
| DE | 2428165 A1 | 1/1976 |
| DE | 4317902 A1 | 12/1994 |
| EP | 1206206 A2 | 5/2002 |
| EP | 1206206 B1 | 6/2004 |
| EP | 1648776 A1 | 4/2006 |
| EP | 2685838 A1 | 1/2014 |
| EP | 2691316 A1 | 2/2014 |
| WO | 9934716 A1 | 7/1999 |
| WO | 2004099035 A1 | 11/2004 |
| WO | 2004110873 A2 | 12/2004 |
| WO | 2005077232 A2 | 8/2005 |
| WO | 2005084501 A1 | 9/2005 |
| WO | 2005105660 A2 | 11/2005 |
| WO | 2006052257 A1 | 5/2006 |
| WO | 2011124988 A3 | 12/2011 |
| WO | 2014116976 A1 | 7/2014 |
| WO | 2015191728 A1 | 12/2015 |
| WO | 2016147082 A1 | 9/2016 |
| WO | 2016205561 A2 | 12/2016 |
| WO | 2018029538 A2 | 2/2018 |
| WO | 2018071495 A1 | 4/2018 |
| WO | 2018109431 A1 | 6/2018 |

OTHER PUBLICATIONS

Best Soy, Rice, Almond, Nut and Quinoa Milk Makers—Reviews & Machines 2 pages.

CoffeeGearatHome,com. Is Keurig Instant Coffee? Here's What's Inside Your K-cup. https://coffeegearathome.com/is-keurig-instant-coffee-heres-whats-inside-your-k-cup/.

Fruzer Fruit Infuser Pod (2 Pack), Blue/Green, One Size. https://www.amazon.com/FRUZER-Fruit-Infuser-Pack-Green/dp/B06XDQWQHP.

(56) References Cited

OTHER PUBLICATIONS

Herb Oil Infuser, Website [online]. Uncommon Goods [Retrieved Mar. 24, 2017]. Retrieved from the Internet: . [Attachment].
Herb Oil Infuser, Website [online]. Oblend [Retrieved Dec. 19, 2017]. Retrieved from the internet . [Attachment].
Herb Oil Infuser, Website, http://www.uncommongoods.com/product/herb-oil-infuser, uncommongoods.
Herbal Extractor, website [online]. Extract Craft [Retrieved Dec. 19, 2017]. Retrieved from the internet . [Attachment].
How Do K-Cups Work? https://fixingthek.com/how-do-k-cups-work/. Oct. 2, 2014.
Image of an Oblend product. Believed to been on sale as early as Jan. 2018. 1 page.
International Search Report and Written Opinion from PCT/US1754434, Jan. 4, 2018, 10 pages.
K-Cups. https://www.walmart.com/ip/4-Pack-Keurig-Single-K-Cup-Solo-Reusable-Coffee-Filter-Pods-Stainless-Mesh-for-K10-K15-K40-K45-K55-K60-K65-K70-K75-K79/780787449?wmlspartner=wlpa&selectedSellerid=13762&adid=22222222227143720106&wl12=780787449&wl13=&veh=sem. It is believed that reusable K-cups may have been on sale for many years. 1 page.
Magic Butter Manual. Product believed to be on sale as early as Mar. 2017. 16 pages.
MagicalButter.com, PBC, Website, https://magicalbutter.com/.
MagicalButter.com, PBC, Website[Online], Magical Butter, 2017 [Retrieved Mar. 24, 2017], Retrieved from the internet; . [Attachment].
Non-Final Office Action dated Nov. 20, 2019 in U.S. Application No. Nov. 20, 2019 U.S. Appl. No. 16/013,891.
Non-Final Office Action dated Mar. 29, 2017 issued in U.S. Appl. No. 15/428,765.
Non-Final Office Action dated Nov. 27, 2017 issued in U.S. Appl. No. 15/711,242.
Non-Final Office Action dated Oct. 15, 2020 issued in U.S. Appl. No. 16/188,702.
Notice of Allowance dated Jul. 31, 2020 issued in U.S. Appl. No. 16/013,891.
Notice of Allowance dated Jun. 1, 2020 issued in U.S. Appl. No. 16/013,891.
Notice of Allowance dated Jun. 21, 2017 issued in U.S. Appl. No. 15/428,765.
Notice of Allowance dated Mar. 20, 2018 issued in U.S. Appl. No. 15/711,242.
Notice of Allowance dated Mar. 27, 2020 issued in U.S. Appl. No. 16/013,891.
Notice of Allowance dated May 20, 2020 issued in U.S. Appl. No. 16/013,891.
Notice of Allowanced dated Jan. 5, 2022 issued in U.S. Appl. No. 16/915,523.
Office Action dated Feb. 3, 2020 issued in Chinese Application No. 201780060268.6 (Partial Translation).
Search History for PCT Application No. PCT/US17/54434 to Levo Oil Infusion, LLC ISA Communication Jan. 4, 2018.
Search Report for PCT Application No. PCT/US17/54434 to Levo Oil Infusion, LLC ISA Communication Jan. 4, 2018.
Soy Milk Makers, Website Review [online]. Top5reviews.com [Retrieved Mar. 24, 2017], Retrieved from the Internet: [Attachment].
Soy Milk Makers, Website Review, http://soy-milk-makers.top5reviews.com/, Top5 Reviews.com.
Supplemental International Search Report and Written Opinion dated Jun. 16, 2020 issued in European Application No. 17 857 537.9.
Uncommon Goods Herb Oil Infuser. Retrieved from the internet . 7 pages.
Welcome to MagicalButter.com 2016 7 pages.
What's Inside a K-Cup? http://tangemanfamily.blogspot.com/2012/10/what-inside-k-cup.ltml Oct. 27, 2012, 2 pages.
U.S. Appl. No. 16/915,523, filed Jun. 29, 2020.
U.S. Appl. No. 16/188,702, filed Nov. 13, 2018.
U.S. Appl. No. 16/013,891, filed Jun. 20, 2018.
U.S. Appl. No. 15/711,242, filed Sep. 21, 2017.
U.S. Appl. No. 15/428,765, filed Feb. 9, 2017.
Non-Final Office Action received for U.S. Appl. No. 15/711,242, mailed on Nov. 28, 2017, 11 pages.
Extended European Search Report received for European Patent Application No. 17857537.9, mailed on Jul. 6, 2020, 7 pages.
Non-Final Office Action received for U.S. Appl. No. 16/915,523, mailed on Sep. 2, 2021, 9 pages.

\* cited by examiner

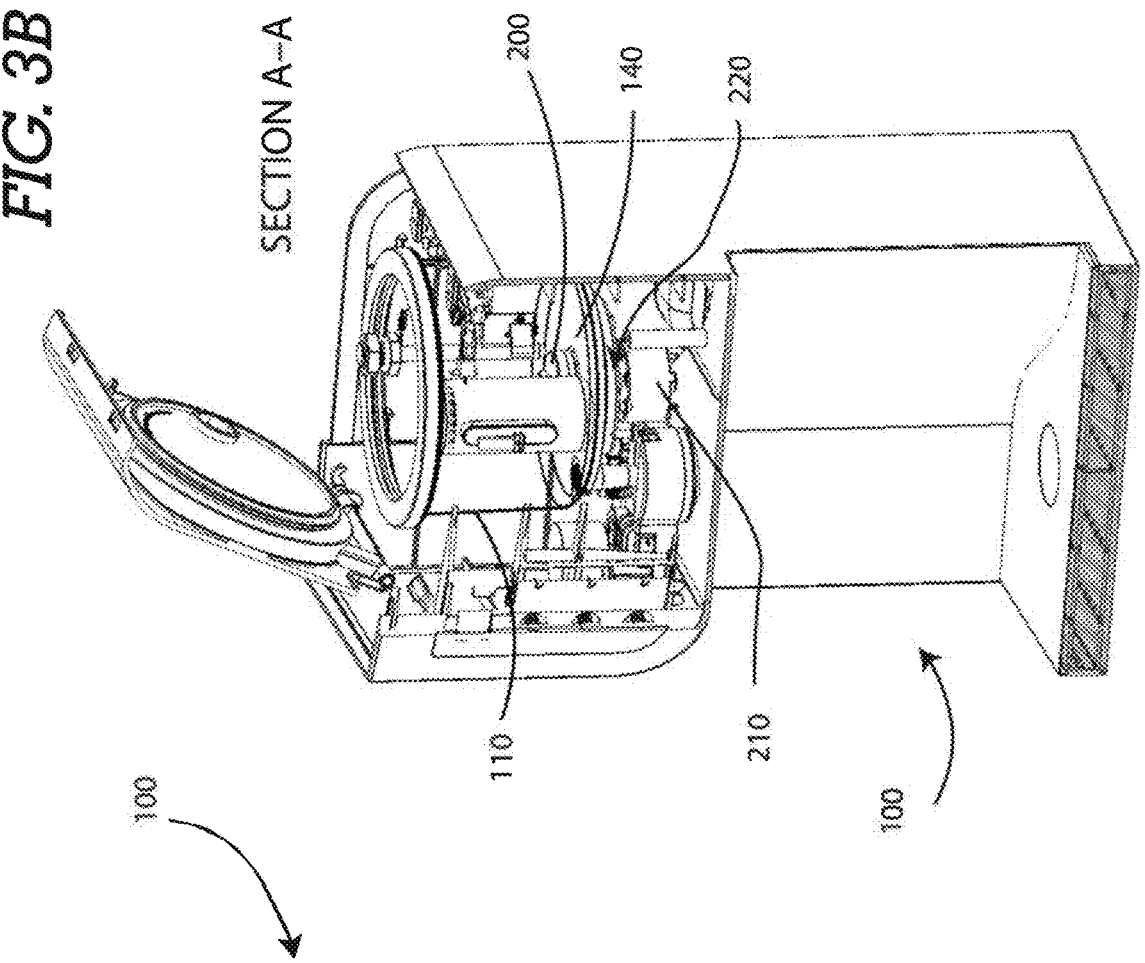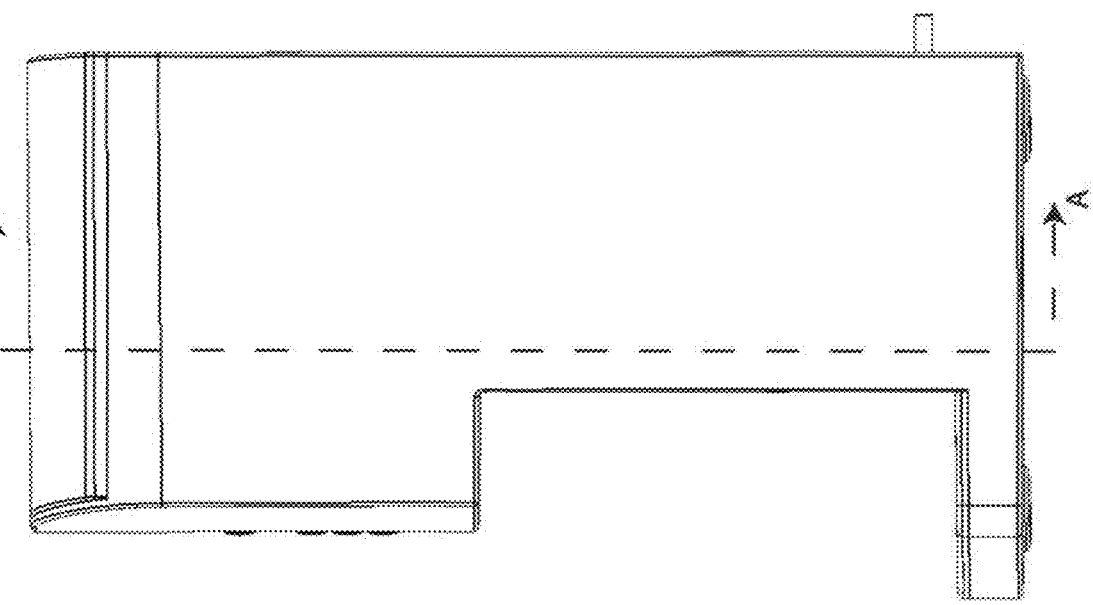

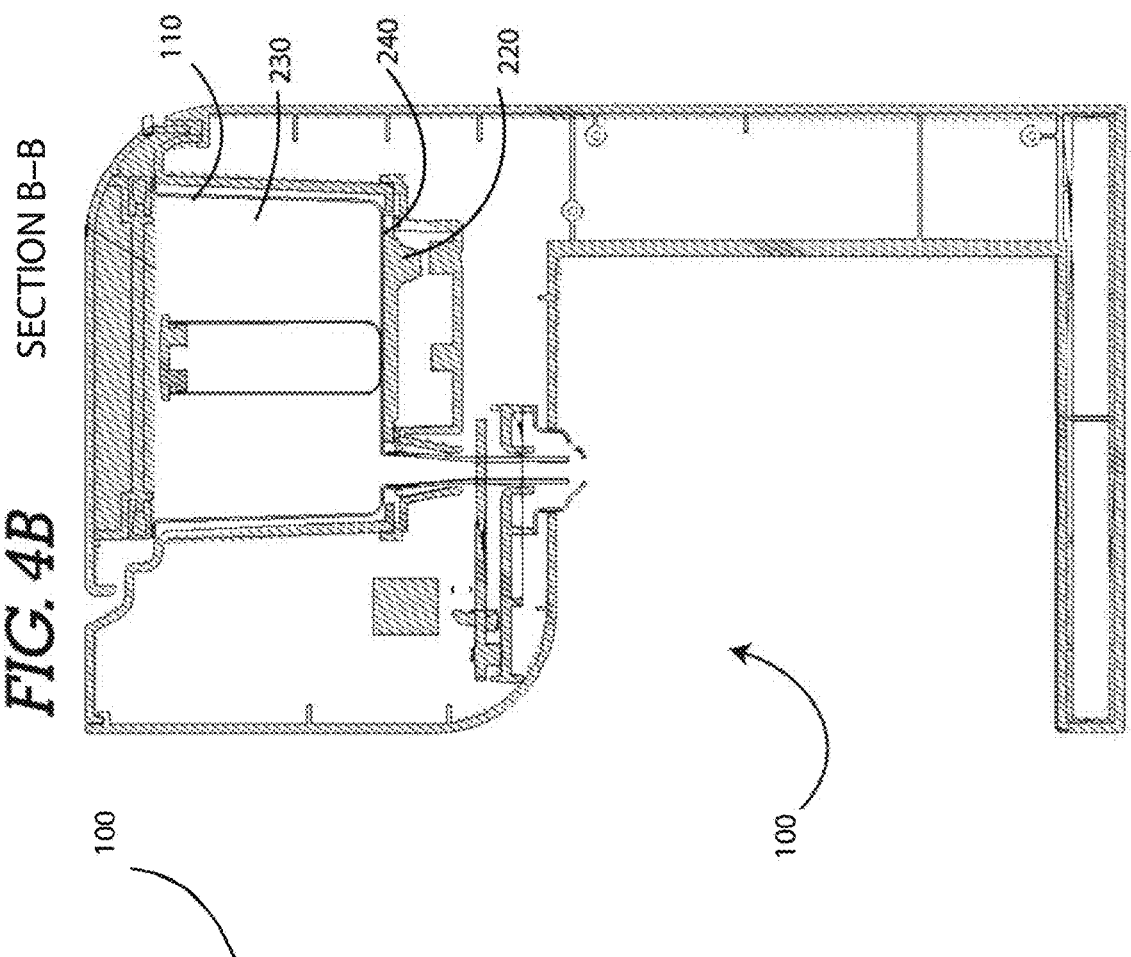
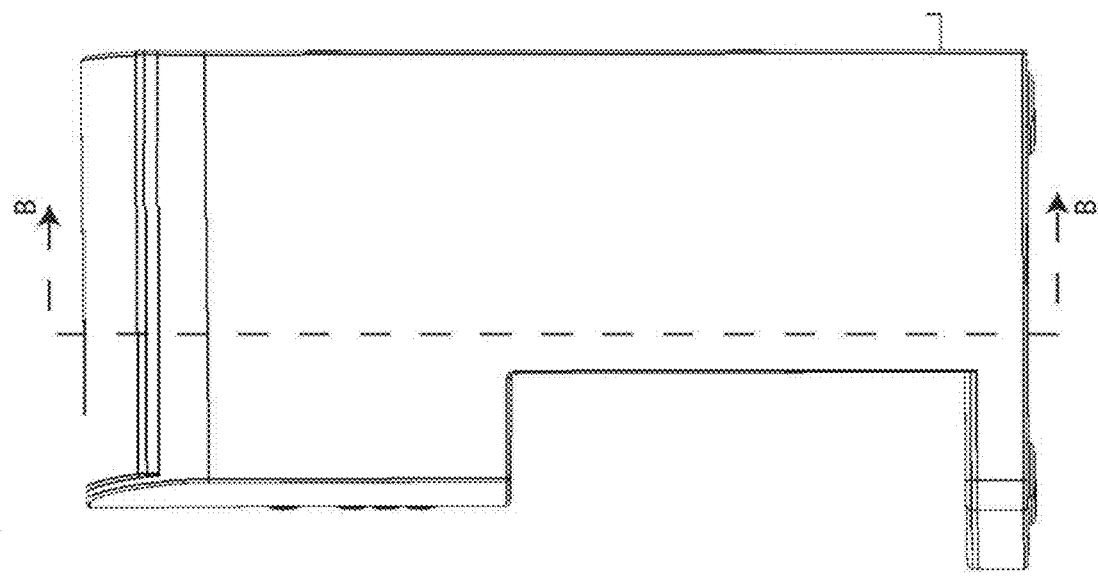

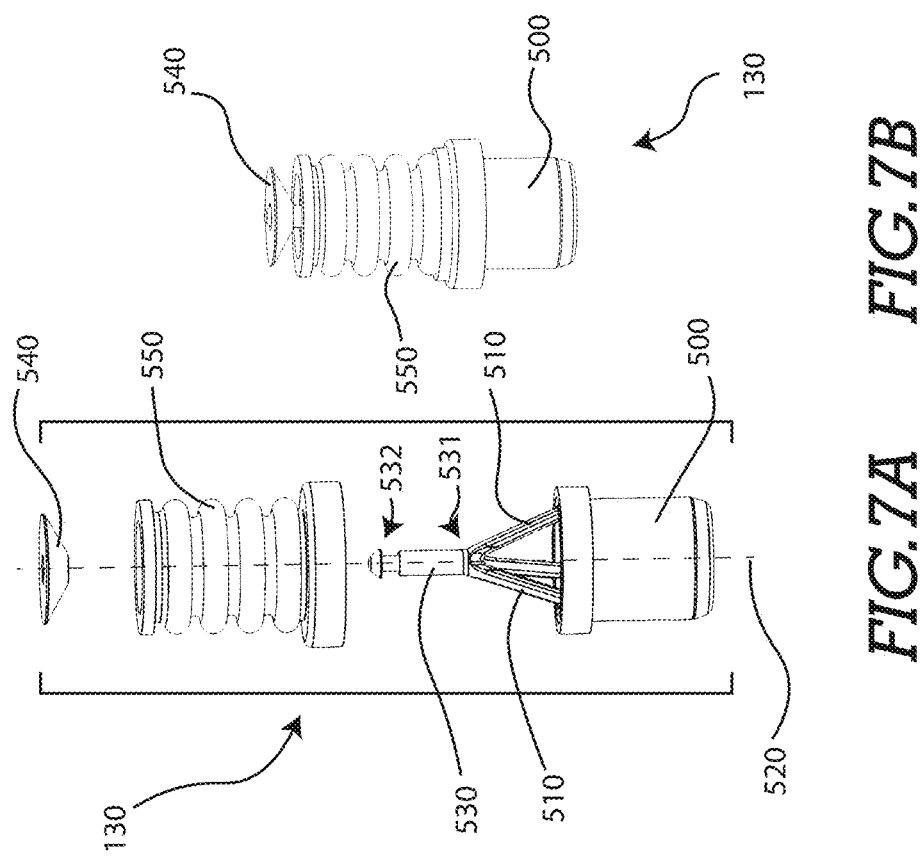
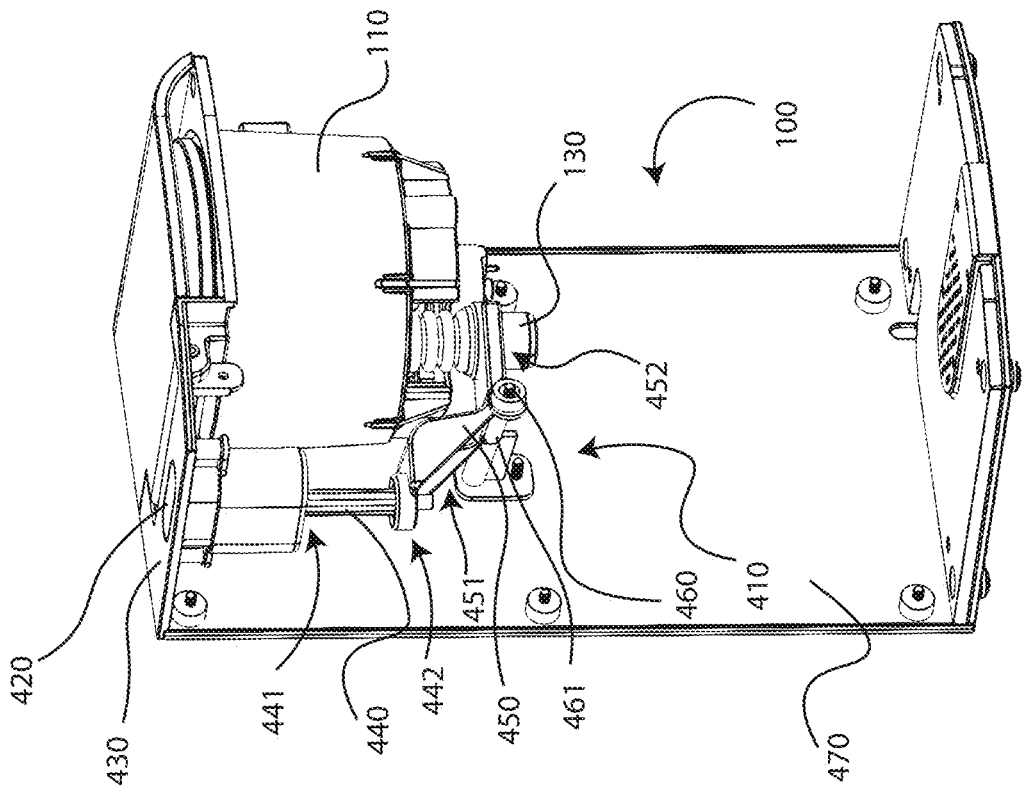
FIG. 7A    FIG. 7B
FIG. 6B

SECTION B-B

SECTION D-D

APPARATUS AND METHOD FOR INFUSING AND DISPENSING OILS, AND DRYING AND HEATING INFUSING MATERIALS

CROSS REFERENCE TO RELATED APPLICATIONS

This application is a Continuation in Part Application of U.S. patent application Ser. No. 16/915,523 entitled "Apparatus And Method For Infusing And Dispensing Oils, And Drying And Heating Infusing Materials" filed Jun. 29, 2020 and is currently pending, which is a continuation in part of Ser. No. 16/013,891, entitled "Apparatus And Method For Infusing And Dispensing Oils, And Drying And Heating Infusing Materials" filed Jun. 20, 2018, which is a Continuation in Part Application of U.S. patent application Ser. No. 15/711,242, entitled "Apparatus and Method for Infusing and Dispensing Oils" filed Sep. 21, 2017, which is a Divisional Application to U.S. patent application Ser. No. 15/428,765, filed Feb. 9, 2017, which claims priority to U.S. Provisional Patent Application No. 62/401,369 filed Sep. 29, 2016—the entirety of which is incorporated by reference herein. Furthermore, U.S. patent application Ser. No. 16/915,523 entitled "Apparatus And Method For Infusing And Dispensing Oils, And Drying And Heating Infusing Materials" filed Jun. 29, 2020 and is currently pending is also a continuation in part of U.S. patent application Ser. No. 16/188,702, entitled "Apparatus and Method for Infusing Oils"—currently pending—filed Nov. 13, 2018, which claims the benefit of U.S. Patent Application Ser. No. 62/587,011, filed Nov. 16, 2017—the entirety of which is incorporated by reference herein.

FIELD OF THE INVENTION

The present invention pertains in general to an apparatus and method for the infusing, agitation, and dispensation of oils in a controlled manner to produce a desired potency of an infusion while remaining below an identified maximum temperature threshold.

BACKGROUND OF THE INVENTION

Infusing is the process of transferring chemical compounds, nutrients, or flavors from plant-based material into a solvent, such as water, oil, or alcohol, by allowing the plant-based material to remain suspended in a solvent for a predetermined time and at a predetermined temperature. The resultant liquid produced from the infusion process is often called an "infusion." Infusing commonly connotes the use of plant-based matter that dissolve quickly or release their active ingredients easily into a solvent. Examples of plant-based matter include, but are not limited to, dried herbs, seeds, flowers, cannabis, or berries. Infusing solvents is a conventional practice in many fields including homeopathic medicine, the culinary arts, skincare, aromatherapy, beauty, alternative wellness, and beverage production.

As one of ordinary skill in the art will appreciate, the infusion process is often referred to as "steeping," a method that involves heating a liquid to a desired temperature, such as its boiling point, before the introduction of the plant-based material. The infusing material soaks in the liquid for a predetermined period of time dependent on the purpose for which the infusion is being prepared and the desired infusion potency. The length of time for steeping also depends upon ingredients used in the infusion. Some infusing processes may require minutes while others require days or weeks. The infusion is often strained to remove the spent plant-based material. The infusion may be consumed immediately or be bottled and stored for future use. Infusions are used in their native state or as an ingredient in a recipe or formula.

Typically, a solvent is exposed to infusing material contained in metal, plastic, or paper steeping device having permeable walls. Such steeping devices are filled with material then placed in the solvent for infusing, wherein the permeable walls allow for the passage of solvent and, thus, exposure to the infusing material. Although well-suited for fluids of low viscosity, this prior art steeping technology does not allow for proper fusion of oil-based solvents. More specifically, oil-based solvents are of higher viscosity and, thus often cannot flow through permeable walls suited for water or water-based solvents. Accordingly, to facilitate infusion, oil-based infusion processes commonly must be performed at increased temperatures to reduce their viscosity. Adding heat is also often desirable as it reduces processing time, but increased heat has drawbacks related to safety concerns associated with increase burn exposure.

As alluded to above, infusing chambers are often associated with a heater element and agitator. Some prior is are operatively interconnected to a lid of the infusing chamber, wherein a portion of the agitator extends into the infusing chamber when the lid is closed. The agitator helps accelerate and control the infusing process, especially when heat is also applied. In operation, the user adds oil-based solvent and often plant-based material to the infusing chamber which is then exposed to high temperatures by the heater element. Concurrently, the agitator churns the liquid and infusing material, which helps circulate the infusing material into the oil-based solvent. The agitator may be configured to pulverize material to increase its surface area, which exposes more of the material to the solvent and, thus, increases processes effectivity. After the infusing process is complete, the user removes the lid with the interconnected agitator, which may expose the user to hot liquid as it inevitably drips therefrom.

Another drawback with traditional agitator is that filtering material particulate from the infused solvent is often rendered difficult because the agitator creates an increased number of small particulates. One of ordinary skill in the art will appreciate that small particulate matter results in an unsightly and undesirable cloudy or dirty end product. Users must strain heated infusion, which is a cleanup issue and increases the probability of burn injuries. Some agitators used in prior art devices operatively mount to the bottom of the infusing chamber, a structure similar to that commonly found in blenders. One drawback of these types of arrangements is that residual oil-based solvent and infusing material may adhere to agitator components and make it difficult to clean the infusing chamber and agitator. Such contamination may also adversely affect future infusion processes.

To address this in other drawbacks with infusing systems of the prior art, some embodiments of the present invention provide an apparatus and method for infusing a solvent with a contained infusing material to produce an infusion of desired character and potency.

SUMMARY OF THE INVENTION

It is one aspect of some embodiments of the present invention to provide an infusing apparatus that employs an infusing chamber with an agitator component located on an interior surface thereof. The contemplated apparatus also employs a power supply, a computing device, a permeable compartment for receipt of infusing material, heating element, and a gravity-based drain. The apparatus also employs a permeable container for holding infusion material and, thus, allows for infusion while limiting the pulverization of infusing material and dispersion of spent materials in the solvent. The agitator of this embodiment is designed to permit easy removal of the infusing chamber from the infusing apparatus, which facilitates cleaning. In some embodiments of the present invention, the agitator is magnetically driven and provides churning from the bottom of the infusing chamber, which also addresses the drawbacks discussed above associated with gear or shaft-driven agitators. It may be desired in some embodiments of the present invention to limit the rotational speed of the agitator component to be below 200 rotations per minute (RPM), while in other embodiments it may be desired for the agitator component to be between about 70 and 90 RPM. Rotational speed limitation helps prevent cavitation that may result in solvent aeration and a cloudy end-product. While it is preferred that the agitator spins at a rate that to prevent aeration, it will be appreciated agitator RPM may be selectively adjusted.

It is another aspect of some embodiments of the present invention to provide a permeable compartment for receiving infusing material. The permeable compartment allows for solvents to flow therethrough without significant material pulverization and dispersion into the infusion. That is, the permeable compartments prevent the infusing material from escaping into the infusing chamber.

It will be appreciated that some embodiments of the present invention may alternatively utilize prepackaged units configured to hold infusing material, e.g., plant-based material. The contemplated prepackaged unit may comprise a permeable pod, cup, or another container that allows solvent the past therethrough. The prepackaged units may be prefilled and sold ready-to-use or packaged by the user with a desired infusing material. In some embodiments, the prepackaged unit may be selectively openable such that a user may supplement the infusing material provided by a third party. In one example, prepackaged units are filled, sealed, and delivered to a state that allows the sale of cannabinoids. Here, the end-user or secondary in-state seller has the ability to selectively open the prepackaged unit and add material that is otherwise illegal in other states. As one of ordinary skill in the art will appreciate, the prepackaged units may alternatively employ a temporary closure that is discarded in lieu of a permanent disclosure created by a secondary provider after the original infusing material mixture is modified. The prepackaged units may be configured to fit within a permeable compartment that is mounted in the infusing chamber. Alternatively, the prepackaged unit may be supported by a mount provided in the infusing chamber. It will be appreciated that the prepackaged units as contemplated herein may be reusable or disposable and may be constructed of biodegradable material.

The permeable compartment may be removably affixed to an inner surface of the infusing chamber. One benefit of removably affixing a compartment is an increased ease of filling with the plant-based material, for example. An ancillary benefit is that such a compartment can be removed for easy cleaning. The permeable compartment may be selectively affixed to the infusion chamber by way of one or more permanent or temporary magnets. One of ordinary skill in the art will appreciate that a combination of magnetic and ferromagnetic materials may be used without departing from the scope of the invention.

Again, the viscosity oil-based solvents decrease as the solvent temperature increases. Thus, it is advantageous to elevate the temperature of oil-based solvents to increase the flow through the permeable surface provided by the container. As used herein, "oils" may include, but is not limited to butter, animal fat, or plant-based oils. The heating elements provided by some embodiments control and maintain elevated temperatures of the solvent but not in excess of 100° C. (212° F.). Limiting the temperature of the solvent to 100° C. (212° F.) greatly reduces the risk of injury from contact with heated solvents, particularly oil-based solvents. Additionally, certain solvents such as butter and Flaxseed oil have material properties having a boiling point slightly above 100° C. (212° F.). In maintaining the temperature of the solvent to 100° C. (212° F.) or less, boiling and aeration are avoided.

Limiting maximum infusing process temperature is identical when using some temperature-sensitive infusing materials. More specifically, some infusing materials or solvents have a temperature threshold at which their chemical structure changes. Examples of such chemical structure changes include, but are not limited to, denaturation, unwanted enzymatic reactions or, unwanted hydrolytic reactions. Setting the infusing process to a particular temperature reduces unwanted changes in chemical compound of those infusing materials and solvents. Still, other materials rely on exposure to heat of a predetermined temperature to effect a desired chemical change. More specifically, some materials, such as cannabinoids, benefit from a decarbonization or decarboxylation process wherein temperature is raised above about 220-240° F. Decarbonization or decarboxylation "cracks" the material to release the often-desired cannabidiol (CBD) and/or tetrahydrocannabinol (THC) compounds into the solvent.

Some embodiments also provide a gravity-fed drain device that allows for solvent delivery after the infusing process is complete. The gravity-fed drain omits the need to pick up, tip, or otherwise handle or manipulate the infusing chamber or infusing apparatus. The gravity-fed drain device also limits the risk of injury due to contact with solvent and make cleanup easier. Other advantages of the gravity-fed drain device include aeration mitigation that can occur when solvent is dispensed from the infusing chamber. As mentioned briefly above, aeration is undesirable as it induces cloudiness into the finished product, which makes it appear cloudy or gray. Furthermore, solvent aeration is undesirable as the entrained air may accelerate spoilage. Some problems associated with air entrainment include lipid oxidation and potential microorganism growth. As such, aeration prevention within the solvent improves shelf life, quality and makes infused solvents safer for human consumption.

It is one aspect of some embodiments the present invention to provide an infusing apparatus that employees modular and removable components, such as the agitator component, permeable infusion material compartment, infusing chamber, and/or the gravity-fed drain for ease of cleaning. Some embodiments of the present invention of the invention use materials including, but not limited to Polyethylene (PE), copolyesters, Acrylonitrile Butadiene Styrene (ABS), Melamine, Nylon, Polypropylene (PP), Polystyrene (PS), Silicone, Glass, Ceramic, Stainless Steel or any other materials appreciated to be appropriate for cleaning in a dishwasher appliance.

It is one aspect of some embodiments of the present invention to provide a pod for receiving an infusing material, comprising: a permeable member having an open end; a cage configured to fit within the permeable member and generally maintain the permeable member in an expanded configuration, the cage having a plurality of openings and an upper portion with at least one inwardly-extending protrusion; and a clip having an upper surface and a lower surface configured to fit within the upper portion of the cage, wherein the lower surface engages the at least one protrusion to position a portion of the open end of the permeable member between the cage and the clip.

It is yet another aspect of some embodiments to provide an apparatus for infusing a solvent, comprising: a housing having an infusing chamber adapted to receive the solvent; a heating element associated with the infusing chamber; a drain associated with the infusing chamber; a removable pod interconnected to an inner surface of the infusing chamber, the pod adapted to a permeable member having an open end; a cage configured to fit within the permeable member and generally maintain the permeable pod in an expanded configuration, the cage having a plurality of openings and an upper portion with at least one inwardly-extending protrusion; a clip having a upper surface and a lower surface configured to fit within the upper portion of the cage, wherein the lower surface engages the at least one protrusion with a portion of the open end of the permeable member positioned therebetween; a cap with a portion configured to be inserted within the clip to close the permeable member; and a mount that selectively secures the pod to the infusing chamber.

It is still yet another aspect of some embodiments to provide a method of filling a pod with infusing material, comprising: providing a permeable member having an open end; inserting a cage within the permeable member; folding a top edge of the permeable member over an upper edge of the cage; and inserting a clip into the cage such that a lower edge of the clip is captured by the at least one protrusion, and wherein a portion of the permeable member is captured by the clip and the cage.

Further aspects of the present invention are provided in the following embodiments:

A pod for receiving an infusing material, comprising: a permeable member having an open end; a cage configured to fit within the permeable member and generally maintain the permeable member in an expanded configuration, the cage having a plurality of openings and an upper portion with at least one inwardly-extending protrusion; a clip having an upper surface and a lower surface configured to fit within the upper portion of the cage, wherein the lower surface engages the at least one protrusion to position a portion of the open end of the permeable member between the cage and the clip; and wherein the permeable member is a flexible bag made of mesh.

A pod for receiving an infusing material, comprising: a permeable member having an open end; a cage configured to fit within the permeable member and generally maintain the permeable member in an expanded configuration, the cage having a plurality of openings and an upper portion with at least one inwardly-extending protrusion; a clip having an upper surface and a lower surface configured to fit within the upper portion of the cage, wherein the lower surface engages the at least one protrusion to position a portion of the open end of the permeable member between the cage and the clip; and wherein the cage is comprised of first portion and a second portion.

A pod for receiving an infusing material, comprising: a permeable member having an open end; a cage configured to fit within the permeable member and generally maintain the permeable member in an expanded configuration, the cage having a plurality of openings and an upper portion with at least one inwardly-extending protrusion; a clip having an upper surface and a lower surface configured to fit within the upper portion of the cage, wherein the lower surface engages the at least one protrusion to position a portion of the open end of the permeable member between the cage and the clip; wherein the cage is comprised of first portion and a second portion; and wherein the first portion and the second portion are separated by a non-permeable wall.

A pod for receiving an infusing material, comprising: a permeable member having an open end; a cage configured to fit within the permeable member and generally maintain the permeable member in an expanded configuration, the cage having a plurality of openings and an upper portion with at least one inwardly-extending protrusion; a clip having an upper surface and a lower surface configured to fit within the upper portion of the cage, wherein the lower surface engages the at least one protrusion to position a portion of the open end of the permeable member between the cage and the clip; and further comprising a cap with a portion configured to be inserted within the clip.

A pod for receiving an infusing material, comprising: a permeable member having an open end; a cage configured to fit within the permeable member and generally maintain the permeable member in an expanded configuration, the cage having a plurality of openings and an upper portion with at least one inwardly-extending protrusion; a clip having an upper surface and a lower surface configured to fit within the upper portion of the cage, wherein the lower surface engages the at least one protrusion to position a portion of the open end of the permeable member between the cage and the clip; further comprising a cap with a portion configured to be inserted within the clip; and wherein the cap is integrated into the clip, the cap being configured to move from an open to a closed position.

A pod for receiving an infusing material, comprising: a permeable member having an open end; a cage configured to fit within the permeable member and generally maintain the permeable member in an expanded configuration, the cage having a plurality of openings and an upper portion with at least one inwardly-extending protrusion; a clip having an upper surface and a lower surface configured to fit within the upper portion of the cage, wherein the lower surface engages the at least one protrusion to position a portion of the open end of the permeable member between the cage and the clip; and wherein the cap employs a removable membrane.

A solvent, comprising: a housing having an infusing chamber adapted to receive the solvent; a heating element associated with the infusing chamber; a drain associated with the infusing chamber; a removable pod interconnected to an inner surface of the infusing chamber, the pod adapted to a permeable member having an open end; a cage configured to fit within the permeable member and generally maintain the permeable pod in an expanded configuration, the cage having a plurality of openings and an upper portion with at least one inwardly-extending protrusion; a clip having a upper surface and a lower surface configured to fit within the upper portion of the cage, wherein the lower surface engages the at least one protrusion with a portion of the open end of the permeable member positioned therebetween; a cap with a portion configured to be inserted within the clip to close the permeable member; a mount that selectively secures the pod to the infusing chamber; and wherein the permeable member is a flexible bag made of mesh.

A solvent, comprising: a housing having an infusing chamber adapted to receive the solvent; a heating element associated with the infusing chamber; a drain associated with the infusing chamber; a removable pod interconnected to an inner surface of the infusing chamber, the pod adapted to a permeable member having an open end; a cage configured to fit within the permeable member and generally maintain the permeable pod in an expanded configuration, the cage having a plurality of openings and an upper portion with at least one inwardly-extending protrusion; a clip having a upper surface and a lower surface configured to fit within the upper portion of the cage, wherein the lower surface engages the at least one protrusion with a portion of the open end of the permeable member positioned therebetween; a cap with a portion configured to be inserted within the clip to close the permeable member; a mount that selectively secures the pod to the infusing chamber; wherein the permeable member is a flexible bag made of mesh; and wherein the mount comprises a ring with an internal diameter of a dimension greater than a maximum outer dimension of the permeable member, and a greater than maximum outer dimension of the cage, and less than a maximum outer dimension of the clip.

A solvent, comprising: a housing having an infusing chamber adapted to receive the solvent; a heating element associated with the infusing chamber; a drain associated with the infusing chamber; a removable pod interconnected to an inner surface of the infusing chamber, the pod adapted to a permeable member having an open end; a cage configured to fit within the permeable member and generally maintain the permeable pod in an expanded configuration, the cage having a plurality of openings and an upper portion with at least one inwardly-extending protrusion; a clip having a upper surface and a lower surface configured to fit within the upper portion of the cage, wherein the lower surface engages the at least one protrusion with a portion of the open end of the permeable member positioned therebetween; a cap with a portion configured to be inserted within the clip to close the permeable member; a mount that selectively secures the pod to the infusing chamber; wherein the permeable member is a flexible bag made of mesh; and wherein the mount is selectively interconnected to the infusing chamber.

A solvent, comprising: a housing having an infusing chamber adapted to receive the solvent; a heating element associated with the infusing chamber; a drain associated with the infusing chamber; a removable pod interconnected to an inner surface of the infusing chamber, the pod adapted to a permeable member having an open end; a cage configured to fit within the permeable member and generally maintain the permeable pod in an expanded configuration, the cage having a plurality of openings and an upper portion with at least one inwardly-extending protrusion; a clip having a upper surface and a lower surface configured to fit within the upper portion of the cage, wherein the lower surface engages the at least one protrusion with a portion of the open end of the permeable member positioned therebetween; a cap with a portion configured to be inserted within the clip to close the permeable member; a mount that selectively secures the pod to the infusing chamber; and wherein the mount is interconnected to an internal side wall of the infusing chamber, and further comprising an agitator positioned within the infusing chamber and operatively interconnect at a center point of a bottom surface of the infusing chamber.

A solvent, comprising: a housing having an infusing chamber adapted to receive the solvent; a heating element associated with the infusing chamber; a drain associated with the infusing chamber; a removable pod interconnected to an inner surface of the infusing chamber, the pod adapted to a permeable member having an open end; a cage configured to fit within the permeable member and generally maintain the permeable pod in an expanded configuration, the cage having a plurality of openings and an upper portion with at least one inwardly-extending protrusion; a clip having a upper surface and a lower surface configured to fit within the upper portion of the cage, wherein the lower surface engages the at least one protrusion with a portion of the open end of the permeable member positioned therebetween; a cap with a portion configured to be inserted within the clip to close the permeable member; a mount that selectively secures the pod to the infusing chamber; and wherein the cap is integrated into the clip, the cap being configured to move from an open to a closed position.

A solvent, comprising: a housing having an infusing chamber adapted to receive the solvent; a heating element associated with the infusing chamber; a drain associated with the infusing chamber; a removable pod interconnected to an inner surface of the infusing chamber, the pod adapted to a permeable member having an open end; a cage configured to fit within the permeable member and generally maintain the permeable pod in an expanded configuration, the cage having a plurality of openings and an upper portion with at least one inwardly-extending protrusion; a clip having a upper surface and a lower surface configured to fit within the upper portion of the cage, wherein the lower surface engages the at least one protrusion with a portion of the open end of the permeable member positioned therebetween; a cap with a portion configured to be inserted within the clip to close the permeable member; a mount that selectively secures the pod to the infusing chamber; and wherein the cap employs a removable membrane.

A solvent, comprising: a housing having an infusing chamber adapted to receive the solvent; a heating element associated with the infusing chamber; a drain associated with the infusing chamber; a removable pod interconnected to an inner surface of the infusing chamber, the pod adapted to a permeable member having an open end; a cage configured to fit within the permeable member and generally maintain the permeable pod in an expanded configuration, the cage having a plurality of openings and an upper portion with at least one inwardly-extending protrusion; a clip having a upper surface and a lower surface configured to fit within the upper portion of the cage, wherein the lower surface engages the at least one protrusion with a portion of the open end of the permeable member positioned therebetween; a cap with a portion configured to be inserted within the clip to close the permeable member; a mount that selectively secures the pod to the infusing chamber; and wherein the cage is comprised of first portion and a second portion.

A solvent, comprising: a housing having an infusing chamber adapted to receive the solvent; a heating element associated with the infusing chamber; a drain associated with the infusing chamber; a removable pod interconnected to an inner surface of the infusing chamber, the pod adapted to a permeable member having an open end; a cage configured to fit within the permeable member and generally maintain the permeable pod in an expanded configuration, the cage having a plurality of openings and an upper portion with at least one inwardly-extending protrusion; a clip having a upper surface and a lower surface configured to fit within the upper portion of the cage, wherein the lower surface engages the at least one protrusion with a portion of the open end of the permeable member positioned therebetween; a cap with a portion configured to be inserted within the clip to close the permeable member; a mount that selectively secures the pod to the infusing chamber; wherein the cage is comprised of first portion and a second portion;

and wherein the first portion and the second portion are separated by a non-permeable wall.

A method of filling a pod with infusing material, comprising: providing a permeable member having an open end; inserting a cage within the permeable member; folding a top edge of the permeable member over an upper edge of the cage; and inserting a clip into the cage such that a lower edge of the clip is captured by the at least one protrusion, wherein a portion of the permeable member is captured by the clip and the cage; and wherein the pod further comprises a cap with a portion configured to be inserted within the clip to seal the permeable member.

A method of filling a pod with infusing material, comprising: providing a permeable member having an open end; inserting a cage within the permeable member; folding a top edge of the permeable member over an upper edge of the cage; and inserting a clip into the cage such that a lower edge of the clip is captured by the at least one protrusion, wherein a portion of the permeable member is captured by the clip and the cage; and wherein the cage is comprised of a first portion and a second portion, and wherein the first portion is filled with a first infusing material at one geographic location and the second portion is filled with a second infusing material at a second geographic location.

A method of filling a pod with infusing material, comprising: providing a permeable member having an open end; inserting a cage within the permeable member; folding a top edge of the permeable member over an upper edge of the cage; and inserting a clip into the cage such that a lower edge of the clip is captured by the at least one protrusion, wherein a portion of the permeable member is captured by the clip and the cage; and wherein the cage is comprised of a first portion and a second portion, wherein the first portion is filled with a first infusing material at one geographic location and the second portion is filled with a second infusing material at a second geographic location; and wherein the second infusing material is illegal in the first geographic location.

It is an aspect of certain embodiments of the present invention to provide a drying process wherein a user is able to deposit fresh plant-based material, or other material which the user wishes to dehydrate, within the unit for drying. In certain embodiments the drying process functionality includes an air circulating device, such as a fan, configured to provide air exchange to accelerate the drying process.

Due to the variety of liquids that can be used to infuse plant-based material, a unit configured to dispense a low viscosity liquid would not be ideal for the dispensation of a high liquid. For example, the dispensing of an infused aqueous solution, an infused oil-based solution, and an infused honey would require different apertures for gravity-fed dispensing. Accordingly, it is an aspect of certain embodiments of the present invention to adjust settings, such as an aperture diameter or aperture cross-sectional area to provide a user with appropriate dispensing capabilities and appropriate dispensing of liquids in a desired amount of time.

It is an aspect of certain embodiments of the present invention to provide a plurality of dispensing modes wherein each dispensing mode is configured for a different viscosity range wherein the aperture cross-section is limited dependent upon the viscosity of the liquid being dispensed.

It will be appreciated by those skilled in the art that although a heating and agitating method of infusing is appropriate for many compounds, it may be desired to infuse a liquid without the use of heat in relation to safety considerations, or concern surrounding affecting the taste or chemical nature of the liquid or plant-based material used for infusing the liquid. It is an aspect of certain embodiments to comprise ultrasonic agitation for purposes of infusing a fluid with plant-based material. In certain embodiments, the ultrasonic agitation allows the infusion of a liquid with plant-based material without added heat and without an agitator. Thereby reducing the possibility of chemically affecting the liquid or plant-based material and reducing the chances of entraining air-bubbles within the fluid.

In certain scenarios, it may be desired for a user to infuse a liquid without the use of heat as the application of heat may denature or otherwise negatively affect the liquid or the plant-based material resulting in less than desirable results.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. As will be appreciated, other embodiments of the invention are possible using, alone or in combination, one or more of the features set forth above or described below. Moreover, references made herein to "the present invention" or aspects thereof should be understood to mean some embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

BRIEF DESCRIPTION OF FIGURES

The accompanying drawings, which are incorporated in and constitute a part of the specification, illustrate embodiments of the invention and together with the general description of the invention given above and the detailed description of the drawings given below, serve to explain the principles of these inventions.

FIG. 27B—A side view of a pod of certain embodiments

FIG. 27C—A perspective view of a pod of certain embodiments in a semi-assembled state FIG. 27D—An exploded perspective view of a pod of certain embodiments FIG. 28—A perspective view of certain embodiments of the present invention FIG. 29A—An isolated perspective view of an infusing chamber of certain embodiments of the present invention FIG. 29B—A front isolated view of an infusing chamber of certain embodiments of the present invention FIG. 29C—A section view of the embodiment of the present invention shown in FIG. 29B FIG. 29D—A section view of the embodiment of the present invention shown in FIG. 29B demonstrating air-flow patterns FIG. 30—A perspective exploded view of a permeable container of certain embodiments of the present invention

DETAILED DESCRIPTION

Figure 1A:
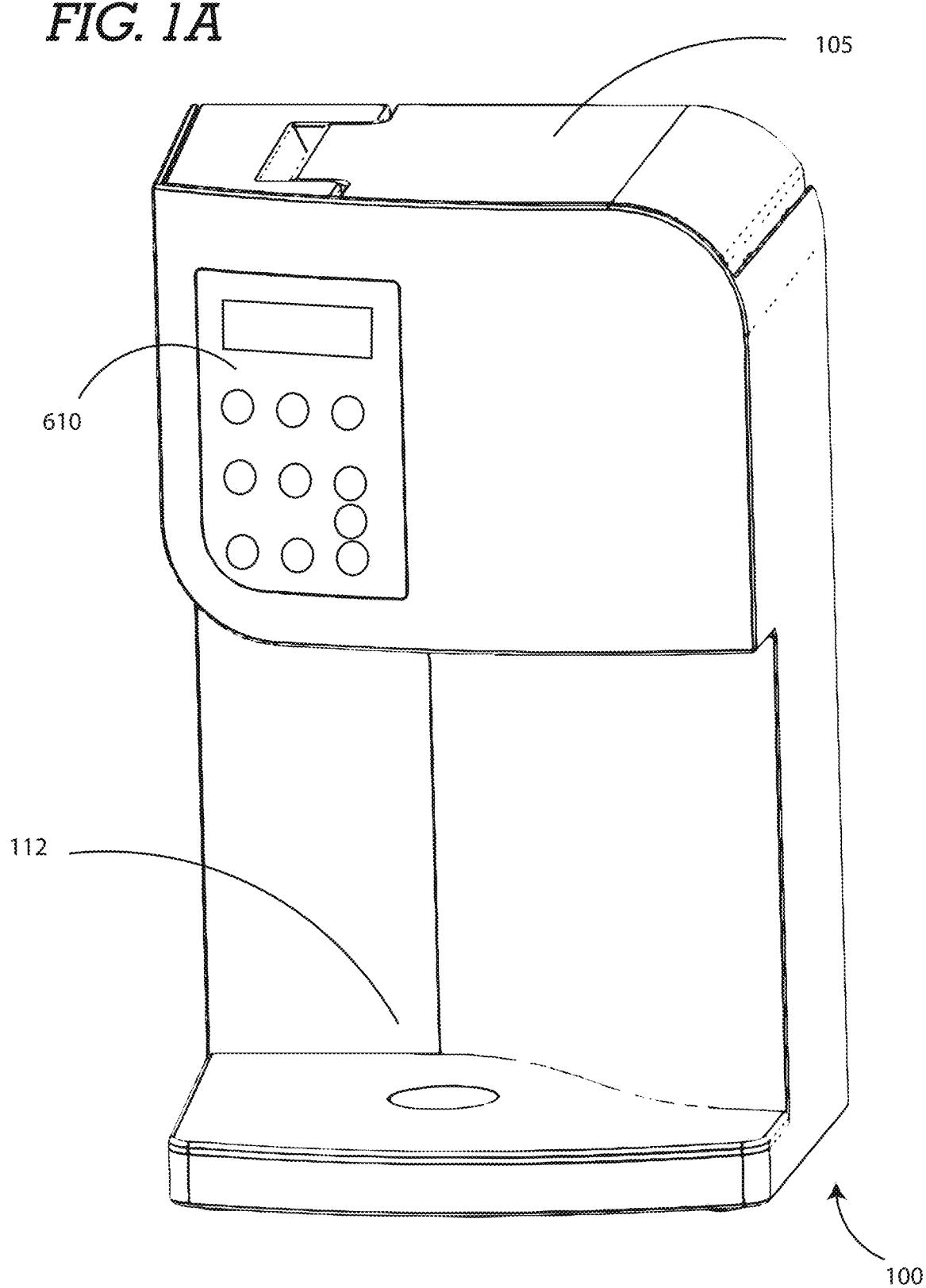
FIG. 1A—Perspective view of certain embodiments of a front of an infusing apparatus FIG. 1B—Perspective overhead view of certain embodiments of an infusing apparatus in an open configuration FIG. 2—Perspective overhead view of certain embodiments of an infusing apparatus in an open configuration FIG. 3A—Side view of certain embodiments of an infusing apparatus FIG. 3B—Perspective Cross-sectional view of certain embodiments of an infusing apparatus FIG. 4A—Side view of certain embodiments of an infusing apparatus FIG. 4B—Front Cross-sectional view of certain embodiments of an infusing apparatus FIG. 5—Certain embodiments of a temperature control loop FIG. 6A—Transparent perspective view of certain embodiments of an infusing chamber FIG. 6B—Perspective view of an infusing apparatus showing a drain device and actuating mechanism FIG. 7A—Exploded view of certain embodiments of a gravity-fed drain device FIG. 7B—Assembled view of certain embodiments of a gravity-fed drain device FIG. 8—Perspective cross-sectional view of certain embodiments of an infusing apparatus FIG. 9A—Perspective view of certain embodiments of a closure mechanism in a closed-state FIG. 9B—Perspective view of certain embodiments of a closure mechanism in an open-state FIG. 10—Perspective transparent view of an infusing chamber FIG. 11—Embodiments of a method for infusing a solvent FIG. 12A—A perspective view of an agitator of certain embodiments FIG. 12B—A top view of an agitator of certain embodiments FIG. 13—A process flow diagram for the control for the operation of an apparatus in certain embodiments FIG. 14A—A cross sectional front view of an apparatus of certain embodiments FIG. 14B—An enlarged cross sectional front view of an apparatus of certain embodiments FIG. 15A—A perspective view of an oblong permeable container of certain embodiments FIG. 15B—A top view of an oblong permeable container of certain embodiments FIG. 15C—A top view of an apparatus of certain embodiments comprising an oblong permeable container FIG. 16A—A perspective view of a rack of certain embodiments FIG. 16B—A perspective view of a rack of certain embodiments FIG. 17—A perspective front view of an apparatus of certain embodiments FIG. 18A—A perspective front view of an apparatus of certain embodiments FIG. 18B—A perspective rear view of an apparatus of certain embodiments FIG. 19—An exploded view a pod for storing infusing material used by certain embodiments of the present invention FIG. 20—The pod shown in FIG. 19 shown in a semi-assembled state FIG. 21—A cage used in the pod shown in FIG. 19
Figure 1B:
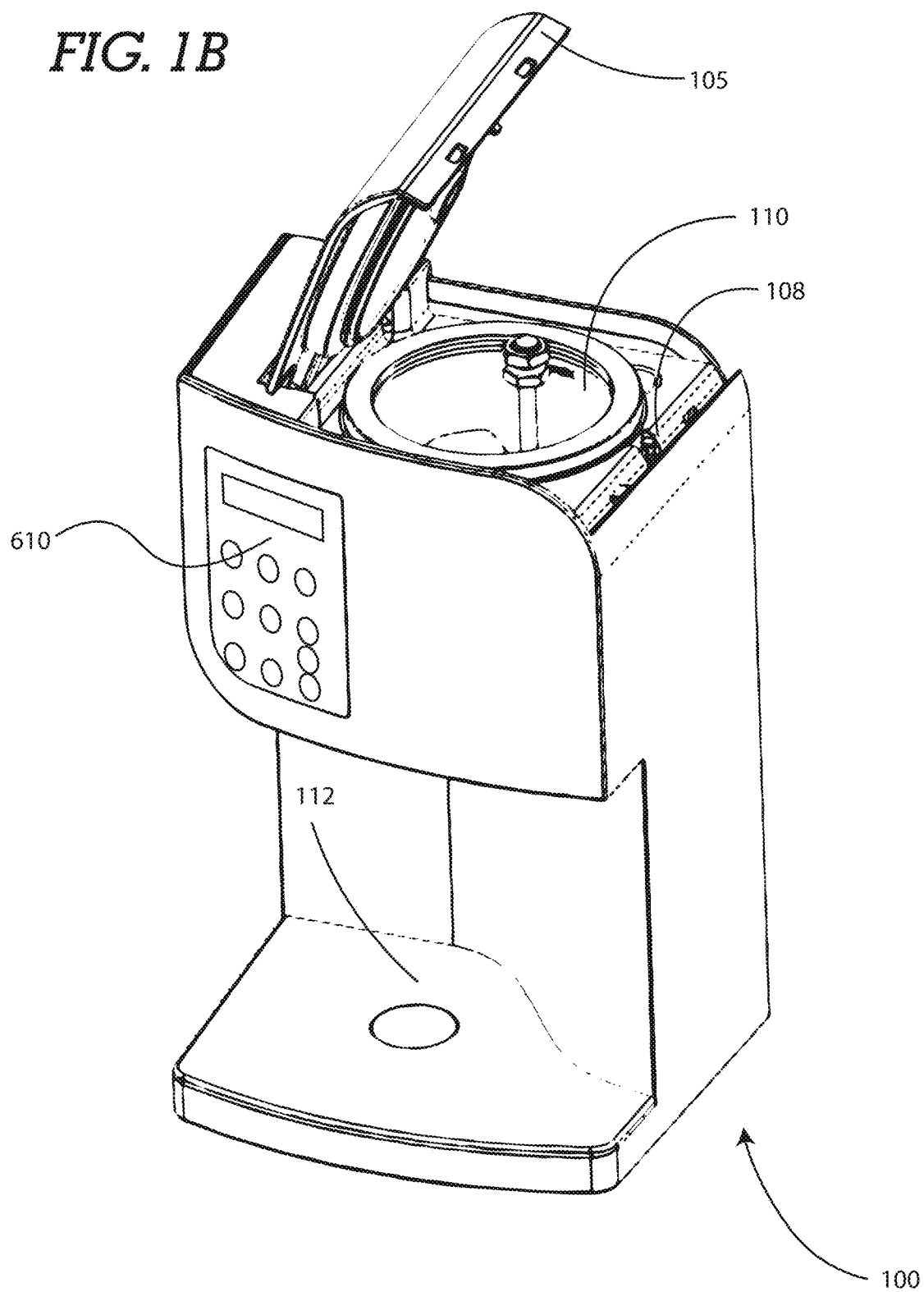

Certain embodiments of an infusing apparatus 100, seen in FIG. 1A and FIG. 1B, are configured for the infusing of solvents, including oil-based solvents. Such embodiments comprise a user interface panel 610, a hinged lid 105, and a dispensing area 112 for draining solvent after an infusing process. Certain embodiments, as shown in FIG. 1B further comprise a lid-release mechanism 108 and an infusing chamber 110. It will be appreciated that in certain embodiments a user interface panel 610 comprises a printed circuit board (PCB), central processing unit (CPU), or other computing device to provide control, sensing, and programming capabilities to the infusing apparatus 100.

Figure 2:
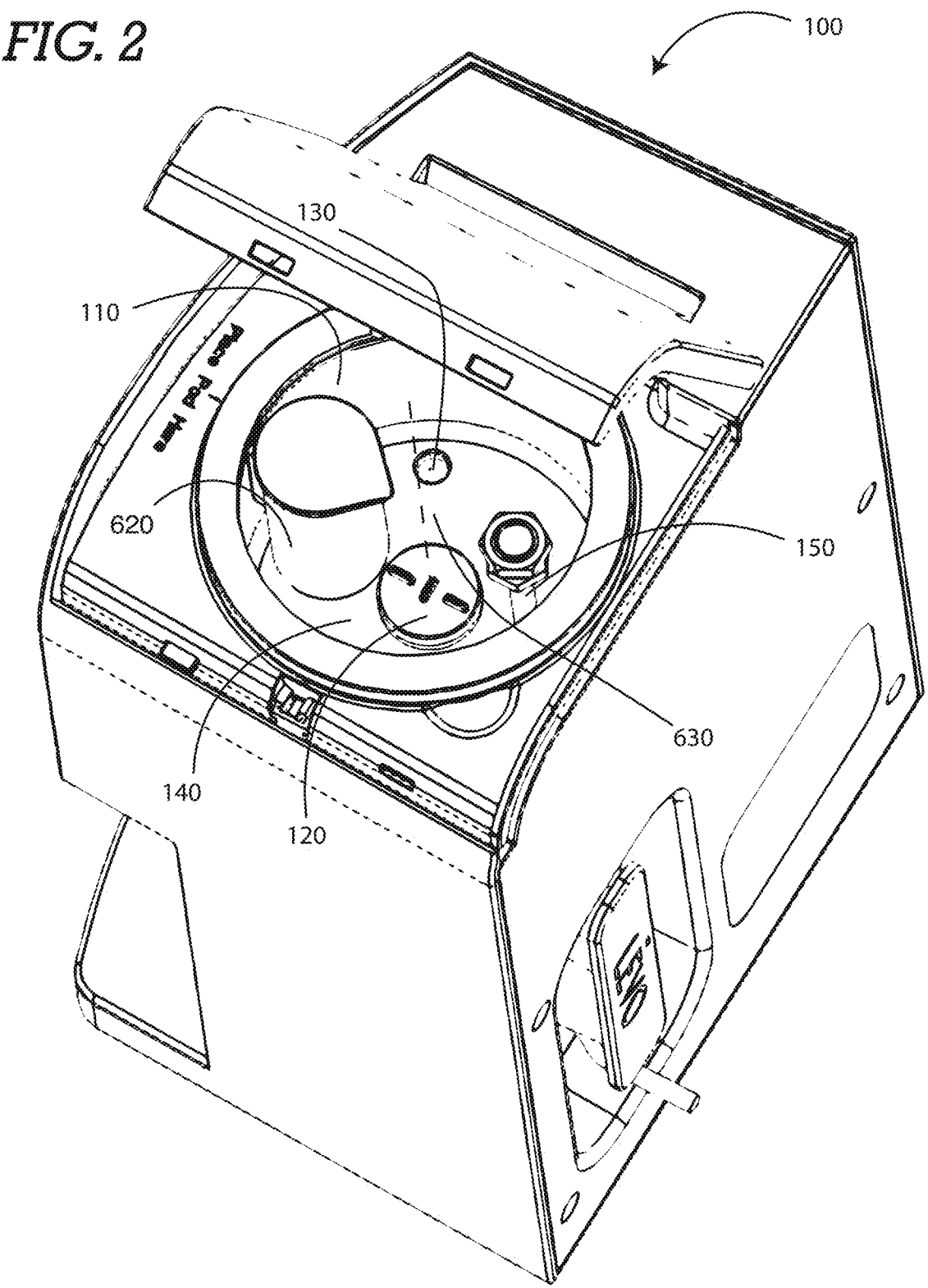

Certain embodiments, as seen in FIG. 2, comprise an infusing chamber 110, an agitator component 120, and a gravity-fed drain device. In such embodiments, the infusing chamber 110 is configured as a shell form to receive a volume of solvent for the infusing process. The agitator component 120, disposed on a bottom surface 140 of the infusing chamber 110 provides churning through rotational movement about an axis 135. The gravity-fed drain device of the infusing apparatus 100 is configured to allow the dispensation of a solvent held within the infusing apparatus 100 without the need to pick up, tip over or otherwise manipulate the infusing apparatus 100.

In certain embodiments of an infusing apparatus 100 comprising an agitator component 200, referencing FIG. 3A and FIG. 3B, the agitator component 200 further comprises a magnetically actuated agitator. The magnetically actuated agitator comprises an agitator component 200 having magnetic characteristics. The agitator component 200 is spun using a rotating magnetic field proximal to the agitator component 200. In certain embodiments, the agitator component 200 rests on the internal bottom surface 140 of the infusing chamber 110 while a rotating magnetic field component 210 rests on an external side of a bottom surface 140 of the infusing chamber 110. Such an agitator component 200, is configured to mix and induce a rotational flow of solvent without the pulverization of the infusing material. Furthermore, such an agitator component 200 may be coated with a chemically inert coating, such as a polymer or ceramic material. It will be appreciated to those skilled in the art that an agitator component 200 may be spun using a rotating magnet in close proximity to the agitator component as disclosed in U.S. Pat. No. 2,350,534 ("the '534 Patent") to Rosinger, herein incorporated by reference. Alternatively, it will be further appreciated by those skilled in the art that an agitator component 200 may be spun using a stationary electromagnet with a rotating electromagnetic field as disclosed in U.S. Pat. No. 1,242,493 ("the '493 Patent") to Stringham, herein incorporated by reference.

Figure 12A:
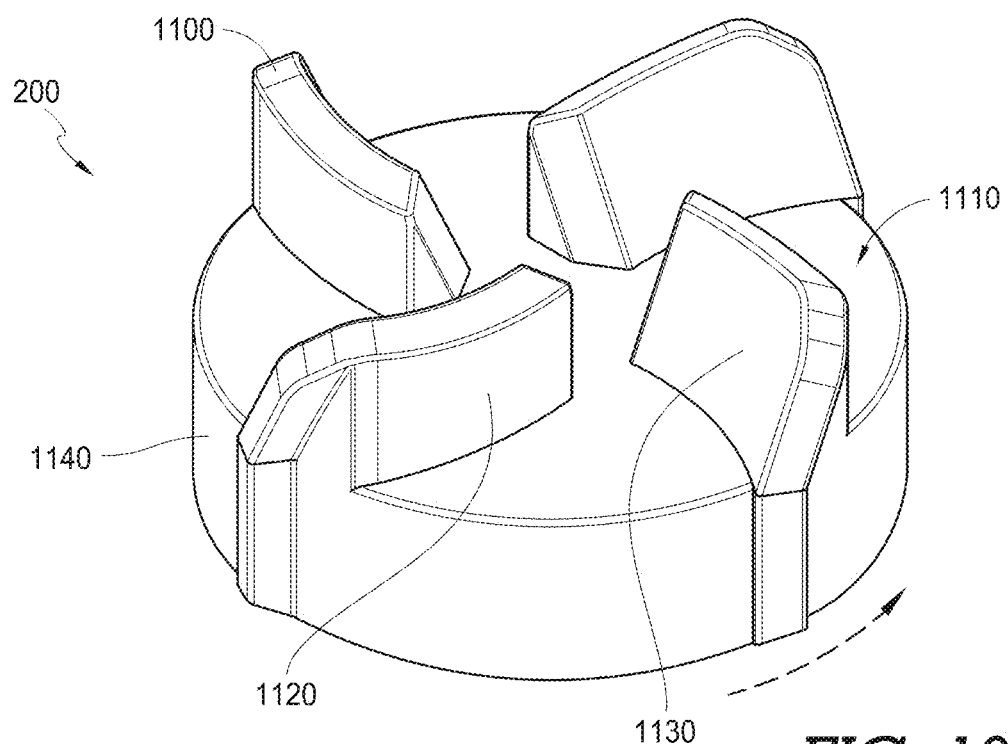
Figure 12B:
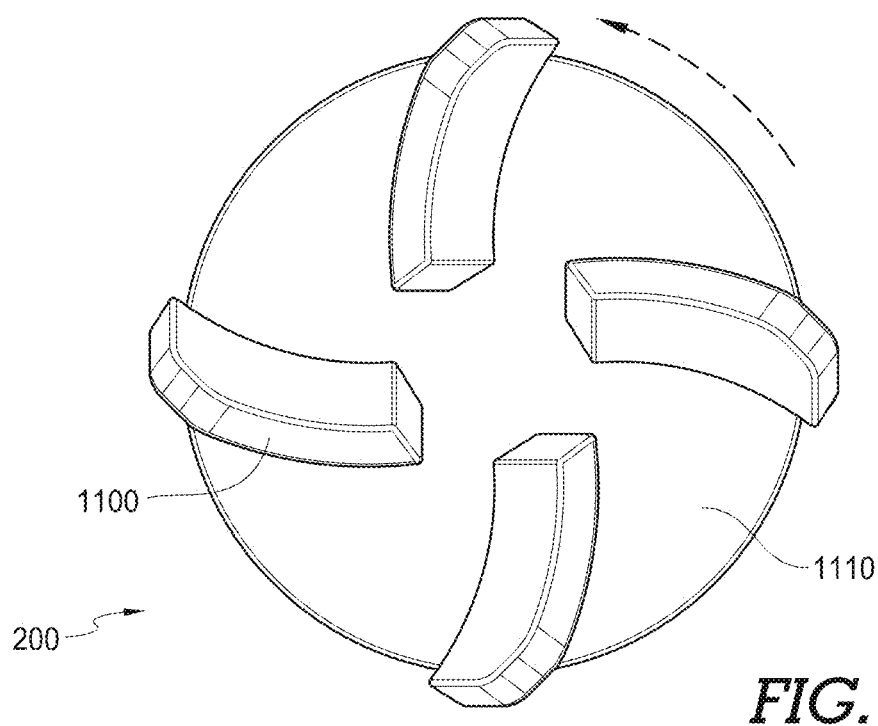

In certain embodiments of the present invention, shown in FIG. 12A-FIG. 12B, an agitator component 200 comprises fins 1100 having a radial curvature. The fins 1100, affixed to a top surface 1110 of the agitator component, are distributed radially around the agitator component 200. The agitator component 200 is rotated in a direction such that the convex curvature 1120 of each fin 1100 is presented as a leading edge, and the concave curvature 1130 of the fins are presented as a trailing edge. The curvature of the fins 1100 of the agitator is configured to allow increased stirring speeds with increased stirring and agitation ability while mitigating cavitation and air entrainment into an infusing solvent.

Certain embodiments comprise an agitator component 200 with fins 1100 having a radial curvature, with fins 1100 extending to a side surface 1140 or perimetral surface of the agitator component.

Certain embodiments of the present invention, as shown in FIGS. 3A and 3B further comprise a heater component 220 to provide heat to a solvent held by an infusing chamber. The heater component 220 serves to provide thermal energy to a solvent during the infusing process. It will be appreciated that such a heater component 220 may provide heat directly to a solvent held within the infusing chamber 110. It will be further appreciated that alternative forms of such a heater component 220, as seen in FIG. 4A and FIG. 4B, may provide heat to the solvent 230 indirectly by providing heating energy external to the infusing chamber 110. In certain embodiments, the heater component 220 is external to the infusing chamber 110 in close proximity to or in contact with the bottom external surface 240 of the infusing chamber 110. In such embodiments the heater component 220 applies heat energy to the infusing chamber 110 which transfers through infusing chamber 110 to the solvent 230 by way of conduction, convection, and/or radiation.

Figure 5:
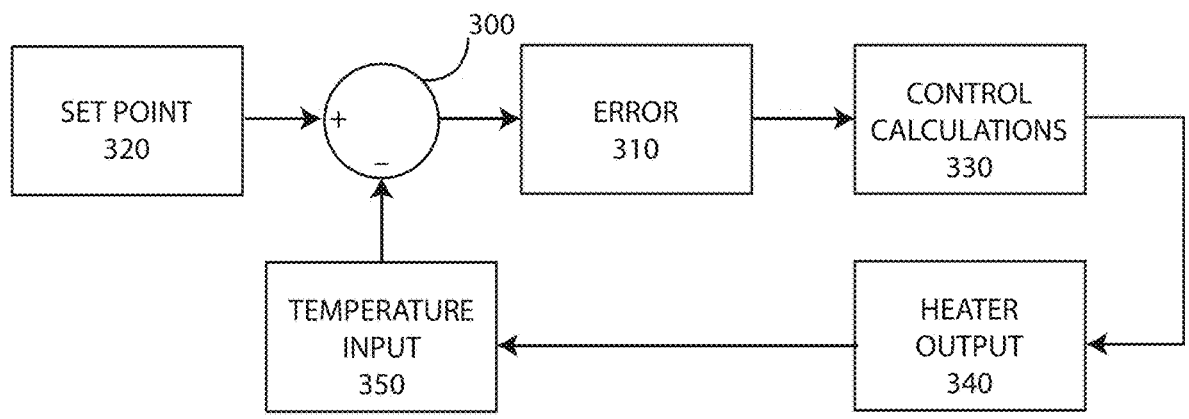

Certain embodiments, as seen in FIG. 2, comprise a temperature measuring device 150 that measures the temperature of a solvent held within the infusing chamber 110. It will be appreciated by those skilled in the art, that the measurement of temperature may be output to a temperature controller such as a thermostat. In certain embodiments, a temperature controller 300, as seen in FIG. 5, receives temperature input 350 in the form of an electrical signal from the temperature measuring device 150 shown in FIG. 2. The temperature input 350 by the temperature controller 300 to determine the error 310 between the temperature input 350 and the desired set-point 320. The temperature controller 300 then performs control calculations 330 to determine the electrical output to control the heater output 340. It will be appreciated that a device maintaining the temperature of a solvent 230 may comprise a proportional-integral-derivative (PID) controller, thermostat or other temperature control devices known to those known in the art. It will be appreciated that a PID controller in such embodiments continuously calculates an error value as the difference between a desired set point temperature and a measured temperature. The PID controller then attempts to minimize the error value over time by adjustment of the power supplied to the heater component.

It will be appreciated that a first temperature measuring device 150, as seen in FIG. 2 may comprise different forms including but not limited to an infrared thermometer, a thermistor, a thermocouple or other temperature measuring devices known to those skilled in the art. In certain embodiments, a first temperature measuring device and a second temperature device provide increased controllability of the internal volume of the infusing chamber 110.

Figure 14A:
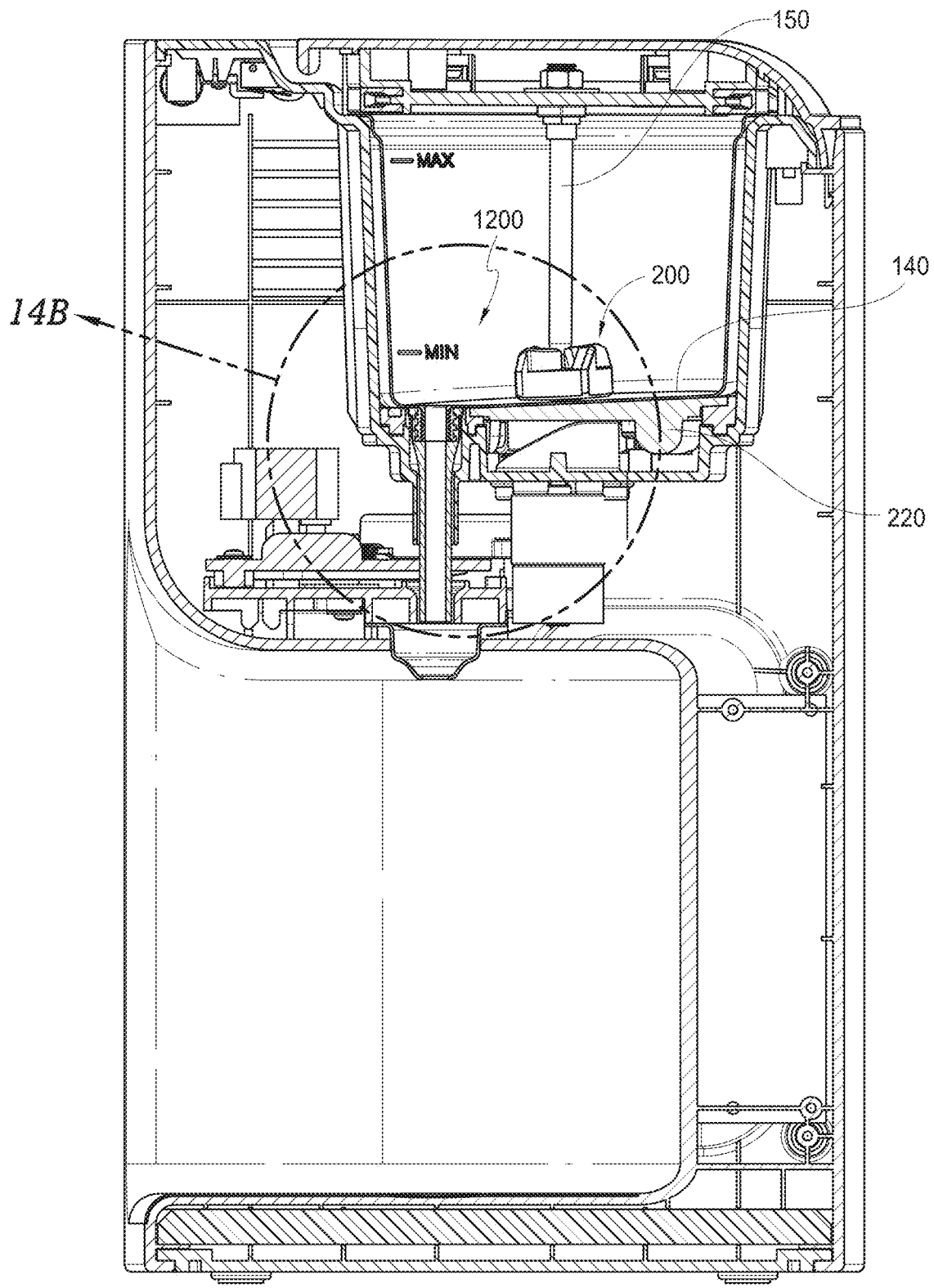
Figure 14B:
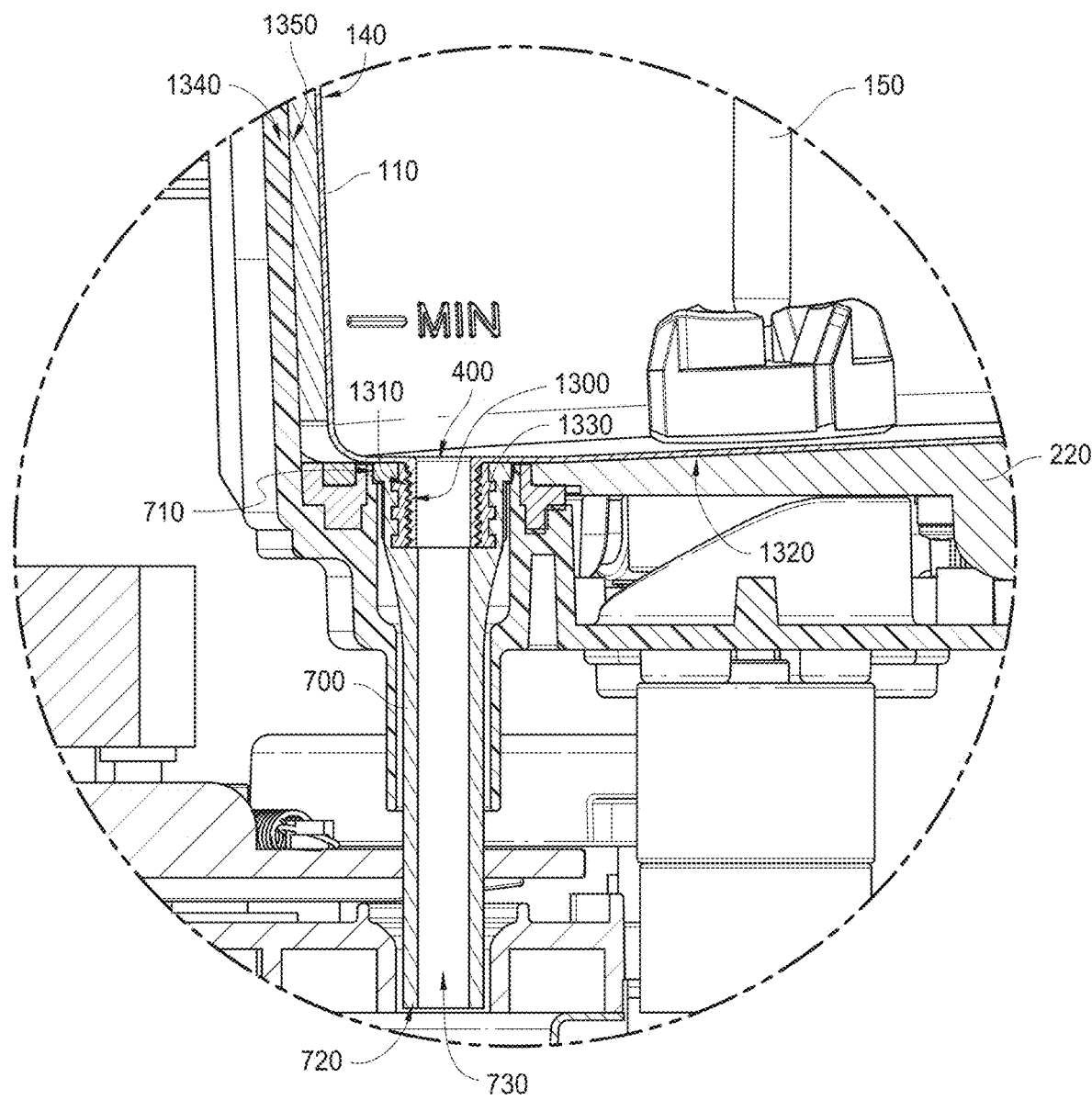

Certain embodiments, shown in FIG. 14A-FIG. 14B comprise a first temperature measuring device 150 in communication with a first temperature controller, and a second temperature measuring device 150 in communication with a second temperature controller. In certain embodiments, the first temperature measuring device 150 (not shown) is in thermal communication with the bottom surface 140 of the infusing chamber, while the second temperature measuring device 150 is in communication with the internal volume of the infusing chamber 110.

Figure 13:
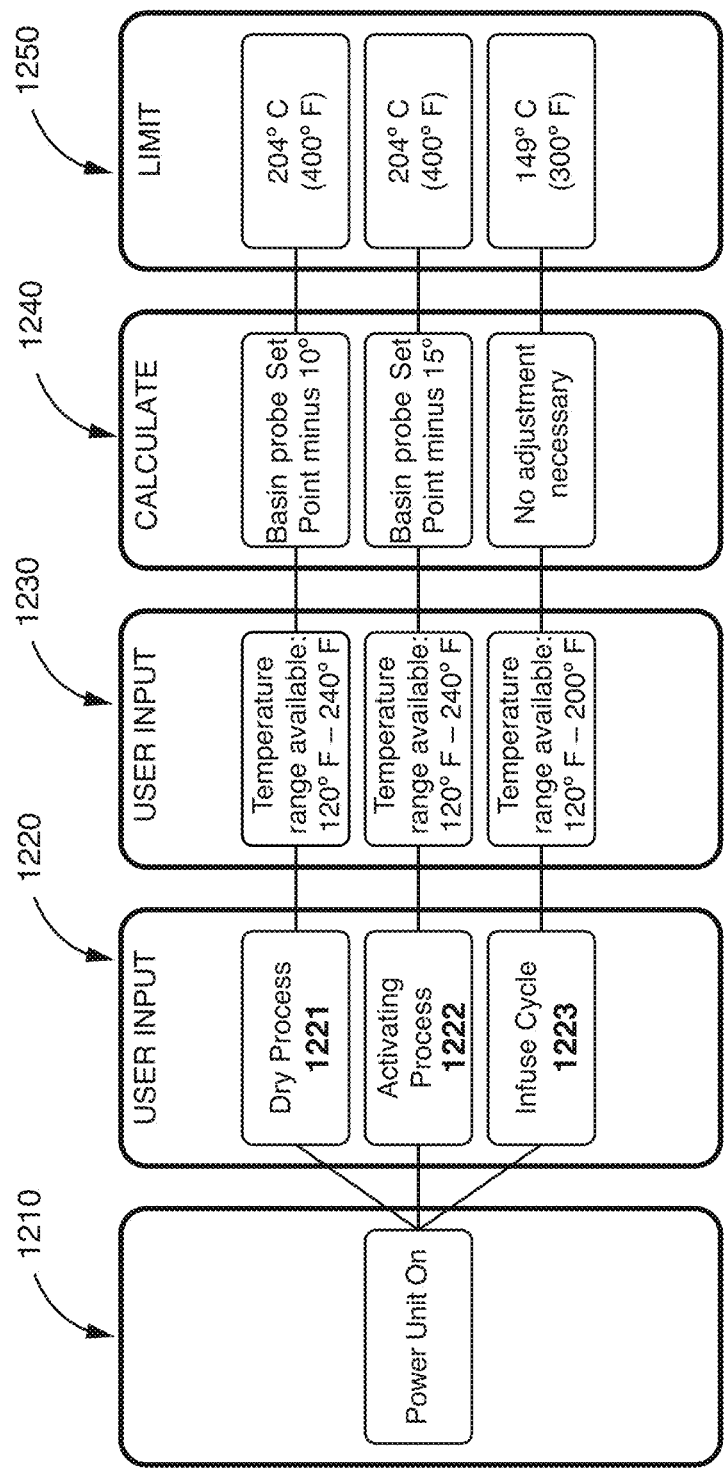

In certain embodiments as shown in FIG. 13, for use of the apparatus—a user powers on 1210 infusing apparatus. The user then provides input 1220 as to determine if the apparatus will operate in the dry process 1221, activation process 1222, or infusing process 1223 mode. The user is then prompted for desired temperature input 1230 based upon the process selected to set the desired air or solvent temperature for the selected process. For a dry process 1221, the available temperature range is 49° C.-115° C. (120° F.-240° F.). For the activation process 1222, the available temperature range is 49° C.-115° C. (120° F.-240° F.). For the infusing process 1223, the available temperature range is 49° C.-93° C. (120° F.-240° F.). During a calculation step 1240, the temperature controller 300—such as shown in FIG. 5—receives the temperature as measured by the second temperature measuring device 150 (FIG. 14A) to determine whether the heater component 220 (FIG. 14A) should be actuated to provide additional heat or not. During a dry process 1221, a 10° F. offset is used to account for temperature lag. Thus, if a user has selected a dry process with a 93° C. (200° F.) setpoint, if the probe measures 85° C. (185° F.), the temperature controller 300 treats this input as (91° C.) 195° F. and provides heat with the heater component 220. When the second temperature measuring device provides a reading of 88° C. (190° F.), with a 10° offset, the temperature controller 300 treats this input as 93° C. (200° F.) and thus switches the heater component 220 off. If at any point, the first temperature measuring device 150 (not shown), provides a reading exceeding a predetermined limit 1250, the temperature controller 300 switches the heater component 220 off to prevent damage to the infusing apparatus.

In certain embodiments, if the air temperature is below the desired set-point, the controller can provide additional heat using the heater component 220 (FIG. 14A). However, if the air temperature is below the desired set-point and the first temperature measuring device indicates a temperature above a predetermined maximum temperature, the heater will not provide additional heat until the temperature of the first temperature measuring device indicates a temperature below the predetermined maximum temperature. Furthermore, in certain embodiments a mechanical temperature regulator device, such as a bi-metallic strip thermostat, is configured to open the electrical circuit to further prevent further heating and potential overheating and damage of the infusion apparatus. Certain embodiments of the present invention comprise a first temperature measuring device and a second temperature measuring device in communication with a central processing module, such as a micro-controller, to control the temperature within the apparatus as desired by the user.

In certain embodiments, the apparatus comprises materials including, but not limited to polysulfone, liquid-crystal polymer (LCP), and Polyphenylene sulfide (PPS). Such polymer compositions are known for their high performance in many categories associated with manufacture and use, including their high heat resistance—withstanding temperatures in excess of 204° C. (400° F.) in some cases. Such polymers provide a high-temperatures to heat without degradation of form or material properties.

Figure 6A:
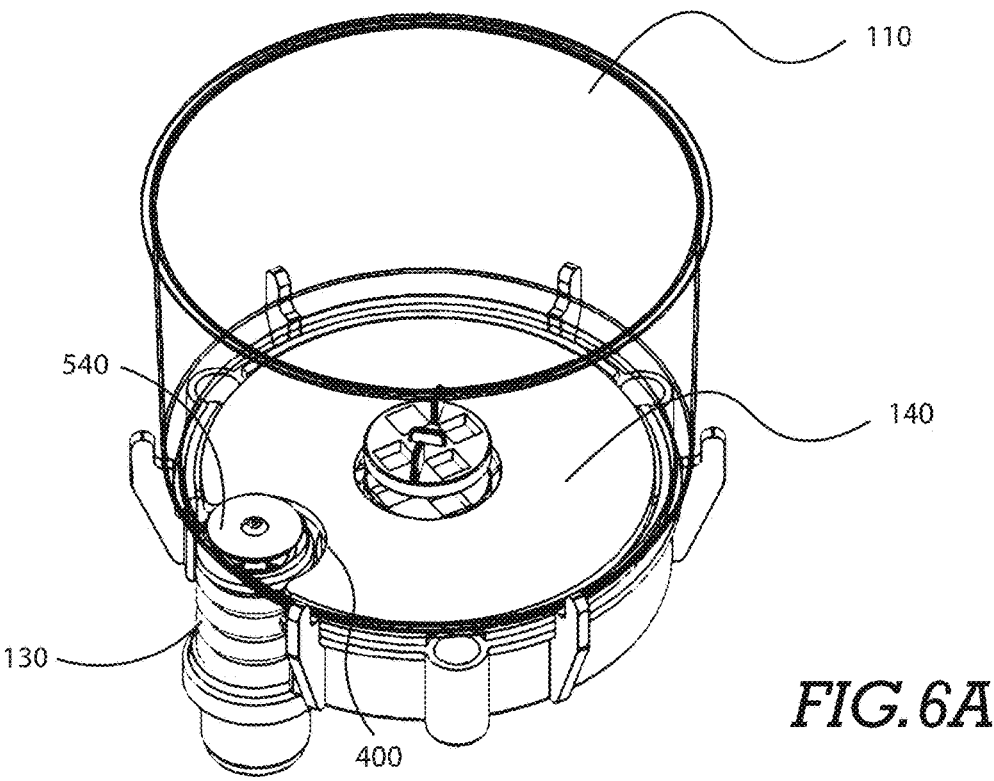

Certain embodiments, as seen in FIG. 6A, comprise a gravity-fed drain device 130. In certain embodiments, a gravity-fed drain device 130 is connected to a bottom surface 140 of the infusing chamber 110 and interfaces with an aperture 400 through the bottom surface 140 of the infusing chamber 110. In certain embodiments, seen in FIG. 14A, the bottom surface 140 of the infusing chamber comprises a contour 1200 directing the solvent toward the aperture 400 in the bottom surface for purposes of complete draining. In certain embodiments, the contour comprises an angle sloping downward toward the aperture in the bottom surface. The angle of the bottom surface, for the purposes of draining, directs the solvent toward the aperture. Although an angled surface of certain embodiments comprises an angle of 3 degrees, the angle is not limited thereto. Furthermore, a contour of is not limited to an angled surface. A contour, in the scope and spirit of the present application, surrounds a configuration which induces the flow of solvents toward the aperture in the bottom surface of the infusing chamber.

Such an aperture 400 is held closed by the gravity-fed drain device 130, preventing the passage of solvent held within an infusing chamber 110. If desired, a user may actuate the gravity-fed drain device 130 it to an open-state, to dispense a solvent held within the infusing chamber 110. It will be appreciated that any state that allows the passage of any amount of solvent through a gravity-fed drain device 130 is considered an open-state. It will be also appreciated that any state that prevents the passage of a solvent through a gravity-fed drain device 130 is considered a closed-state. It will be further appreciated that the actuation of the gravity-fed drain device 130 may be a mechanically actuated or electro-mechanically actuated depending on the nature of the actuation mechanism. It will be appreciated that in other embodiments, a gravity-fed drain device 130 is not limited to use in conjunction with an aperture 400 in the bottom surface 140 of an infusing chamber 110. It will be further appreciated that a gravity-fed drain device 130 generally provides dispensing functionality through an aperture located below the surface level of a liquid.

In certain embodiments, a gravity-fed drain device 130, seen in FIG. 6B, is mechanically actuated and comprises an actuation mechanism 410 comprising a push-button 420 connected to the gravity-fed drain device 130 through a series of mechanical linkages. The push-button 420 extends through an external surface 430 of an infusing apparatus 100. The bottom of the push-button 420 is attached to a first distal end 441 of a rigid linkage 440, which is directed toward a pivoting linkage 450. A second distal end 442 of the rigid linkage 440 is affixed to a first distal end 451 of a pivoting linkage 450. A second distal end 452 of the pivoting linkage 450, is on opposite side of a pivot point 460, which disposed between the first distal end 451 and the second distal end 452 of the pivoting linkage 450. The pivot point 460 of the pivoting linkage 450 is constrained by a rod feature 461 extending which affixes to a planar surface 470 of the infusing apparatus 100. When the first distal end 451 of the pivoting linkage 450 traverses in a first direction, the second distal end 452 of the pivoting linkage 450 traverses in a second direction. When the second distal end 452 of the pivoting linkage 450, having connection to a gravity-fed drain device 130, traverses in a second direction, the gravity-fed drain device 130 actuates to an open-state.

In certain embodiments, a gravity-fed drain device 130, seen in FIG. 7A, comprises a cylindrical form 500 having a plurality of supports 510 extending radially inward from the circumference of the cylindrical form 500 toward the central axis 520 of the cylindrical form. The supports 510 meet centrally, where they affix to a first distal end 531 of a push-rod 530 extending vertically upward from the supports 510. A second distal end 532 of the push-rod 530 is affixed to an aperture seal 540. The aperture seal 540, disposed substantially perpendicular to the push-rod 530, comprises a form configured to mate with an aperture 400, as seen in FIG. 6A, and extends through the bottom surface of an infusing chamber 110. This creates a seal between the aperture seal 540 and the aperture 400 to prevent the passage of solvent through the aperture 400. Referring now to FIGS. 7A and 7B, a collapsible cylindrical device 550 extends between the cylindrical form 500 of the gravity-fed drain device 130 and the perimeter of the aperture 400 in FIG. 6A to form a seal. When the seal between the aperture 400 and the aperture seal 540, is released, solvent is permitted to flow through the aperture 400. The solvent may then flow through the collapsible cylindrical device 550, once again referencing FIG. 7B, and through the cylindrical form 500.

Figure 8:
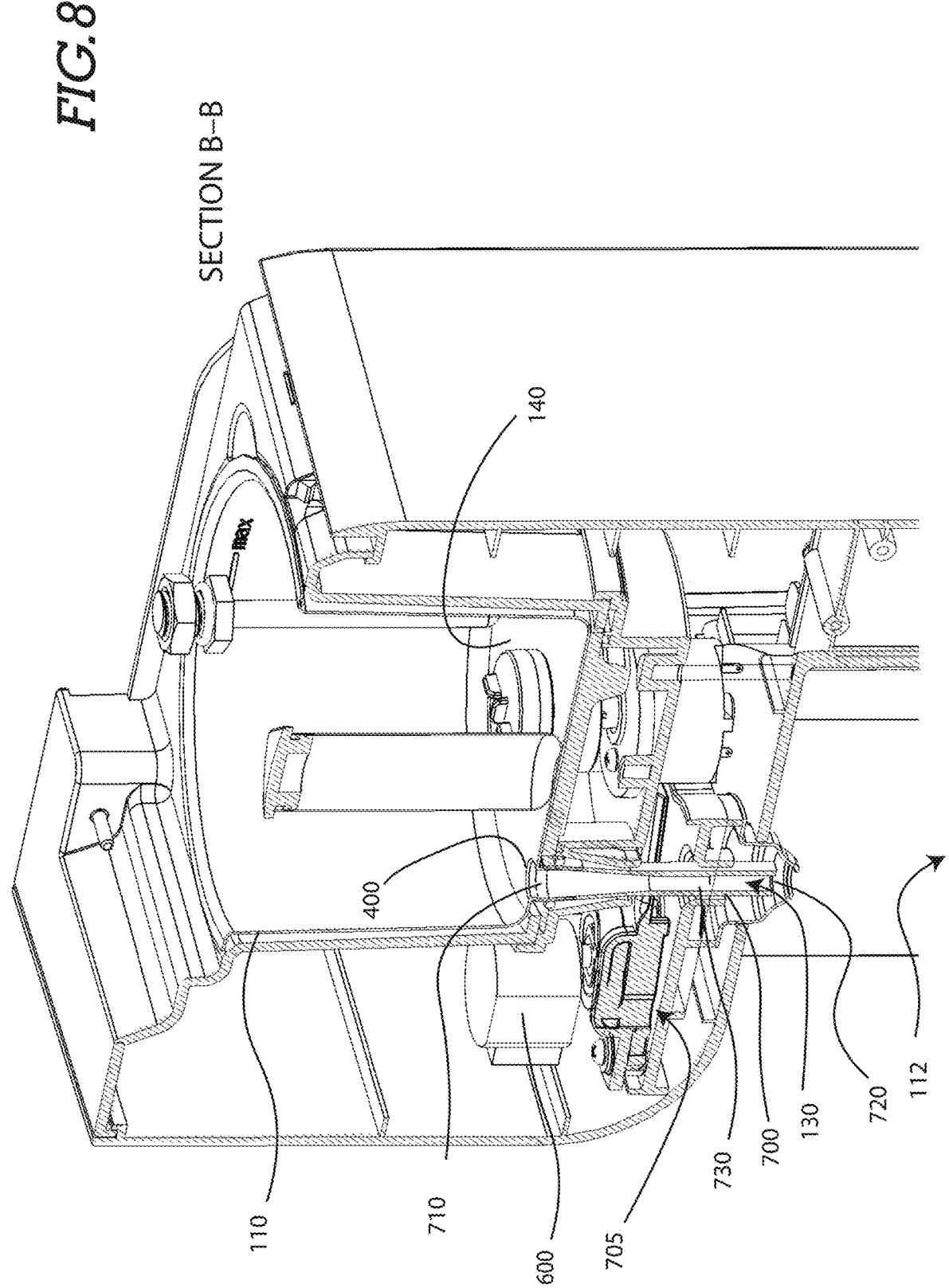

It will be appreciated that, the actuation of a electromechanically actuated gravity-fed drain device 130, shown in FIG. 8, may be performed with an electric actuator 600 such as a linear actuator, stepper motor, servo motor or other electrically actuated device known to those skilled in the art. Certain embodiments, as seen in FIG. 8, comprise an electric actuator 600 with a closure mechanism 705 to a gravity-fed drain device 130 such that when the electric actuator 600 is actuated, it actuates the gravity-fed drain device 130 into an open-state. In certain embodiments, control of the electric actuator 600 is located on a user interface panel 610, seen in FIG. 1A-FIG. 1B, located on an external surface of the infusing apparatus 100.

Certain embodiments of a gravity-fed drain device 130, as seen in FIG. 8, comprise a tube 700 having a first distal end 710 configured to interface with an aperture 400 on bottom surface 140 of an infusing chamber 110 creating a seal. Such tube 700 has a second distal end 720 which is directed toward a dispensing area 112 for the dispensing of an infused oil. The tube 700, has a pathway 730 from the first distal end 710 to the second distal end 720 for the flow of infused solvent. In certain embodiments a tube 700, as shown in FIG. 8, comprises elastic or semi-elastic material properties such that the tube may be deformed by an applied force and rebound to original or substantially original form upon the removal of such an applied force. In certain embodiments, the tube 700 may be deformed by lateral deflection thereby constricting or closing the pathway.

Certain embodiments, seen in FIG. 14B, comprise a tube 700 having a female threaded feature 1300 at the first distal end 710 of the tube for fixation to the underside 1320 of the infusing chamber. In such embodiments, a threaded male feature 1310, having a pathway 730 therethrough, is consistent with the aperture 400 of the infusing chamber. The female threaded feature 1300 is configured to mate with the male threaded feature 1310, thus affixing the tube 700 to the infusing chamber 110 and preventing unintentional disconnection. In certain embodiments, the tube comprises a polymeric composition such as silicone, which is overmolded over a female threaded feature 1310 having attachment features 1330 configured to retain the tube to the female threaded feature 1300. In certain embodiments, the attachment features 1330 comprise knurling or other friction modifying features, while certain embodiments comprise annular rings resulting in undercut features as shown in FIG. 14B.

In certain embodiments, seen in FIG. 14A-FIG. 14B, an outer shell 1340 surrounds the infusing chamber 140, creating an airgap 1350 between the infusing chamber 140 and the outer shell 1340. The airgap 1350 provides insulative properties in order to maintain consistent temperatures as desired within the infusing chamber 140. The insulative characteristics also allow the maintenance of higher temperatures requiring lower energy consumption due to lower heat transfer rates to the ambient environment. In certain embodiments, the airgap is filled with a material having insulative properties.

Figures 9A, 9B:
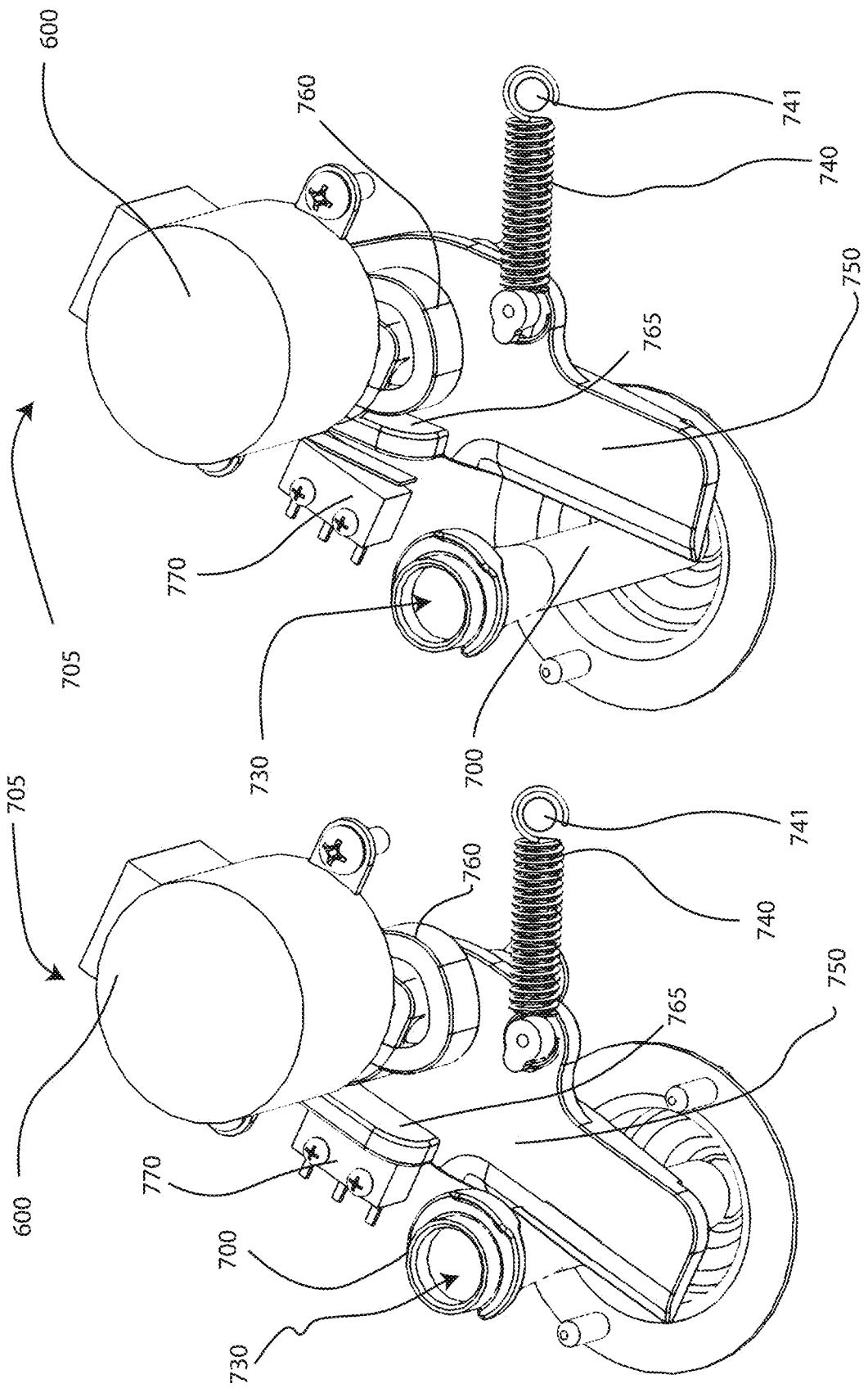

In certain embodiments of a gravity-fed drain device, as shown in FIG. 9A and FIG. 9B, a closure mechanism 705 comprises a pivoting lever 750 and a spring 740. It will be appreciated that a spring 740 as disclosed, has a first end connected to said pivoting lever 750 and a second end affixed to a static element 741 to provide tensile force to said closure mechanism 705. In some embodiments, the spring 740 and pivoting lever 750 are configured to rest in a closed-state, shown in FIG. 9A such that the pathway 730 of the tube 700 is deformed to restrict the flow of liquid. In such embodiments, when force is applied, the pivoting lever 750 is drawn away from the tube 700 allowing the pathway 730 to rebound and allow the flow of liquid in an open-state shown in FIG. 9B.

In certain embodiments, a gravity-fed drain device 130, as shown in FIG. 9A and FIG. 9B, that comprises a tube 700, a pivoting lever 750 and a spring 740, further comprises an electric actuator 600. An electric actuator 600 in such embodiments applies a force to the pivoting lever 750 to draw the pivoting lever 750 toward or away from the tube 700. It will be appreciated that in certain embodiments, as shown in FIG. 9A and FIG. 9B, the electric actuator provides rotational motion to a cam element 760. It will be appreciated to those skilled in the art that a cam element 760 is a rotating or sliding piece in a mechanical linkage use in transforming rotary motion into linear motion, or vice versa. In such embodiments as shown in FIG. 9A and FIG. 9B, the cam element 760 comprises a plate cam form to translate rotational motion from the electric actuator 600 to linear motion and apply force to a surface of a push plate 765. The push plate 765 is affixed to the pivoting lever 750, as such a force applied to the push plate 765 acts to apply force to the pivoting lever 765. It will be appreciated to those skilled in the art that the embodiment of a closure mechanism 705 shown in FIG. 9A and FIG. 9B rests in a closed-state (FIG. 9A) due to residual tension applied by the spring 740. Such embodiments change to an open-state (FIG. 9B) when a force is applied through the actuation of the electric actuator 600.

Certain embodiments of a closure mechanism 750 further comprises a contact switch 770, shown in FIG. 9A and FIG. 9B. Such a contact switch 770 has electrical connection to a user interface panel 610, seen in FIG. 1A and FIG. 1B. In such embodiments, once again referencing FIG. 9A and FIG. 9B, when a cam element 760 applies a force to a surface of the push plate 765, the pivoting lever 750 is drawn toward the tube 700. When the pivoting lever 750 reaches a predetermined position, a surface of the push plate 765 contacts the contact switch 770, which sends an electrical signal back to the user interface panel 610, seen in FIG. 1A and FIG. 1B. Such a signal indicates a status change of a pivoting lever 750, shown in FIG. 9A and FIG. 9B, such as a closed-state (FIG. 9A) or an open-state (FIG. 9B).

In certain embodiments, as shown in FIG. 9A-FIG. 9B for instance, the electric actuator 600 comprises a stepper motor, servo motor, or other type of electric actuator capable of being positioned in intermediate positions between a closed configuration (FIG. 9A) and an open configuration (FIG. 9B). The electric actuator 600 is configured to allow a closed configuration, an open configuration, and at least one intermediate configuration wherein the tube is deformed to partially constrict the pathway of the tube. A closed configuration comprises deforms the tube 700 such that the pathway 730 of the tube is 0% of that of an open configuration. An open configuration comprises the pathway 730 being undeformed, resulting in unobstructed flow through the pathway 730 and allowing maximal fluid flow therethrough. In certain embodiments, the electric actuator 600 is configured to place the pathway 730 in an open configuration, a closed configuration, a first intermediate configuration, and a second intermediate configuration wherein the intermediate configurations result in a partially restricted pathway 730. The intermediate configurations can be configured to result in the cross-section of the pathway being between 1% and 99% of that of an open configuration. In certain embodiments the gravity-fed drain device can be configured wherein, a first intermediate state results in the pathway being restricted to 25% of an open configuration, and a second intermediate state results in the pathway being restricted to 50% of the open configuration.

In certain embodiments, a user is able to configure the mode of dispensing as desired based upon the viscosity of the liquid being infused. A first dispensing mode configures the closure mechanism to open the pathway to 25% of an open configuration when the electric actuator is actuated, a second dispensing mode configures the closure mechanism to open the pathway to 50% of an open configuration when the electric actuator is actuated, and a third dispensing mode configures the closure mechanism to open to a fully open configuration. The dispensing modes can be selected with a button interconnected with the user interface panel.

Figure 28:
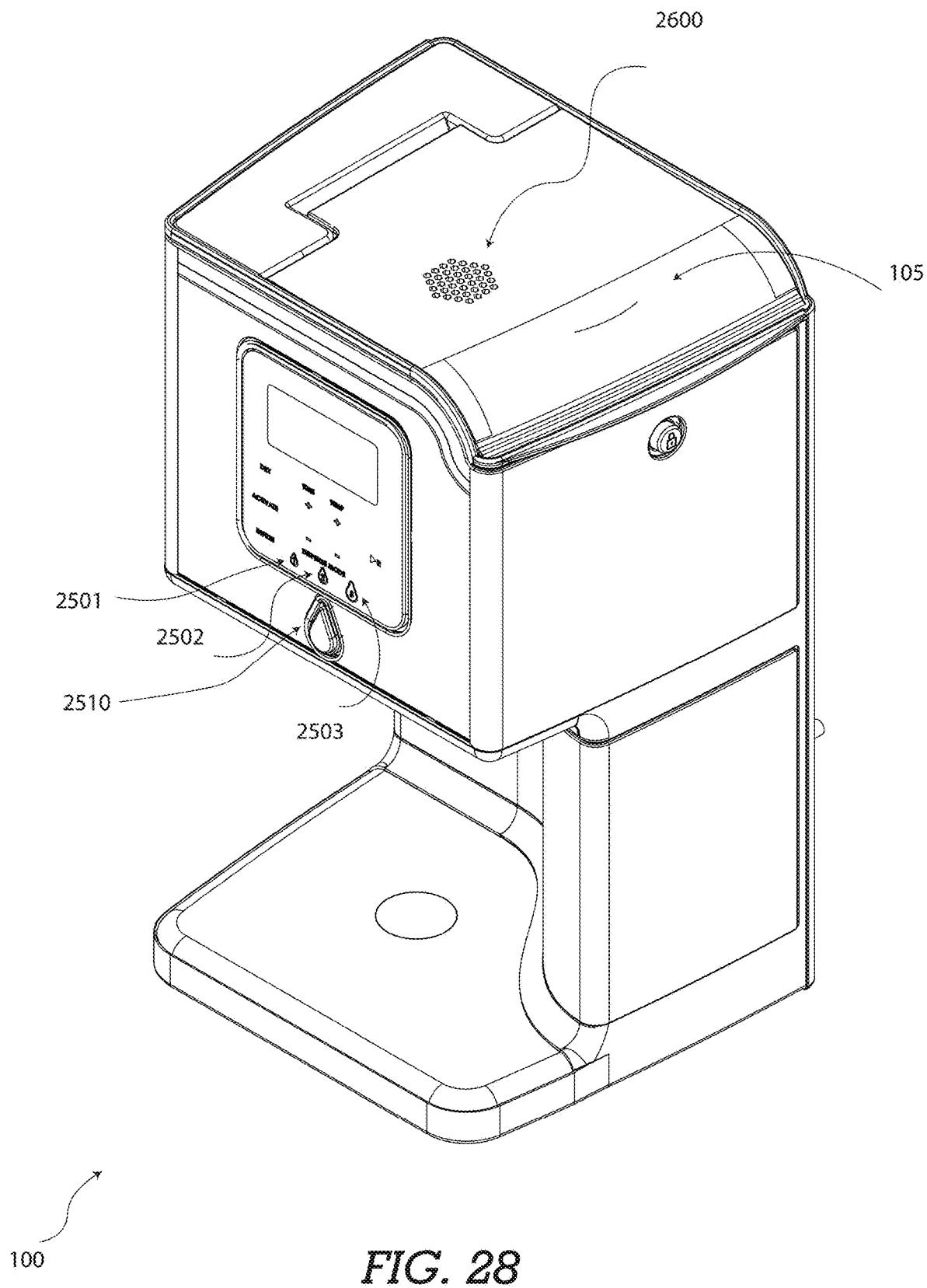

Certain embodiments, as shown in FIG. 28 for instance, comprise a plurality of dispensing mode buttons wherein a first button 2501 configures the closure mechanism to a first dispensing mode, a second button 2502 configures the closure mechanism to a second dispensing mode, and a third button 2503 configures the closure mechanism to a third dispensing mode. Certain embodiments comprise a dispensing button 2510 wherein the dispensing button is depressed following the dispensing mode selection by a user.

Figure 10:
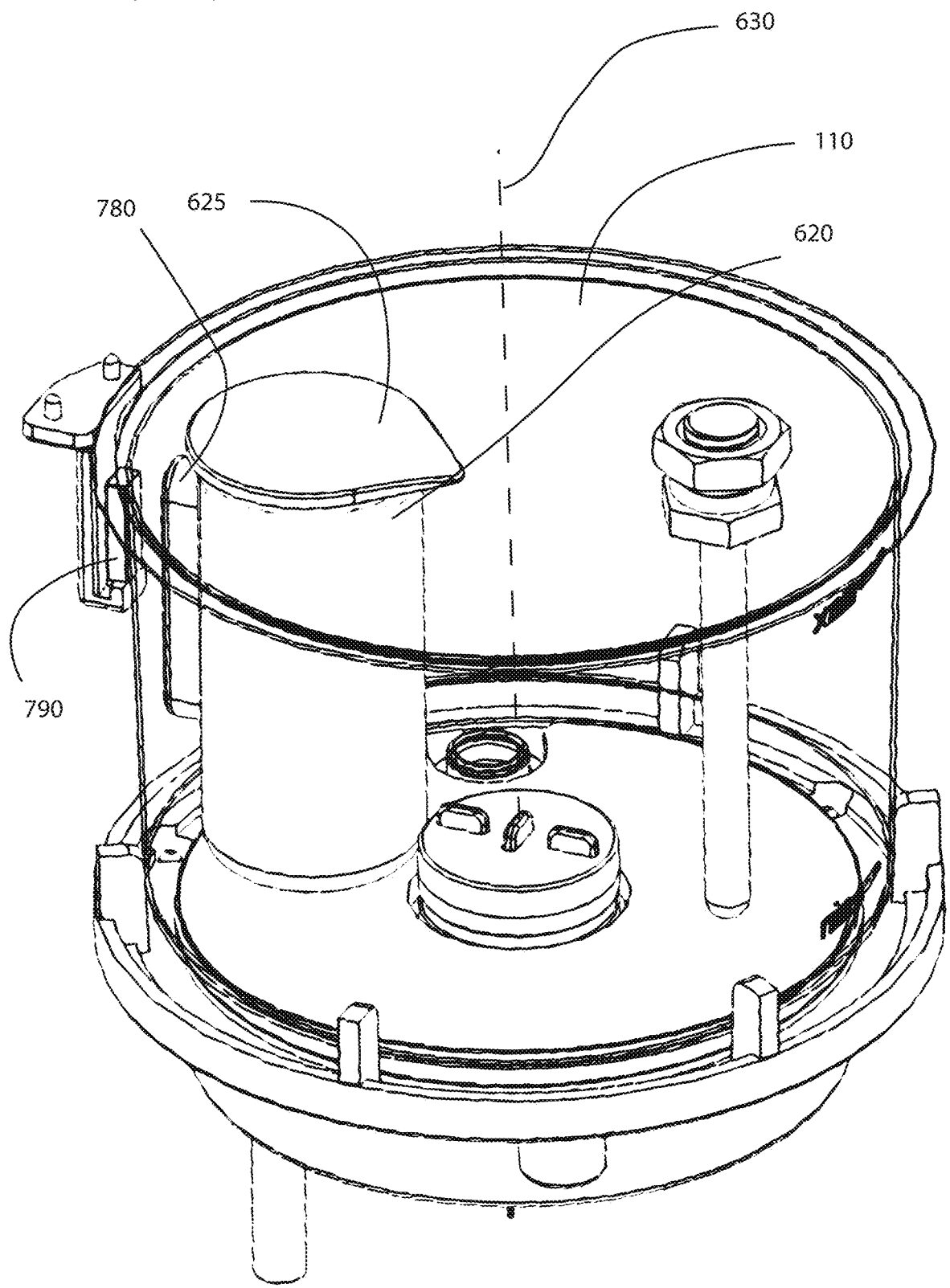
Figure 15A:
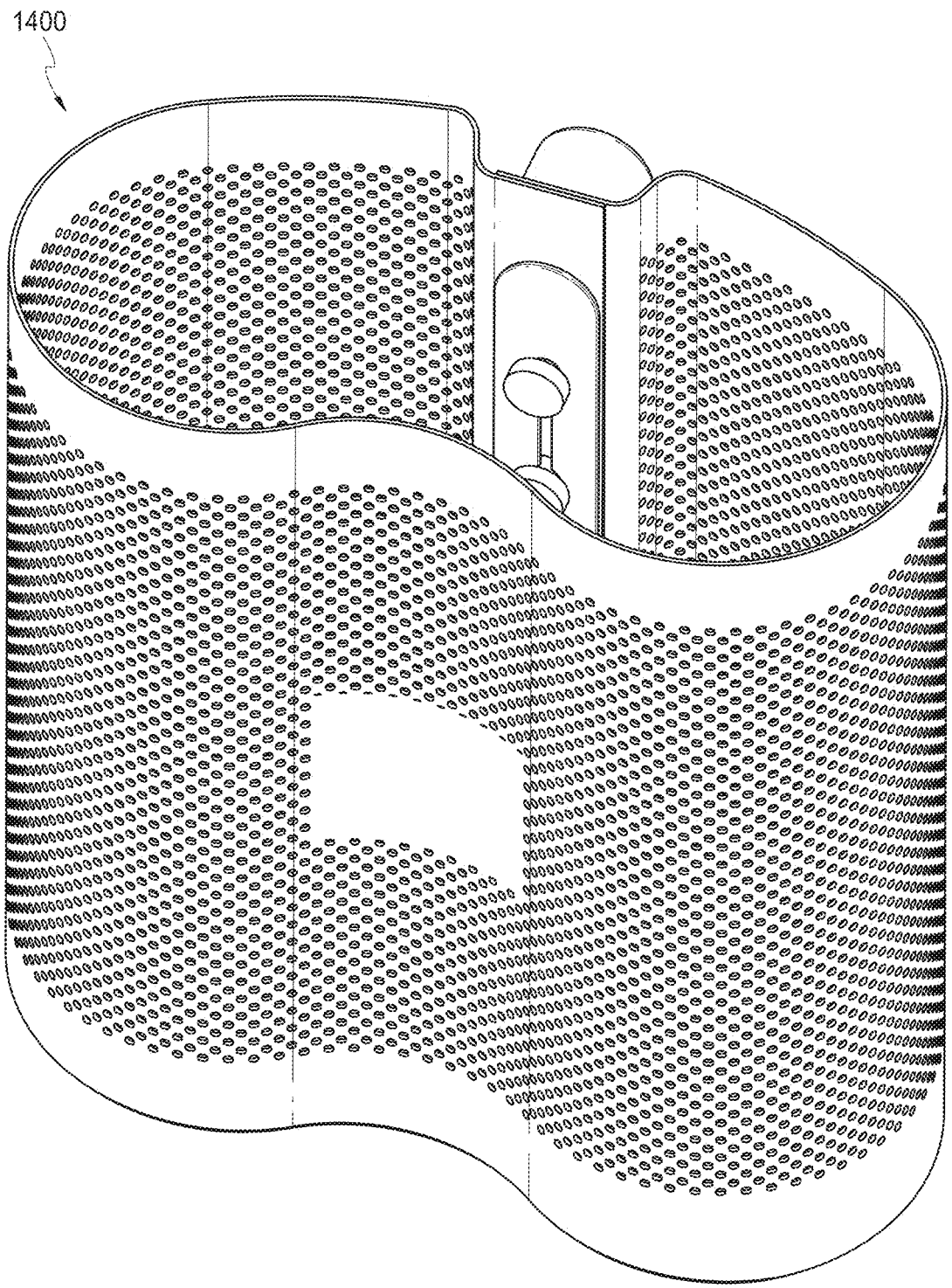
Figure 15B:
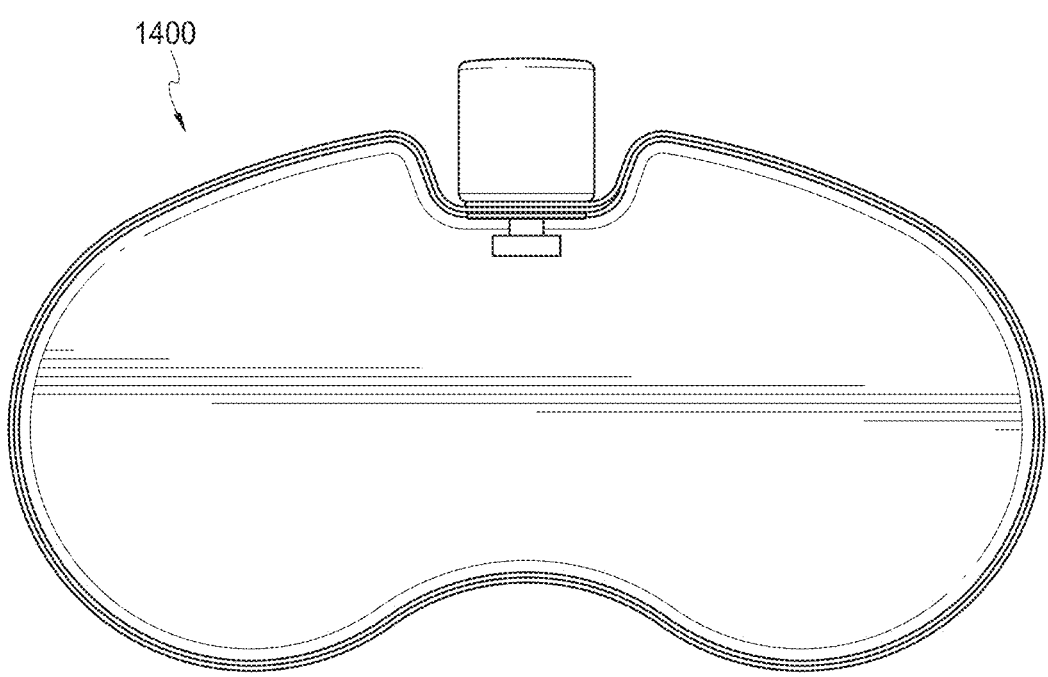

Certain embodiments, as shown in FIG. 10, comprise a permeable container 620 that may be placed into an infusing chamber 110. The permeable container 620 is configured to hold infusing material such that when placed into the infusing chamber 110, solvent held within the infusing chamber is able to flow through the walls of the permeable container 620. In certain embodiments, the permeable container is disposed away from a central axis 630 of the infusing chamber 110. The flow of solvent held within the infusing chamber 110, when churned by an agitator component 120 located at a central axis 630, is higher when offset from the central axis 630. It will be appreciated that infusing material as discussed herein may refer to loose infusing material or infusing material prepackaged in forms able to be deposited within the infusing chamber 110 or alternatively within a permeable container 620. Certain embodiments of the permeable container comprise an oblong shape, such as a kidney shape, as shown in FIG. 15A-FIG. 15B. The oblong shape provides increased laminar around the permeable container 1400 which results in more efficient flow dynamics, and allows for a faster recirculating rate of flow 1405. The oblong shape of the permeable container also increases the active infusion time, or the duration which solvent is in direct contact with the infusion material. The oblong shape provides an increased length consistent with the direction of flow of the solvent when agitated, thus increasing the active infusion time. Providing an increased active infusion time provides a more effective infusing process.

Certain embodiments, as shown in FIG. 10, comprise a permeable container 620 having a cap 625. Such a permeable container 620 may be removably affixed to the interior of the infusing chamber 110. In such embodiments, the permeable container 620 further comprises a first magnetic fixation element 780 affixed to the exterior of the permeable container. A second magnetic fixation element 790 is affixed to the exterior of the infusing chamber 110. It will be appreciated that removable fixation is achieved when the first magnetic fixation element 780 and the second magnetic fixation element 790 are brought in proximity to each other. It will be further appreciated that magnetic removable fixation may be achieved with a magnet element and a ferromagnetic element, or a plurality of magnets.

Figure 11:
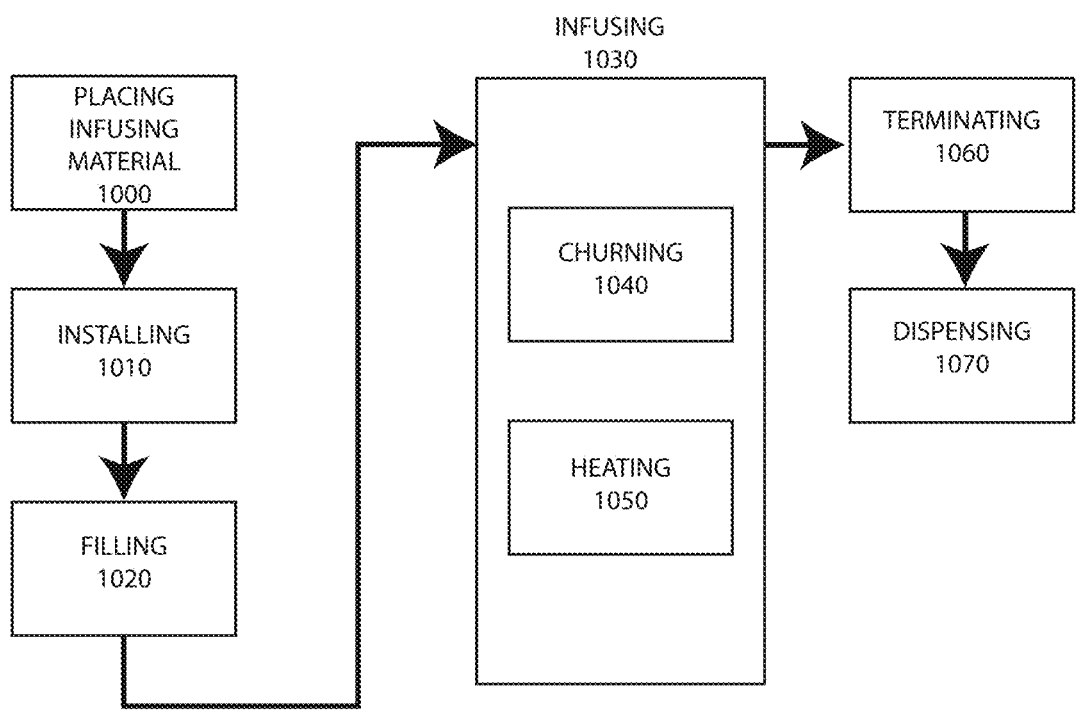

Certain embodiments of a method of infusing a solvent, shown in FIG. 11, as discussed herein comprises the placing of infusing material. This step involves the placing of infusing material into a permeable container 620, seen in FIG. 2. The step of installing 1010, as shown in FIG. 11, involves the installation of the permeable container 620, seen in FIG. 2, within an infusing chamber 110 of an infusing apparatus 100. The step of filling 1020, shown in FIG. 11, involves adding a solvent for infusing to the infusing chamber 110 shown in FIG. 2. The infusion step 1030, shown in FIG. 11, involves the infusing apparatus 100 set to an infusing mode by user input through a user interface panel 610, seen in FIG. 1A. The infusing step 1030, shown in FIG. 11, involves churning 1040 and heating 1050 steps. The churning step 1040, churns the solvent through the spinning of an agitator component 200 as seen in FIG. 2. In certain embodiments, the spinning of the agitator component 200, is maintained between 50 and 150 RPM while in other embodiments the rotational speed of the agitator component 200 is maintained between 70 and 90 RPM. In certain embodiments comprising an agitator component further comprising fins having a radial curvature, the agitator component rotational speed can be operated at speeds of 400 RPM without the entrainment of air within the solvent.

In certain embodiments, an agitator component is configured to provide mixing of air within the volume of the infusing chamber, thus providing a more consistent temperature throughout the volume of the infusing chamber. In certain embodiments, the mixing functionality results in a forced convective flow within the volume. It will be appreciated by those skilled in the art that a forced convective flow provides a more homogenous temperature profile throughout the volume of the infusing chamber.

Figure 16A:
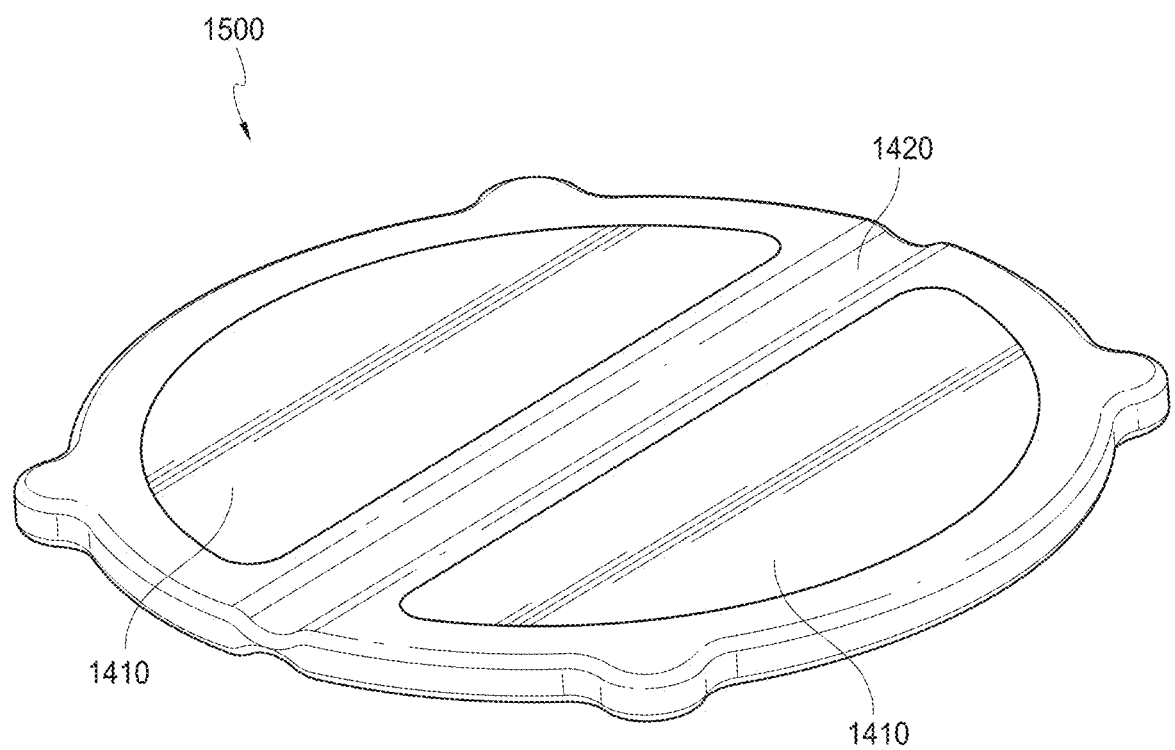
Figure 16B:
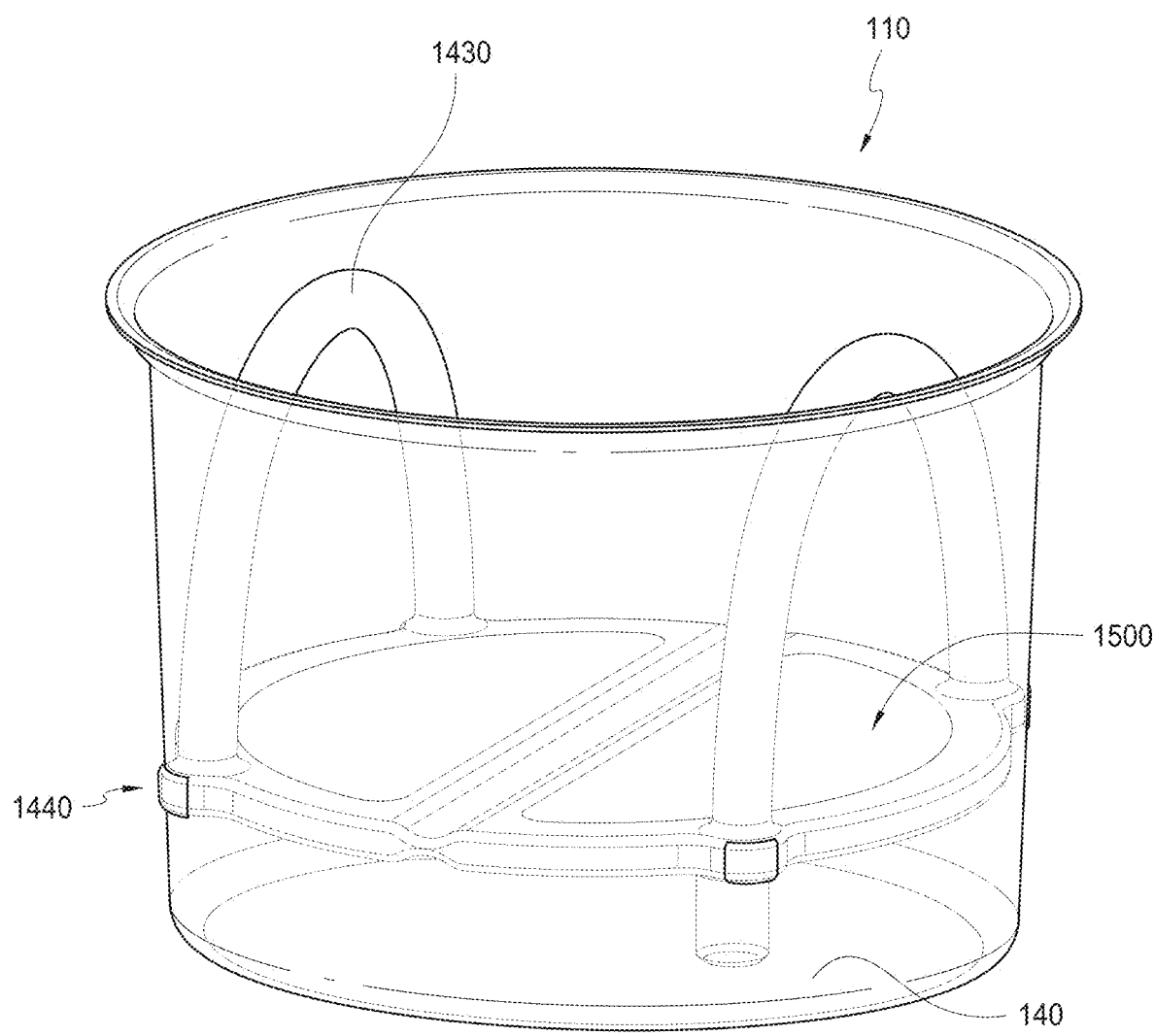

In certain embodiments, shown in FIG. 16A-FIG. 16B, a rack 1500 is suspended above the bottom surface 140 of the infusing chamber. The rack 1500 allows a user to place dry material upon the rack, thus preventing direct contact of the dry material with the bottom surface 140 of the infusing chamber. The bottom surface 140 of the infusing chamber of certain embodiments is in direct conductive thermal communication with the heater component 220 (FIG. 3B). Resultantly, the bottom surface 140 of the infusing chamber is at a temperature much higher than that of the air within the infusing chamber 110. Contact of the dry material with the bottom surface 140 of the infusing chamber may result in burning of the dry material, or uneven drying of the dry material during a dry process. Suspension of the dry material away from the bottom surface 140 of the infusing chamber provides a more even heating and drying of the material. Furthermore, offsetting the material from the bottom surface 140 of the infusing chamber allows for a more consistent airflow throughout the volume of the infusing chamber 110. A more consistent airflow provides a more homogenous temperature profile through the infusing chamber 110. In certain embodiments the rack 1400 comprises a perforated surface allowing airflow through the rack 1400, while other embodiments (as shown in FIG. 16A-FIG. 16B) comprise a solid surface. In certain embodiments, the rack 1400 comprises a first portion 1410 and a second portion 1410, interconnected with a hinged element 1420. The hinged element 1420 of certain embodiments comprises a living hinge comprised of a flexible material such as silicone, thus the rack can be folded and unfolded for use, placement, and removal from the infusing chamber 140. In certain embodiments, the rack 1400 further comprises handles, while certain embodiments comprise recesses 1440 within the infusing chamber 140 configured to mate with the rack 1400 to offset the rack from the bottom surface 140 of the infusing chamber.

Figure 17:
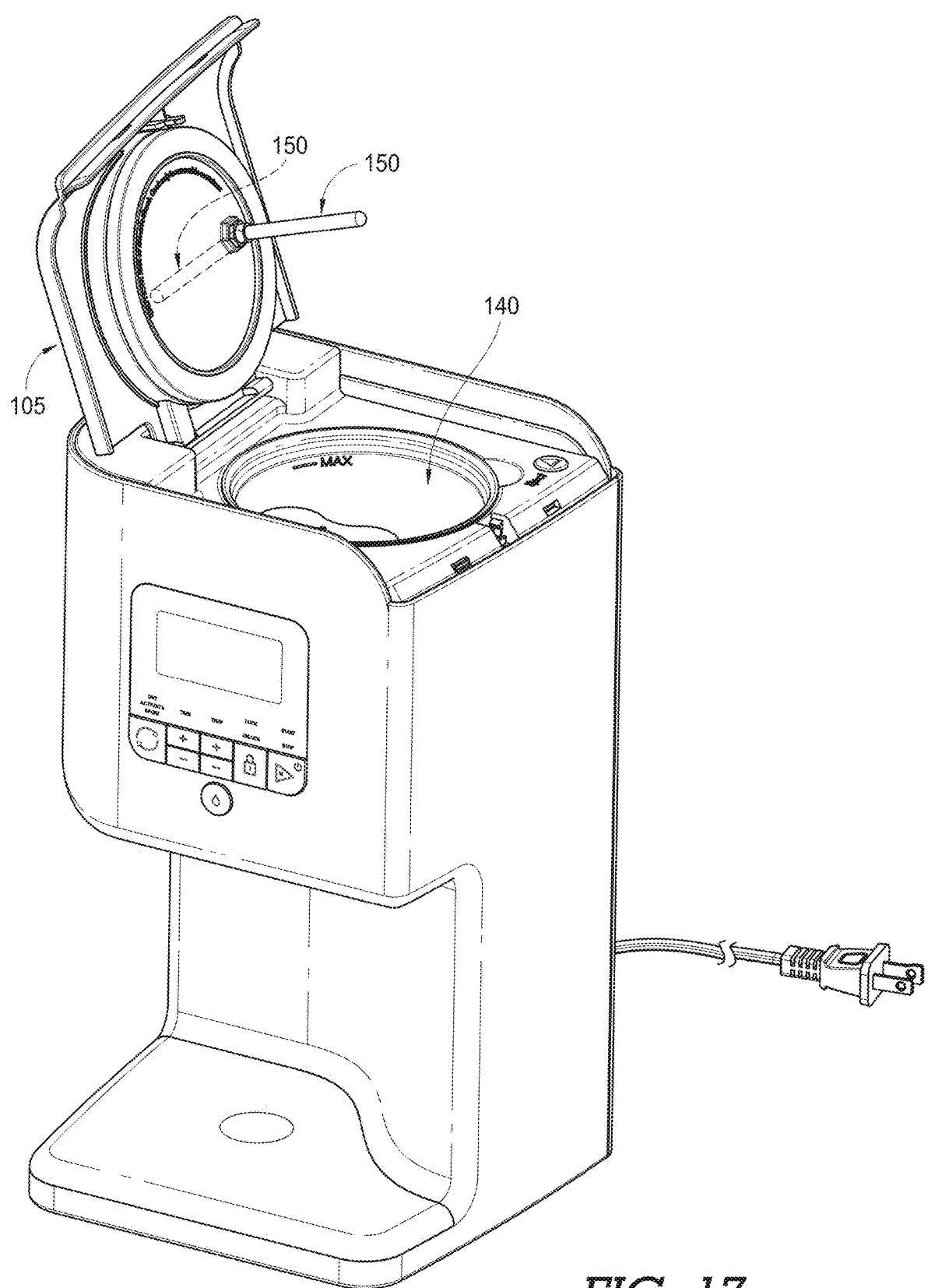

Considering certain embodiments, seen in FIG. 17, which comprise a dry process and infusing process, a first temperature measuring device 150 (not shown) is disposed in contact with the external bottom surface of the infusing chamber 140, and a second temperature measuring device 150 is disposed within the volume of the infusing chamber 140. The first temperature measuring device 150 monitors the temperature of the bottom surface of the infusing chamber. The second temperature measuring device 150 monitors the air temperature within the infusing chamber during a drying process, and monitors the solvent temperature during an infusing process.

In certain embodiments, the second temperature measuring device 150 is configured to pivot from a vertical configuration—hanging downward into the volume of the infusing chamber 110, to a horizontal configuration—adjacently parallel to the bottom surface of the lid 105. It will be appreciated that in a dry process mode, the hot air will preferentially reside toward the upper portions of the volume of the infusing chamber 110. The disposition of the second temperature measuring device 150 as adjacently parallel to the bottom surface of the lid 105 allows a user to place more dry material within the infusing chamber. Thus, in a dry process mode, it is desired in certain embodiments for the second temperature measuring device 150 to be adjacently parallel to the bottom surface of the lid 105. In an infusion mode, it will be appreciated that the higher heat transfer properties of the solvent will result in a more homogenous temperature profile. However, it will be further appreciated that the solvent closest to the bottom surface 140 of the infusing chamber—or the surface which is in nearest proximity to the heating component—will exhibit the highest temperatures. Thus, it is advantageous to measure the temperature of the solvent in close proximity to the bottom surface of the infusing chamber 110, or the surface which is in nearest proximity to the heating element.

During a heating step 1050 (FIG. 11), the infusing apparatus 100, shown in FIG. 3B, heats the solvent using a heater component 220 and maintains the solvent at a consistent set-point temperature. In some embodiments, the heating 1050, seen in FIG. 11, maintains a solvent temperature below the boiling point of the solvent. After a predetermined time, the step of terminating 1060 the infusing 1030 step is executed. The predetermined time of infusion is based upon variables such as the infusing material and solvent used in addition to the user's preference surrounding the potency of resulting infusion. The predetermined time may span only minutes, or may extend beyond several hours. Then the step of dispensing 1070 is then performed by activating a dispensing 1070 step through the user interface panel 610 seen in FIG. 1A. When activating the dispensing 1070 step, shown in FIG. 11, infusion flows through an aperture 400, shown in FIG. 8 through a gravity-fed drain device 130 and into a dispensing area 112.

Figure 18A:
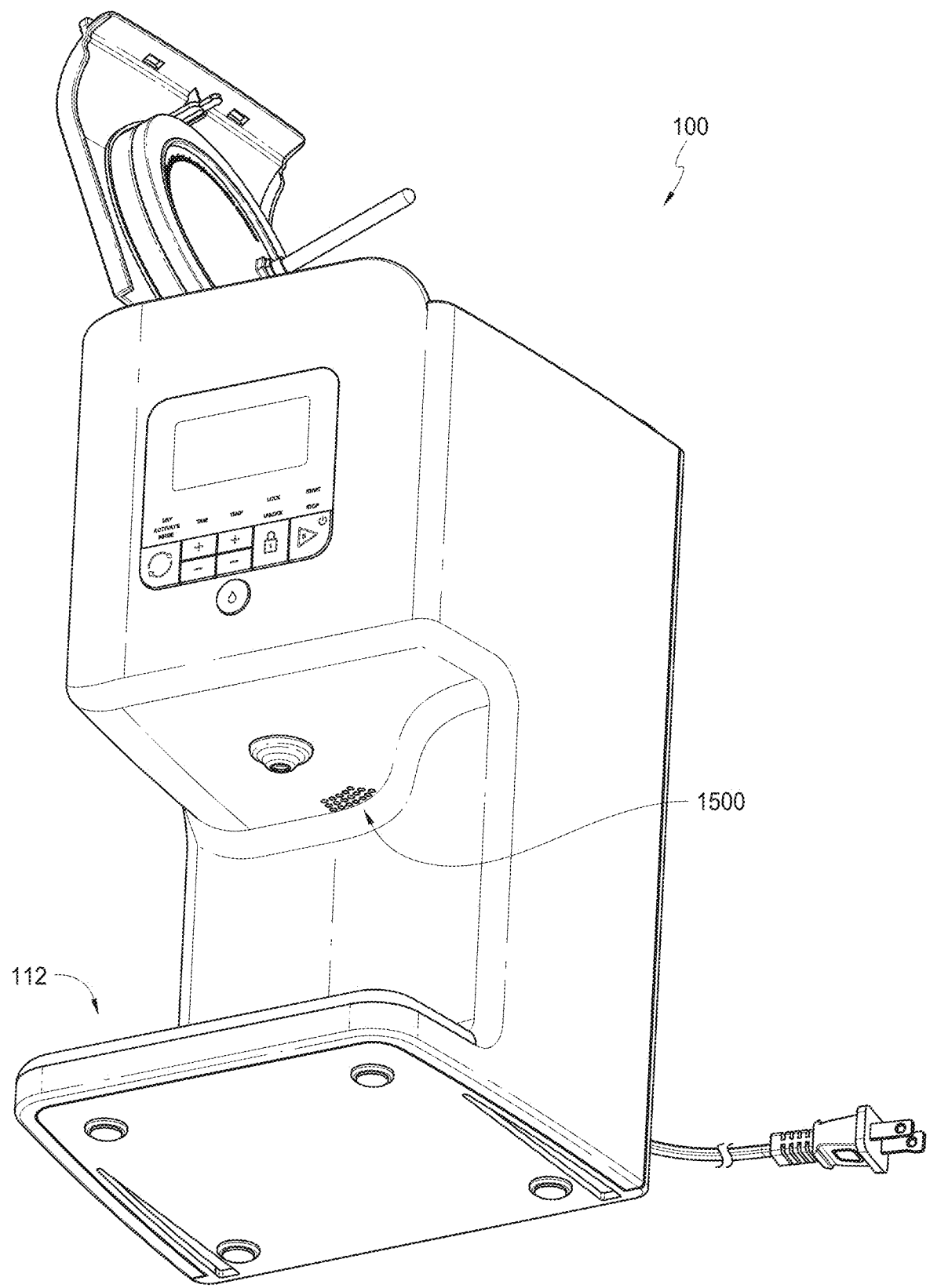
Figure 18B:
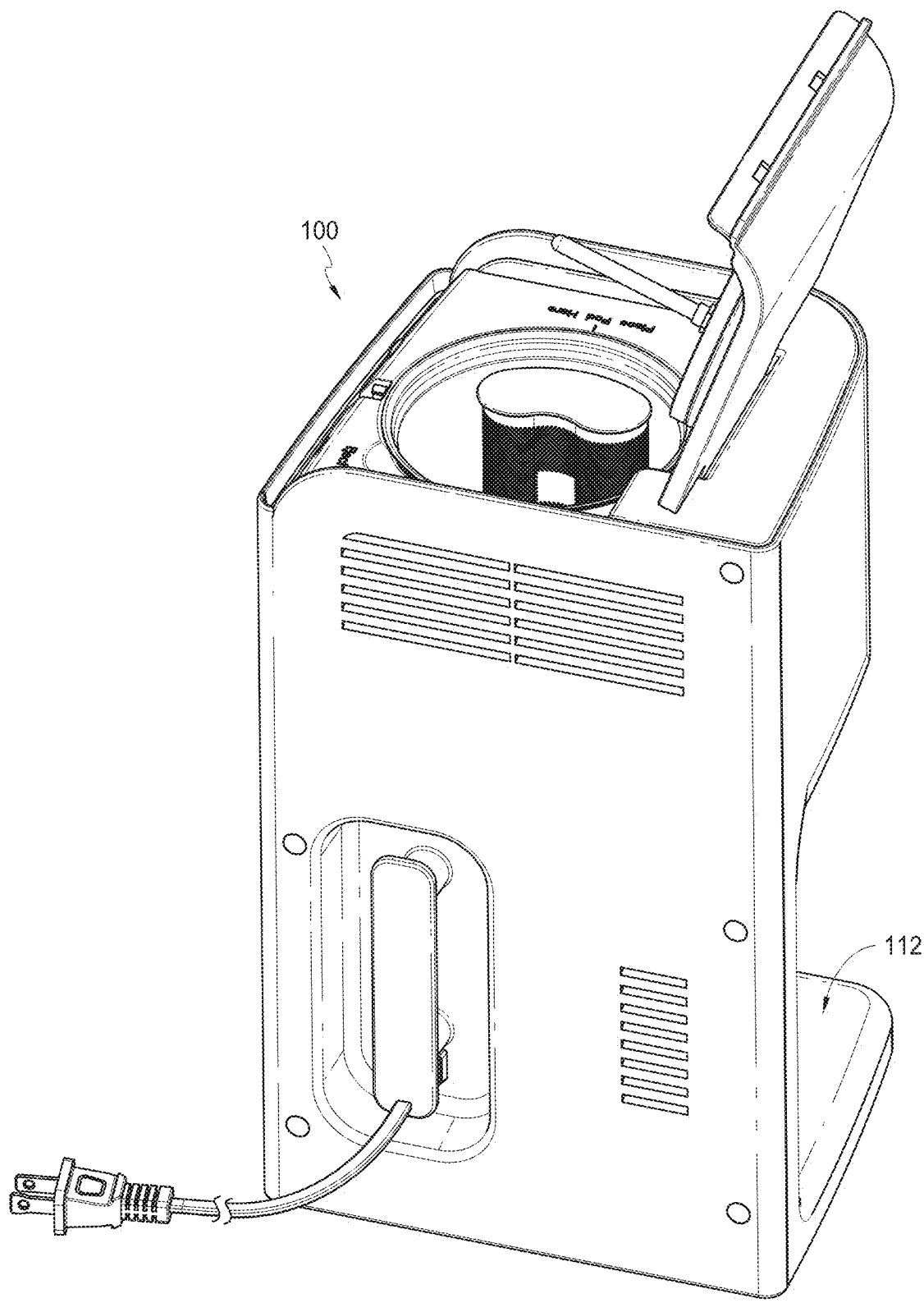

Certain embodiments of the present invention, seen in FIG. 18A further comprise audible notifications, delivered through a speaker oriented in the housing of the infusing apparatus 100, oriented above the dispensing area 112.

Certain embodiments further comprise apertures 1500 permitting the increased attenuation of the audible notifications. The audible notifications may be used to alert a user of the initiation or termination of certain processes, such as a dry process or an infusing process involving solvents.

FIG. 19-FIG. 26 show a pod 1502, which is alternative to the permeable container described above. The pod comprises a flexible, permeable bag 1504, a cage 1508 that maintains the shape of the bag, a bag clip 1516 that secures the bag to the cage, and a cap 1532 that seals the pod 1502. The bag 1504 is collapsible, which facilitates storage, and is also configured to selectively expand if needed to accept additional infusing material. Accordingly, the bag may be pleated. The bag's 1504 expanded shape is at least partially maintained by the cage 1508 inserted into the bag before receiving infusing material. Because the cage 1508 has a plurality of openings 1512, solvent can pass freely through the permeable bag 1504 and the cage 1508. The bag will facilitate solvent infusion when partially filled, for example, 25% filled or more.

The bag clip 1516 interconnects the bag 1504 to the cage 1508, wherein an upper edge 1518 of the bag 1504 is positioned between a lower ridge 1520 of the bag clip 1516 and at least one protrusion 1524 that extends from the upper, inner surface 1528 of the cage. One of ordinary skill in the art will appreciate that other methods of interconnecting the bag clip 1516, bag 1504, and/or cage 1508 may be employed without departing from the scope of the invention. A cap 1532, which may have a ring 1536 at its lower surface, is used to close the pod. The cage 1508, bag clip 1516, and cap 1532 of certain embodiments of the present invention are reusable.

Figure 26:
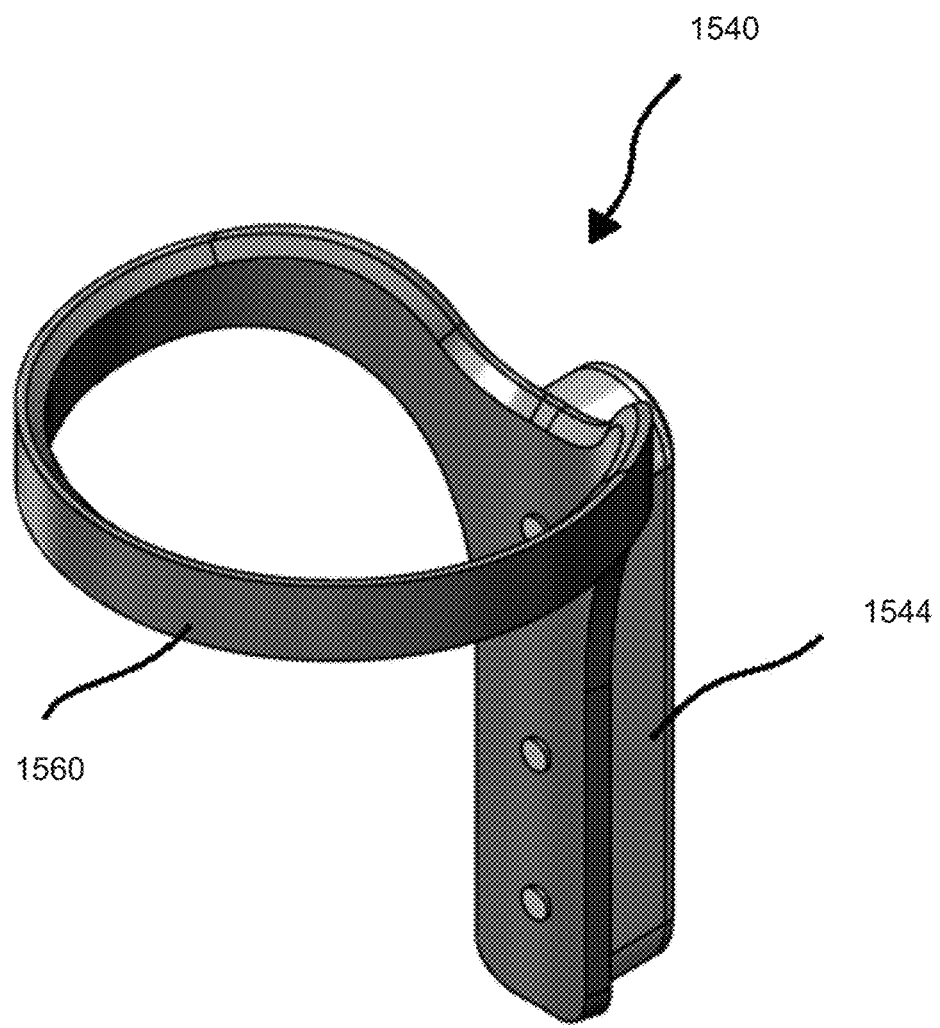
FIG. 26—A mount used to support the pod shown FIG. 19
Figure 27A:
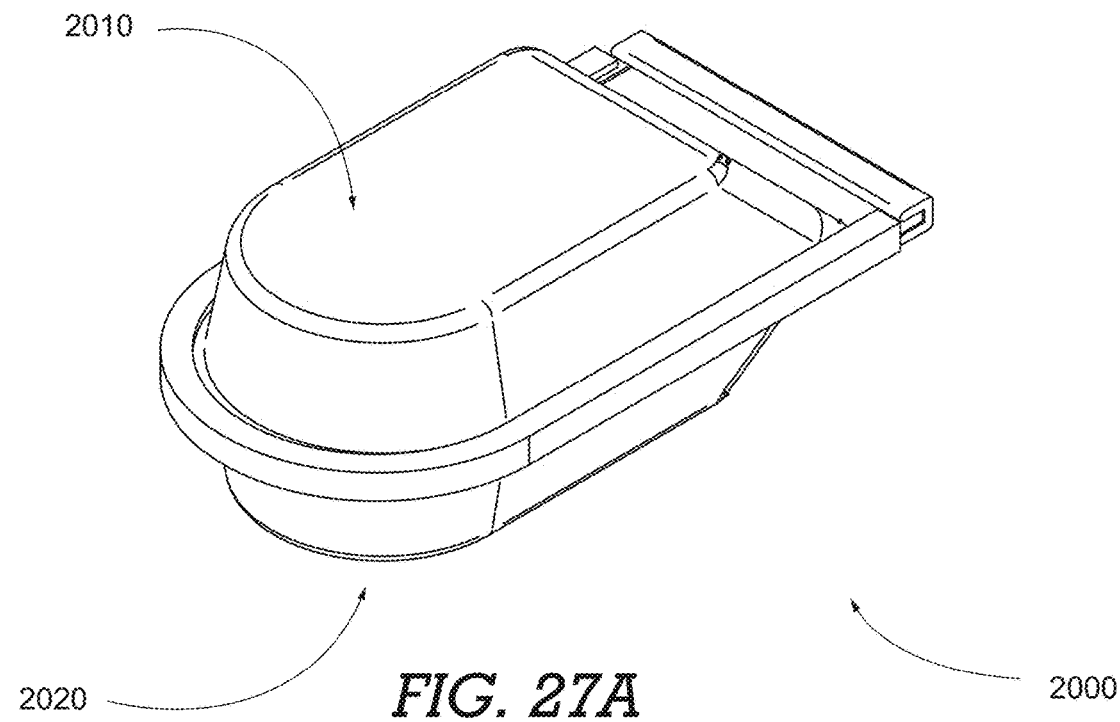
FIG. 27A—A perspective view of a pod of certain embodiments
Figure 27B:
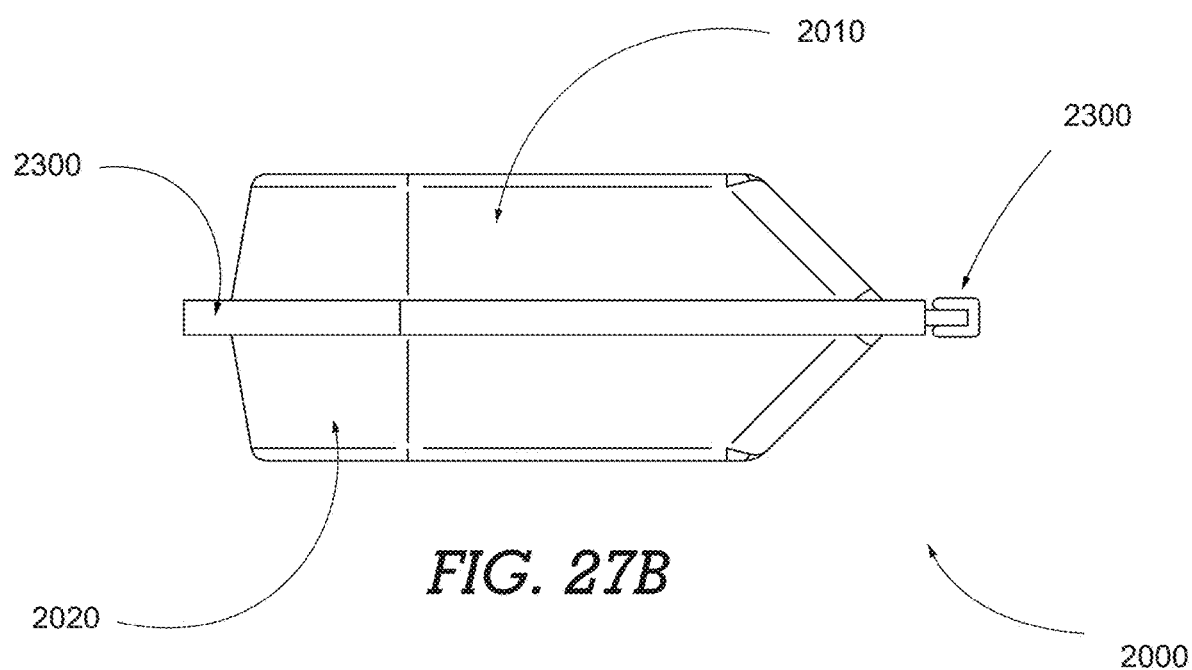
Figure 27C:
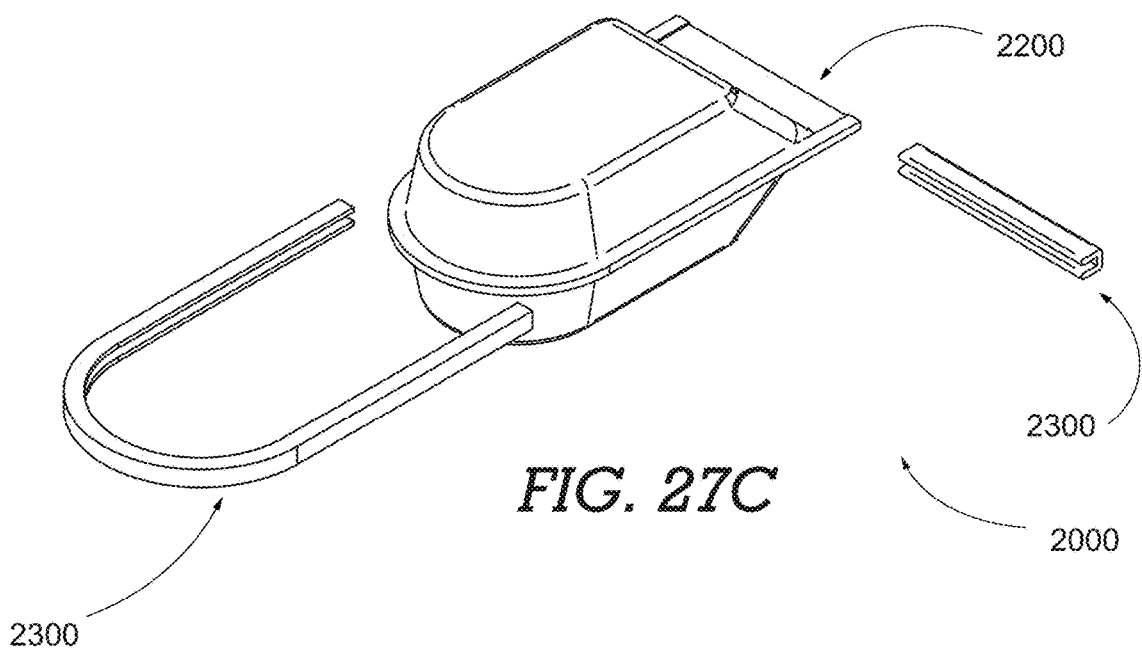
Figure 27D:
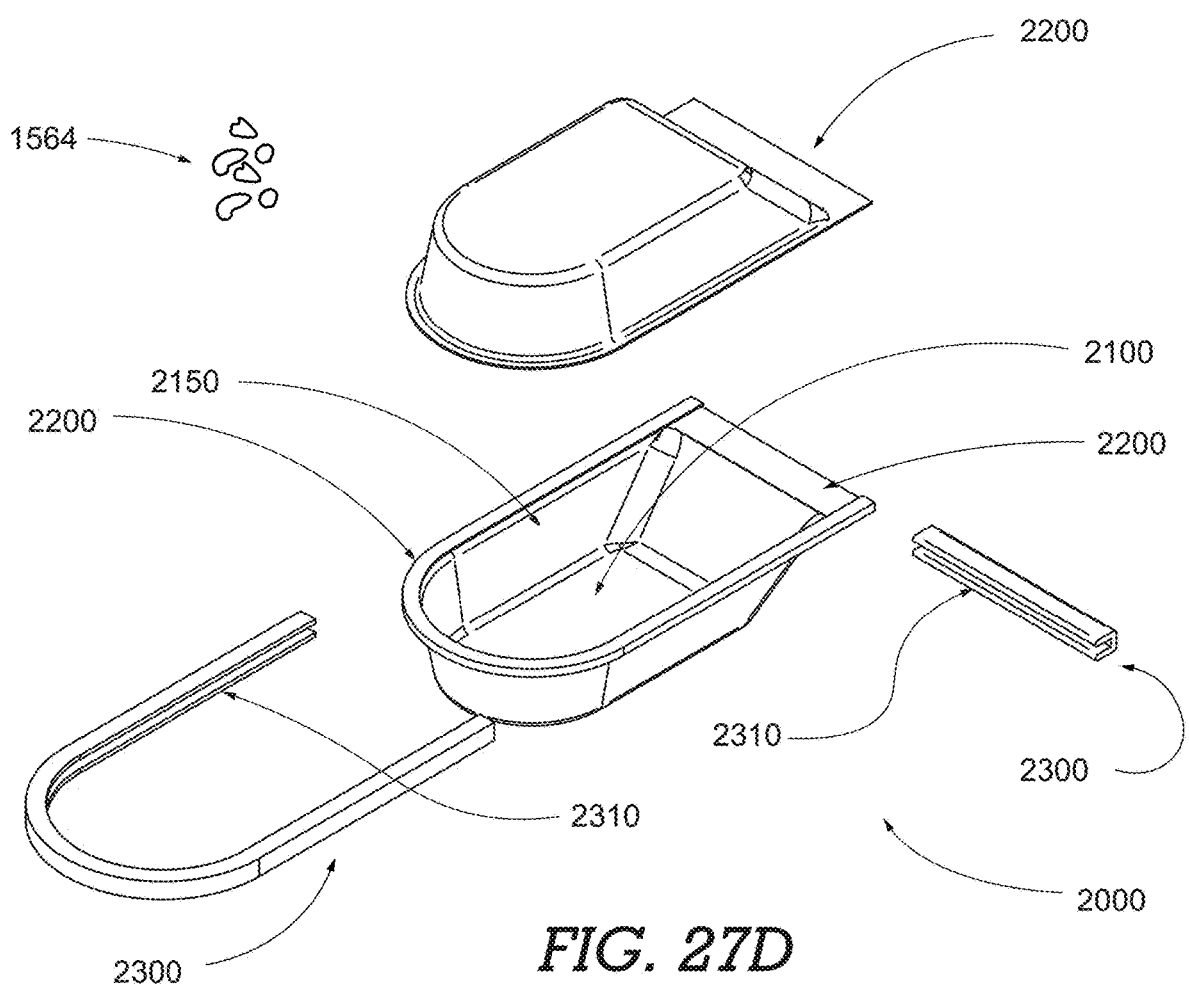

The pod 1502 is selectively inserted and maintained by a mount 1540 selectively interconnected to an inside surface of the infusing chamber as in the embodiments described above. The mount 1540 may be selectively interconnected to the inner surface of the infusing chamber with a magnet housing 1544 as shown in FIG. 26.

Figure 21:
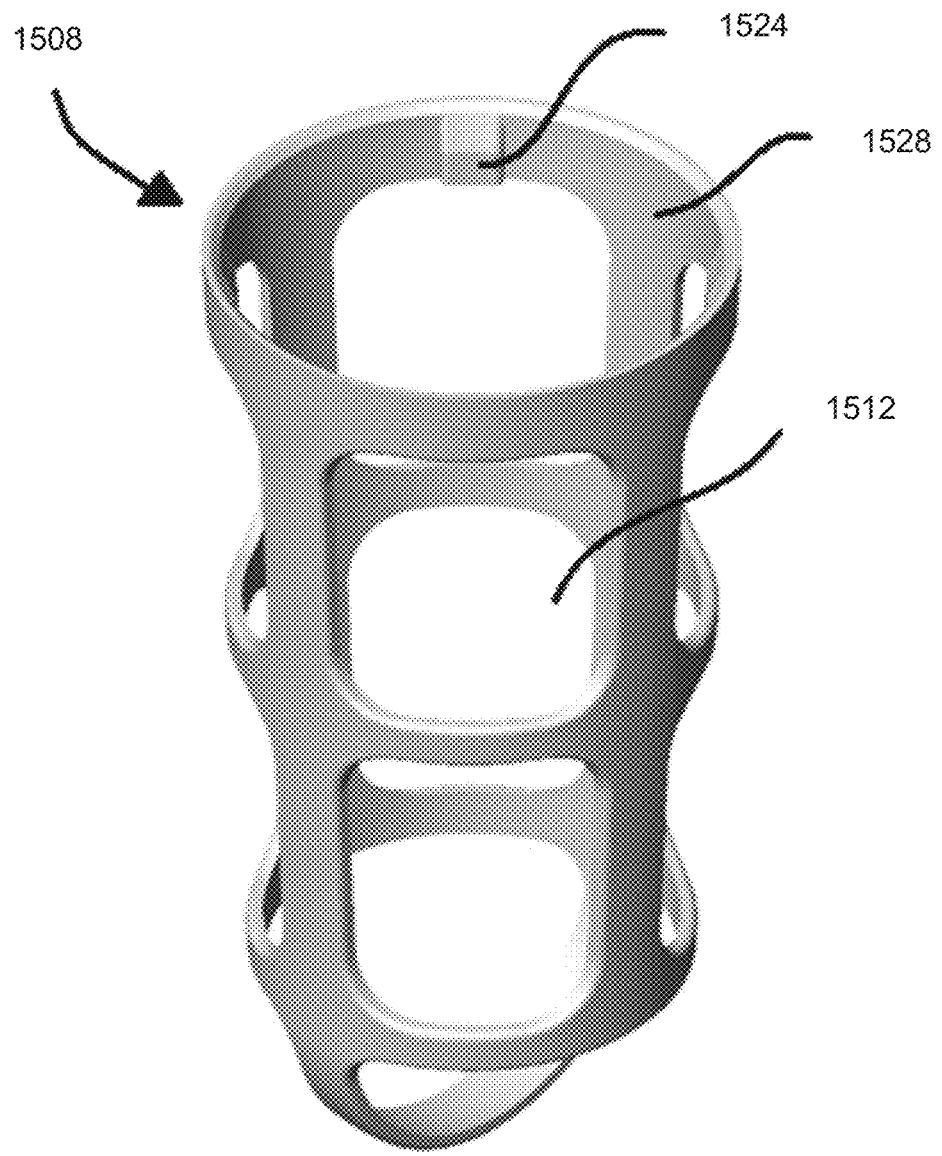
Figure 22:
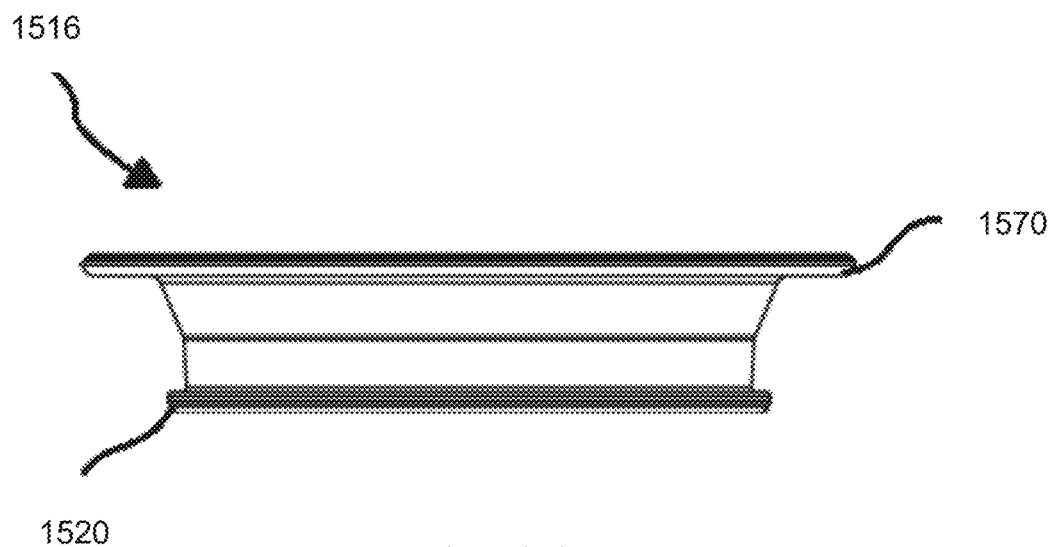
FIG. 22—A clip ring used by the pod show in FIG. 19
Figure 23:
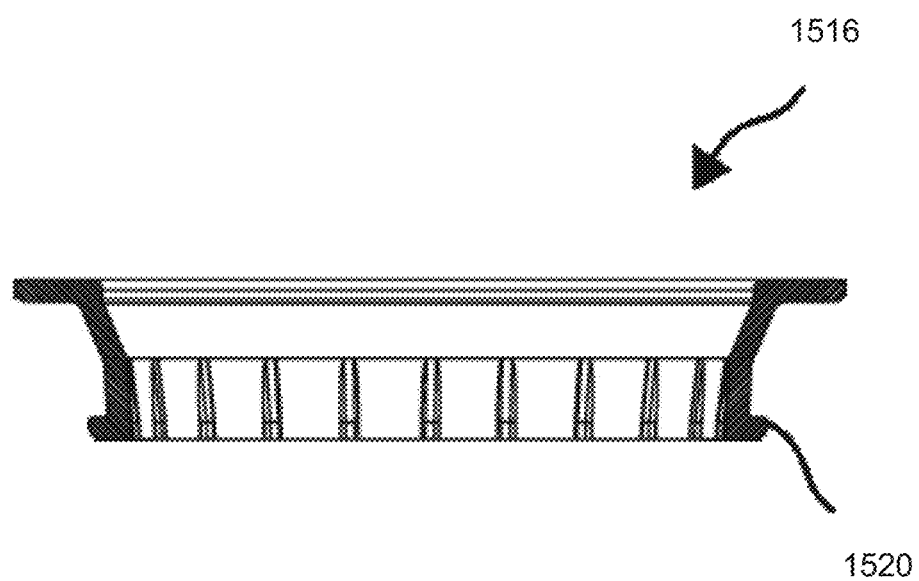
FIG. 23—A cross-sectional view of FIG. 22

The cage shown in FIG. 21 has a plurality of openings 1512 that allow solvent to pass therethrough. The openings can be of any size to facilitate the flow of solvent. In operation, the permeability of the bag, which may be made entirely or partially of a screen or mesh, will dictate exposure of the infusing material 1564 placed in the pod. In some embodiments, the cage openings 1512 are blocked with a permeable material or mesh wherein the bag is not necessarily required. In other embodiments, the size of the openings 1512 may be selectively altered to make them larger, for example. Other embodiments of the cage 1508 employ internal ridges or other means that allow for walls to be selectively provided to divide the cage into different zones for holding different types of plant-based material, for example. Further, portion(s) of the bag or cage may be constructed of a plant-based material that is effectively dissolved by the solvent material during the infusing process.

The cage of certain embodiments possesses more than one compartment adapted to receive infusing material of differing forms, characteristics, etc. In this example, one or more compartments can be filled by different co-packers perhaps at different times. Filling of a pod contemplated by this embodiment is performed by a first co-packer that fills a first compartment with a first infusing material, i.e., an herb blend, and the second compartment is filled by a second co-packer with a second infusing material, i.e., cannabis. The cap used in this pod may comprise two sealable portions. Alternatively, the first co-packer seals the pod with a cap that is later removed and perhaps destroyed by the second co-packer who adds a final cap, which may only be removed upon destruction thereof. The cap of some embodiments can only be removed after installation by destroying a portion thereof, which may serve as a safety feature. That is, the caps of some embodiments can only be removed after installation by destroying a portion thereof, which serves as a safety feature.

Figure 15C:
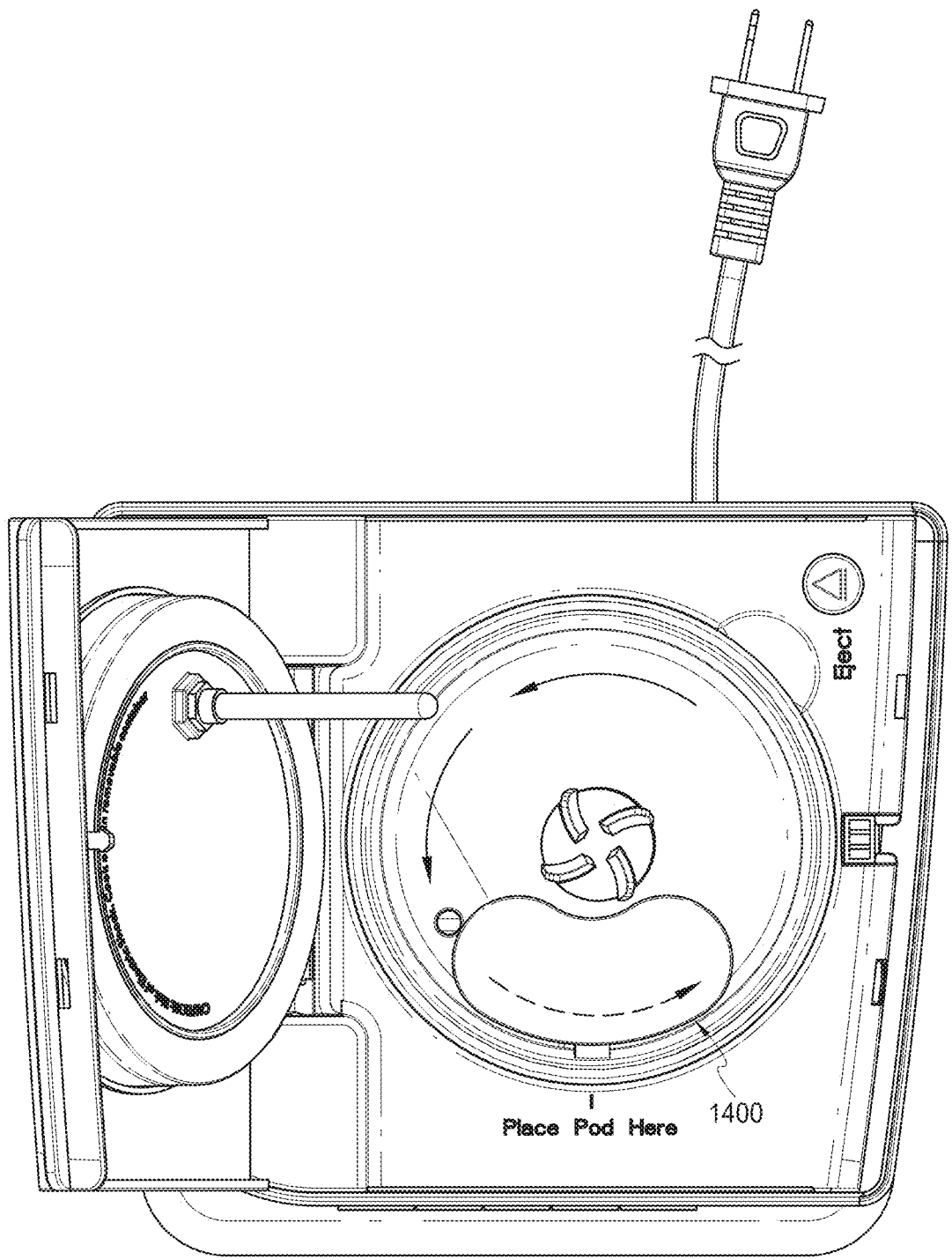
Figure 24:
FIG. 24—A cap used to seal the pod shown in FIG. 19
Figure 25:
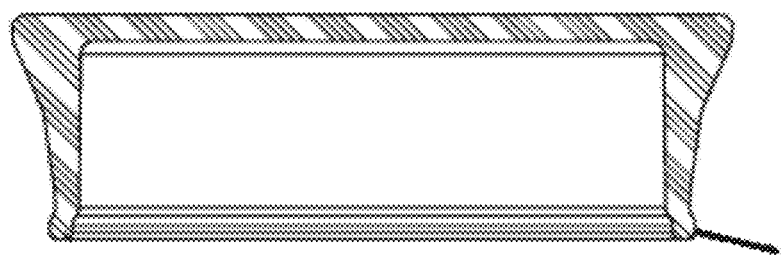
FIG. 25—A cross-sectional view FIG. 24

FIG. 24-FIG. 25 show the cap 1532 of certain embodiments of the present invention. As briefly mentioned above, some embodiments the present invention contemplate a pod that is sealed with contained infusing material before delivery to the user. In this example, the cap is ultrasonically welded to the bag clip, which will be apparent upon review of FIG. 15. In other embodiments, however, the cap can be freely removed to open the pod such so that the end user can fill the bag with the desired mixture of plant-based materials or to augment pre-packaged infusing materials. In other embodiments, the top surface of the cap includes at least one aperture that is selectively sealed by a bio-friendly sealing element, such as a sticker seal. This embodiment contemplates situations wherein the pod is filled with infusing material in a first location, shipped to a second location, and subsequently filled with additional infusing material. The secondary infusing material is added by way of removing the sticker, augmenting the infusing material already in the pod, and then resealing the cap with the existing sticker or new closure device. The secondary closure device may include tamper resistant or tamper evident means.

Figure 19:
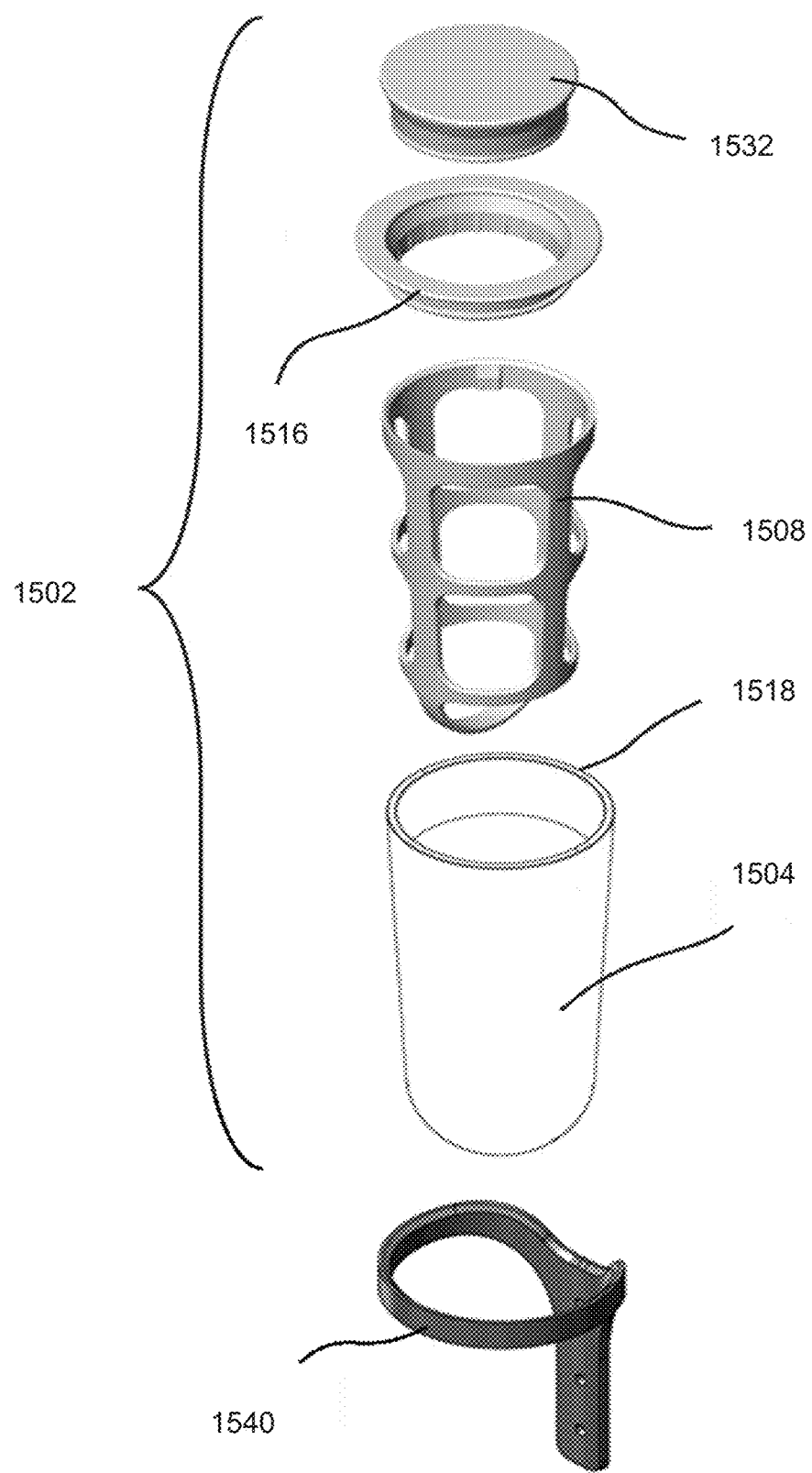
Figure 20:
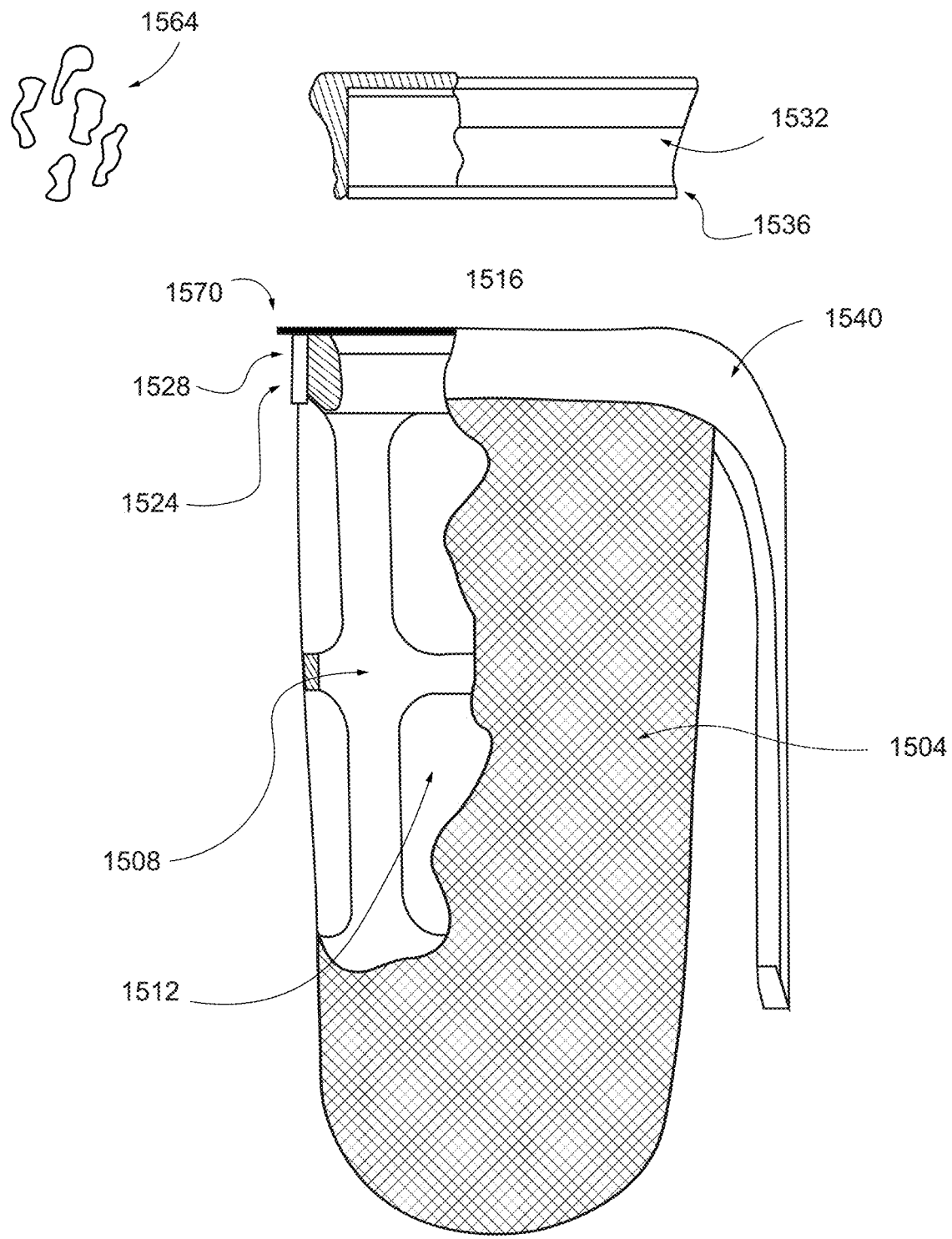

With specific reference to FIG. 19-FIG. 20, in operation, the cage 1508 is inserted into the bag 1504, which prevents collapse of the bag 1504 and provides a volume that receives infusing material 1564. An upper edge 1518 of the bag is folded into the cage, wherein the upper edge 1518 extends adjacent to, or below a lower ridge 1520 of the bag clip 1516. Next, the bag clip 1516 is inserted into the cage 1508, wherein at least a portion of the bag 1504 is positioned between an external surface of the bag clip at least one protrusion 1524 provided by the cage 1508. Further insertion of the bag clip 1516 into the cage will eventually locate the lower ridge 1520 of the bag clip 1516 under at least one protrusion 1524, thereby locking the bag clip 1516 to the cage 1508. The user or packager may then add material to the bag 1504. If desired, the cap 1532 is used to seal the pod 1502 and, thus, may be made to snugly fit within the bag clip 1516 to prevent contamination from entering the pod 1502. This is also safety feature that prevents children from opening the pod 1502. In certain embodiments of the pod is disposable and is delivered to the user with a proprietary mixture of botanicals, herbs, spices, leaves, and other plant-based materials. The mixture of infusing material are optimized for infusion of particular volumes of product and sold in multipacks at commercial retailers. Finally, the pod 1502 is inserted in the mount 1540, which employs a ring 1560 having a diameter less than a portion of the cage 1508, bag clip 1516, or cap 1532. This dimensional arrangement maintains preferred location of the pod 1502 within the infusing chamber. In certain embodiments, the bag clip employs an outer ridge 1570 that rests on the ring 1560.

Components of the pod may be injection molded or made be additive manufacturing processes. One of ordinary skill in the art will appreciate that the pod may be configured in size and shape to be used in many infusing apparatus, not just the apparatus described herein. The pod does not absorb more than a negligible amount of solvent. However, in certain embodiments, portions of the cage can be made of infusing material that will at least partially dissolve into particulates captured by the bag during the infusing process. The pod of certain embodiments is temperature resistant up to 250° F. when immersed in oil without degradation for at least about 10 hours.

The bag of certain embodiments is made of biodegradable polylactic acid (PLA) mesh. For example, PLA mesh manufactured by Yamanaka Industry Co., Ltd., commonly known as Tearoad® Soilon®. Such material is capable of remaining in a heated vegetable oil bath for 10 hours, which make it ideal for the contemplated applications. The mesh may also be made of food grade stainless steel.

Certain embodiments, such as those shown in FIG. 27A-FIG. 27D for example, comprise a pod 2000 having a first side 2010 and a second side 2020, wherein the sides comprise a permeable surface. The first side 2010 and the second side 2020 of the pod are interconnected to create a volume 2100 therebetween. Within the volume 2100 of the pod, a user is able to place infusing material 1564 prior to interconnecting the first side 2010 and the second side 2020, thereby constraining the first side 2010 to the second side 2020, containing the volume 2100, and preventing the infusing material 1564 from exiting the pod.

In certain embodiments, such as those shown in FIG. 27A-FIG. 27D for example, a pod 2000 having a first side 2010 and a second side 2020 comprises a hollow form having an open aspect 2150 and a rib 2200 along the perimeter of the first side 2010 and along the perimeter of the second side 2020. When assembled, the ribs 2200 are placed against each other resulting in an adjoined ribs 2210. Certain embodiments comprise a retainer 2300, the retainer 2300 comprises a channel 2310 configured to receive the adjoined rib 2210, thereby keeping first side 2010 and second side 2020 interconnected. In certain embodiments a retainer comprises a U-shape. Certain embodiments comprise a straight retainer. It will be appreciated that although embodiments shown disclose a U-channel profile, other profiles such as a C-channel, slot-wall, and J-channel profiles are in keeping with the spirit and scope of the present invention.

It will be appreciated that a user may optionally place infusing material 1564 between the first side 2010 and the second side 2020 of the pod prior to closing the pod 2000 by mating the ribs 2200 of the first side 2010 with the ribs 2200 of the second side 2020 thereby resulting in an adjoined ribs 2210 prior to sliding at least one retainer 2300 over an aspect of the adjoined ribs.

Certain embodiments of the present invention, as shown in FIG. 29A-FIG. 29D for instance, comprise a fan 2600 interconnected with the lid 105 wherein the fan is configured to provide ventilation between the environment and the permeable container 1400 held within the infusing chamber 110. The fan 2600 can be configured to extract air from the infusing chamber, or supply air into the infusing chamber 110 and as desired, and directed toward or into the permeable container 1400. Certain embodiments of the present invention further comprise vent-holes 2610 wherethrough make-up air is permitted to enter or exit the infusing chamber to allow for constant airflow.

Figure 29A:
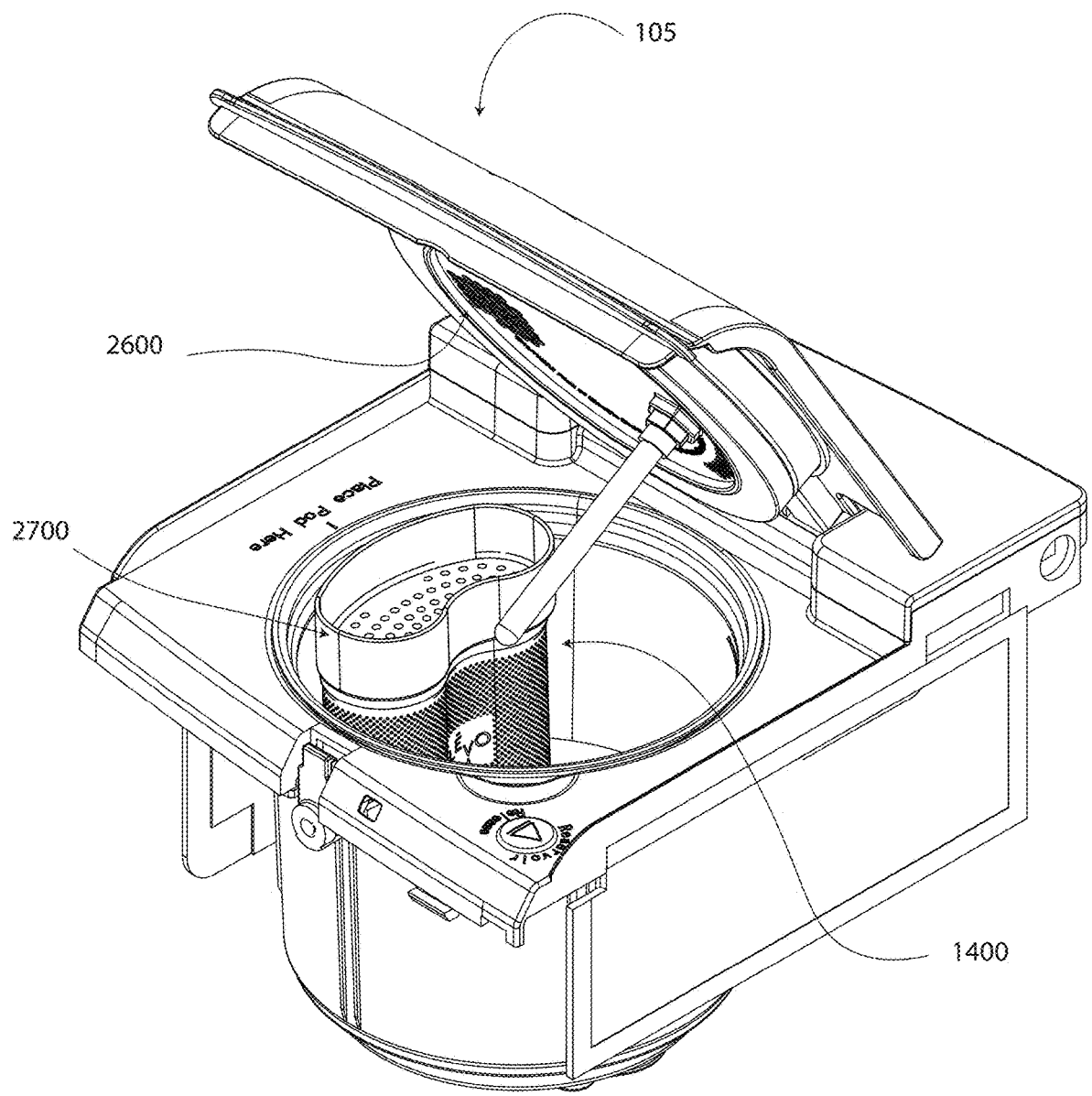
Figure 29B:
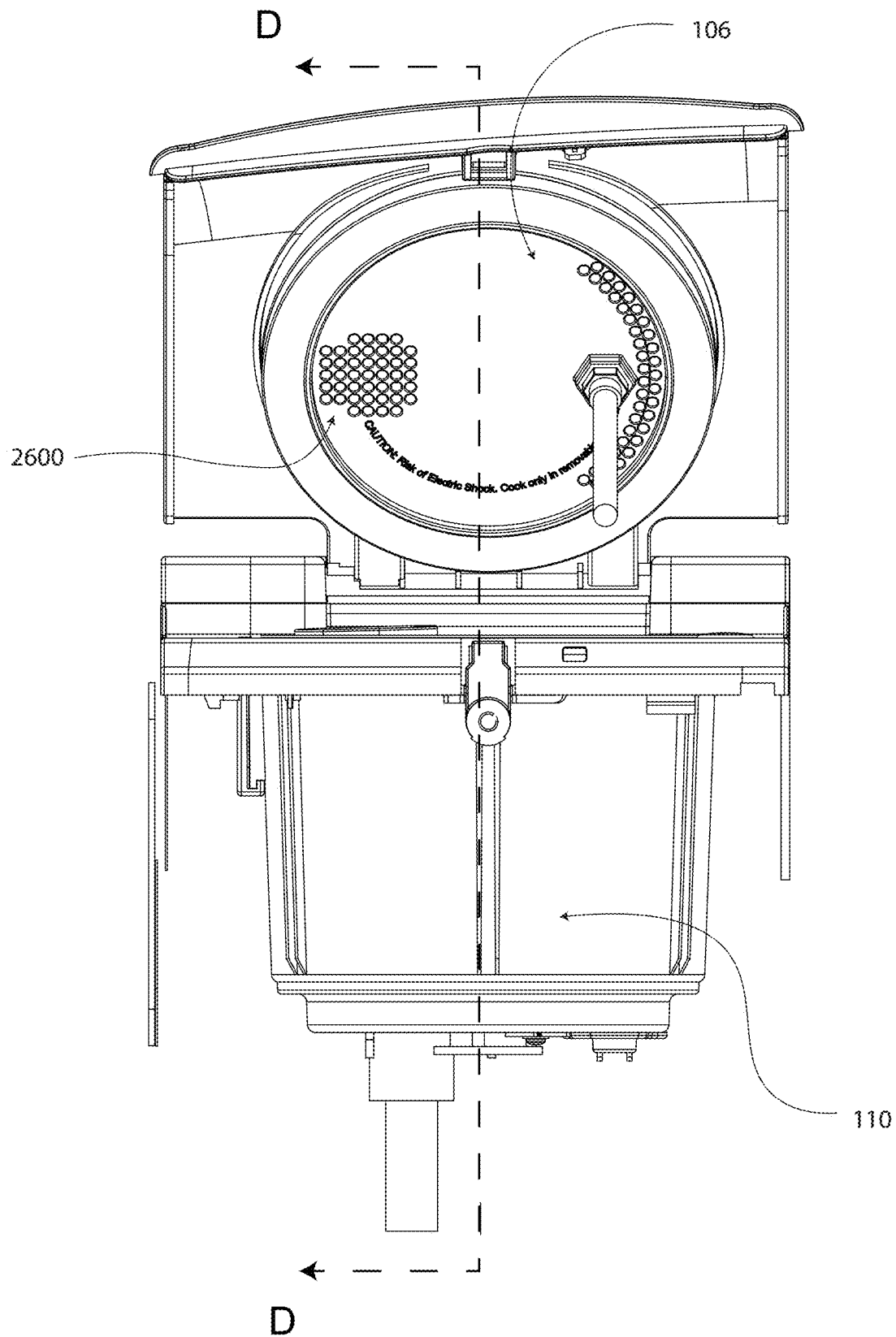
Figure 29C:
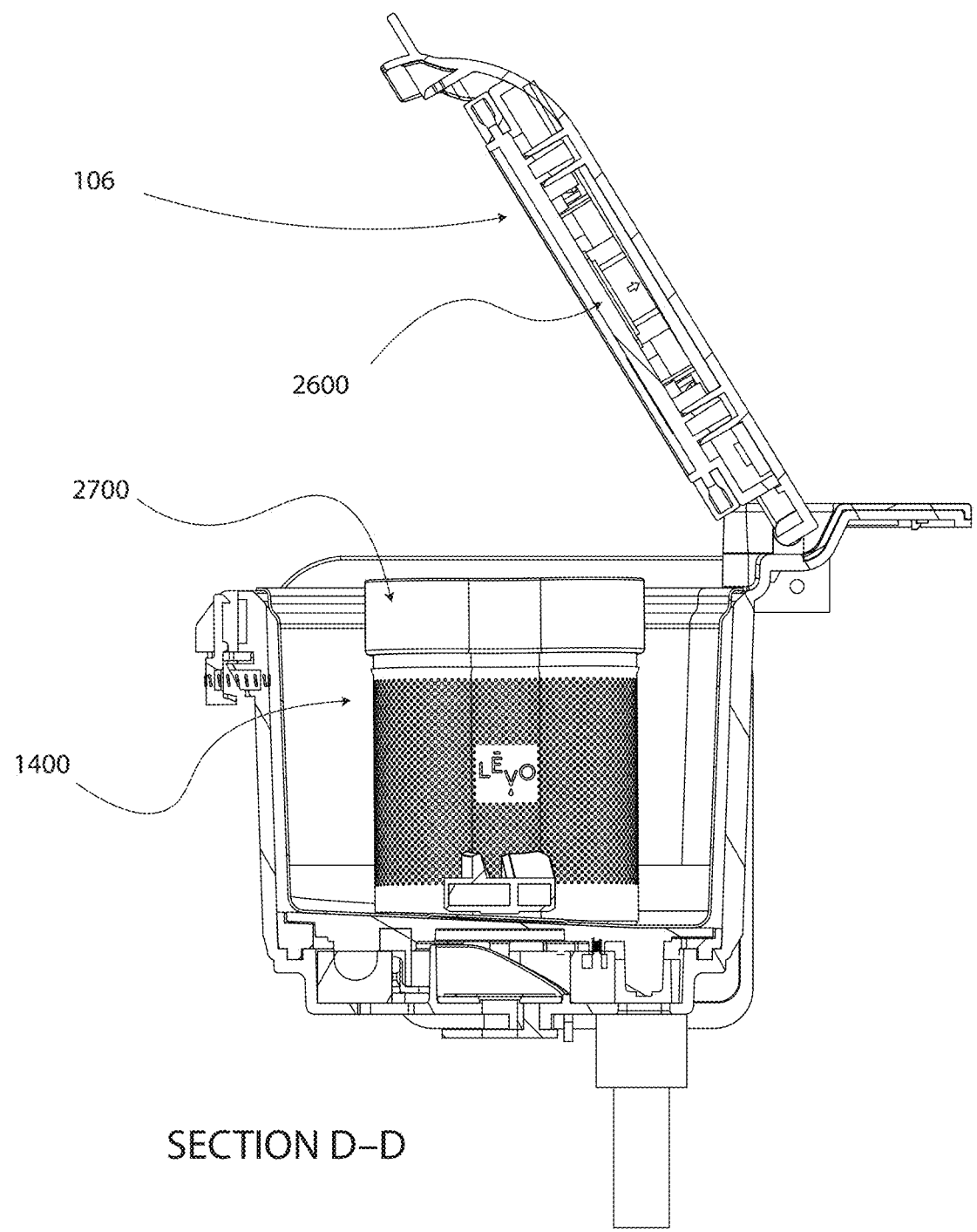
Figure 29D:
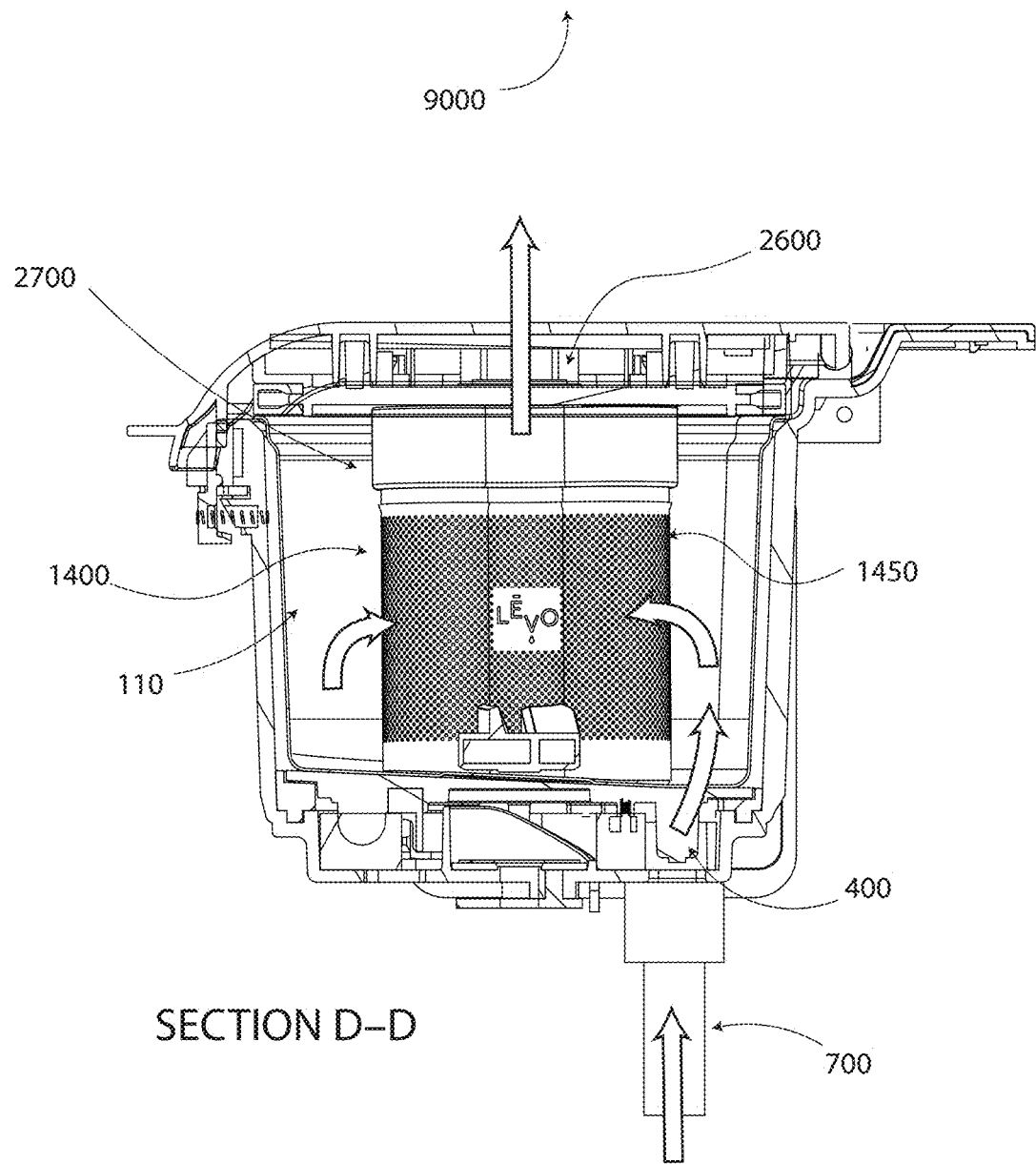
Figure 30:
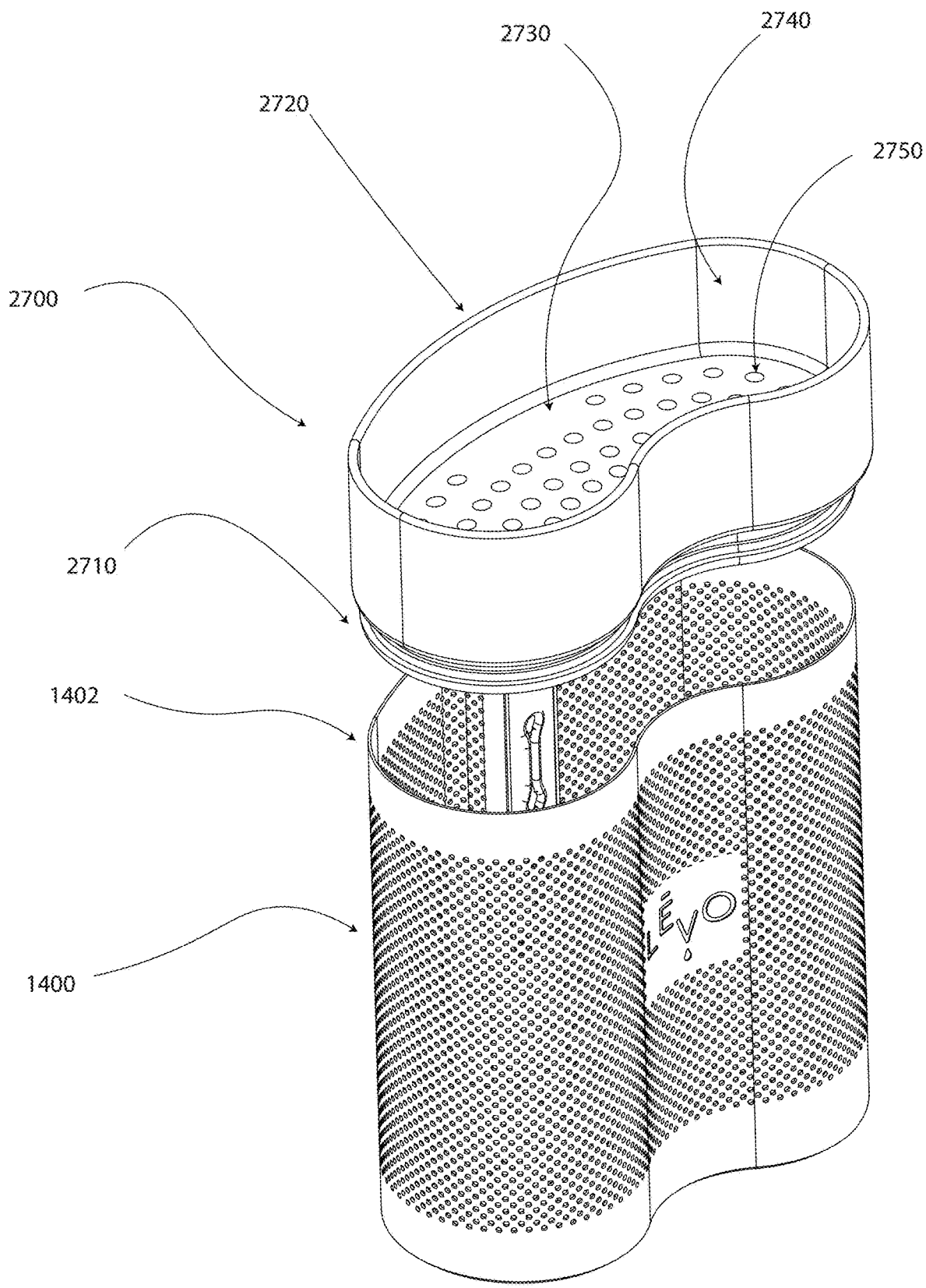

Certain embodiments of the present invention, as shown in FIG. 29D for instance, comprise a permeable container 1400 having a cap 2700 which is configured to interconnect with the top aspect 1402 of the permeable container and interface with the bottom aspect 106 of the lid. The cap 2700 is configured to direct the flow of air directly to or from the permeable container 1400 with the fan 2600 interconnected with the lid 105 operating. In certain embodiments, a bottom portion 2710 of the cap is configured to index within the top aspect 1402 of the permeable container. However, embodiments wherein the bottom portion of the cap is configured as a sleeve wherein the sleeve is configured to receive the top aspect 1402 of the permeable container 1400 therein, are within the spirit and scope of the present invention. The cap 2700 as shown in FIG. 30 for example, is configured to interconnect with the bottom aspect 106 of the lid wherein a top aspect of the cap creates a seal or partial seal between the top aspect 2720 of the cap and the bottom aspect of the lid. Accordingly, when the cap 2700 is interconnected with the top aspect 1402 of the permeable container and interconnected with the bottom aspect 106 of the lid, a fan 2600 interconnected with the lid 105 is more capable of directing air toward or from the environment 9000 in relation to the permeable container 1400. In certain embodiments the cap 2700 comprises a surface 2730 offset downward from the top aspect 2720 of the cap thereby creating a recess 2740 between the top aspect 2720 of the cap and the bottom 2710 aspect of the cap. The surface 2730 comprises a plurality of apertures 2750 therethrough allowing air to pass between the permeable container 1400 and the fan 2600 when the cap is interconnected with the permeable container.

In certain embodiments, as shown in FIG. 29D for instance, when the apparatus is placed in a drying mode, the fan 2600 is configured to draw air through the cap 2700, thereby drawing air from the infusion chamber 110, through the perforated surface 1450 of the permeable container 1400, through the cap 2700 and exhausting it to the environment 9000. In certain embodiments, when the apparatus is placed in a drying mode, the gravity-fed drain device 130 is placed in an open configuration thereby allowing make-up air to be drawn through the tube 700 and into the infusing chamber 110 thereby avoiding a low-pressure state within the infusing chamber 110.

While various embodiments of the present invention have been described in detail, it is apparent that modifications and alterations of those embodiments will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein.

The terms "first," "second," "top," "bottom," etc., as used herein, are intended for illustrative purposes only and do not limit the embodiments in any way. Additionally, the term "plurality," as used herein, indicates any number greater than one, either disjunctively or conjunctively, as necessary, up to an infinite number. Further, "Providing" an article or apparatus, as used herein, refers broadly to making the article available or accessible for future actions to be performed on the article, and does not connote that the party providing the article has manufactured, produced, or supplied the article or that the party providing the article has ownership or control of the article. Accordingly, while specific embodiments have been illustrated and described, numerous modifications come to mind without significantly departing from the spirit of the invention and the scope of protection is only limited by the scope of the accompanying Claims.

What is claimed is:

1. An infusing and drying apparatus comprising:
an infusing chamber configured to hold liquid, said infusing chamber having an aperture through a bottom surface of said infusing chamber;
a lid configured to interconnect with a top aspect of the infusing chamber;
a fan interconnected with the lid wherein the fan is configured ventilate the infusing chamber; and
a permeable container interconnected with the infusing chamber,
wherein in an infusing mode, the apparatus is configured to infuse a solvent contained within the infusing chamber with a first material contained within the permeable container, prior to being dispensed through the aperture through the bottom surface of the infusing chamber, and
wherein in a drying mode, the apparatus is configured to circulate air, via operation of the fan, within the infusing chamber thereby accelerating drying of a second material, contained within the permeable container.

2. The infusing and drying apparatus of claim 1 further comprising:
a gravity-fed drain device configured to interface with the aperture, wherein in the infusing mode the gravity-fed drain device is configured to have an open configuration which allows passage of a fluid through the aperture, and wherein the gravity-fed drain device is placed in a closed configuration which prevents the passage of the fluid through the aperture.

3. The infusing and drying apparatus of claim 2 wherein, in the drying mode, the fan operates to ventilate the infusing chamber thereby drying material disposed therein.

4. The infusing and drying apparatus of claim 3 wherein in the drying mode the gravity-fed drain device is placed in an open configuration to receive air-therethrough to maintain a flow of air through the infusing chamber.

5. The infusing and drying apparatus of claim 4,
wherein the permeable container is removably interconnectable with an internal aspect of the infusing chamber, and
wherein the permeable container comprises a plurality of apertures allowing flow of fluid from an external aspect of the permeable container through the internal aspect of the permeable container.

6. The infusing and drying apparatus of claim 5 further comprising:
a cap configured to interconnect with an open top of the permeable container, the cap having a surface comprising a plurality of apertures therethrough; and
the surface offset downward from the top aspect of the cap thereby resulting in a recess, wherein the cap is configured to direct ventilation provided by the fan therethrough when the lid is interconnected with the infusing chamber.

7. The infusing and drying apparatus of claim 6, wherein a top aspect of a sleeve is configured to interconnect with the lid of the infusing chamber when the lid is interconnected with the infusing chamber.

8. The infusing and drying apparatus of claim 6 wherein in the drying mode, the fan is configured to draw air from within the infusing chamber and exhaust the air to ambient surroundings, and
wherein make-up air is drawn in through the gravity-fed drain device, and through the aperture through the bottom surface of the infusing chamber.

9. The infusing and drying apparatus of claim 2, wherein:
the gravity-fed drain device comprises a deformable tube, wherein deformation of the deformable tube results in constriction of a pathway therethrough.

10. The infusing and drying apparatus of claim 9 wherein the gravity-fed drain device comprises a plurality of configurations:
an open configuration wherein flow of fluids through the pathway is unrestricted;
a closed configuration wherein the pathway is fully constricted, thereby restricting the passage of fluid therethrough; and
a first intermediate configuration wherein the pathway is partially restricted, thereby allowing the passage of fluid at a rate lower than that of the open configuration.

11. The infusing and drying apparatus of claim 10, wherein the gravity-fed drain device further comprises a second intermediate configuration wherein the pathway is partially restricted, thereby allowing the passage of fluid at a rate lower than that of the open configuration, and
wherein the pathway is less restricted than the first intermediate configuration.

12. The infusing and drying apparatus of claim 11, wherein the first intermediate configuration constricts a cross-section of the pathway to 50% of the open configuration, and
wherein the second intermediate configuration constricts the cross-section of the pathway to 25% of the open configuration.

13. The infusing and drying apparatus of claim 12, wherein the gravity fed drain device further comprises a pivoting lever actuated by an electric actuator, wherein the pivoting lever is configured to deform the tube, thereby constricting the pathway to restrict the flow of fluid therethrough.

* * * * *